US008177876B2

(12) United States Patent
Kalayci et al.

(10) Patent No.: US 8,177,876 B2
(45) Date of Patent: May 15, 2012

(54) REDUCED SOLIDITY WEB COMPRISING FIBER AND FIBER SPACER OR SEPARATION MEANS

(75) Inventors: Veli E. Kalayci, Farmington, MN (US); Douglas G. Crofoot, Burnsville, MN (US); Timothy H. Grafe, Edina, MN (US); Kristine M. Graham, Minnetonka, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/031,416

(22) Filed: Feb. 21, 2011

(65) Prior Publication Data

US 2011/0139706 A1  Jun. 16, 2011

Related U.S. Application Data

(60) Continuation of application No. 12/542,312, filed on Aug. 17, 2009, now Pat. No. 7,918,913, which is a division of application No. 11/354,301, filed on Feb. 13, 2006, now Pat. No. 7,717,975.

(60) Provisional application No. 60/654,055, filed on Feb. 16, 2005.

(51) Int. Cl.
*B01D 50/00* (2006.01)
(52) U.S. Cl. ............... 55/486; 55/487; 55/489; 55/527; 55/528; 264/145; 264/DIG. 48
(58) Field of Classification Search .................. 55/486, 55/487, 489, 527, 528, 524; 264/175, DIG. 48, 264/145
See application file for complete search history.

(56) References Cited

U.S. PATENT DOCUMENTS

| 3,676,242 A | 7/1972 | Prentice |
| 3,826,067 A | 7/1974 | Wiilder et al. |
| 3,841,953 A | 10/1974 | Lohkamp et al. |
| 3,849,241 A | 11/1974 | Butin et al. |
| 3,878,014 A | 4/1975 | Melead |
| 3,900,648 A | 8/1975 | Smith |
| 3,971,373 A | 7/1976 | Braun |
| 4,100,324 A | 7/1978 | Anderson et al. |
| 4,181,514 A | 1/1980 | Lefkowitz et al. |

(Continued)

FOREIGN PATENT DOCUMENTS

JP 7265640 10/1995

(Continued)

OTHER PUBLICATIONS

Hansen et al., "Water Absorption and Mechanical Properties of Electrospun Structured Hydrogels", *Journal of Applied Polymer Science*, vol. 95, pp. 427-434 (2005).

(Continued)

*Primary Examiner* — Jason M Greene
*Assistant Examiner* — Dung H Bui
(74) *Attorney, Agent, or Firm* — Pauly, DeVries Smith & Deffner, L.L.C.

(57) ABSTRACT

A web can comprise a substantially continuous fiber mass and a separation means dispersed into the fiber. The web having a preferred thickness resulting from forming a polymer material and a particulate into a fine fiber layer can have a variety of end uses. A filtration media can include a structure comprising such a web of fine fiber and a substantial volume of particulate embodiment of the separation means. The resulting fine fiber structure provides an improved filtration medium having substantial depth, thickness, and a layered structure. The improved properties of the web results from inclusion of the separation or spacer particulate.

30 Claims, 33 Drawing Sheets

U.S. PATENT DOCUMENTS

| | | | |
|---|---|---|---|
| 4,227,904 | A | 10/1980 | Kasmark, Jr. |
| 4,429,001 | A | 1/1984 | Kolpin et al. |
| 4,460,642 | A | 7/1984 | Errede et al. |
| 4,650,506 | A | 3/1987 | Barris et al. |
| 4,652,286 | A | 3/1987 | Kusuda et al. |
| 4,765,812 | A | 8/1988 | Homonoff et al. |
| 4,874,399 | A | 10/1989 | Reed et al. |
| 5,082,476 | A | 1/1992 | Kahlbaugh et al. |
| 5,223,139 | A | 6/1993 | Ruger et al. |
| 5,238,474 | A | 8/1993 | Kahlbaugh et al. |
| 5,244,482 | A | 9/1993 | Hassenboehler et al. |
| 5,328,758 | A | 7/1994 | Markell et al. |
| 5,332,426 | A | 7/1994 | Tang et al. |
| 5,360,654 | A | 11/1994 | Anderson et al. |
| 5,364,456 | A | 11/1994 | Kahlbaugh et al. |
| 5,423,892 | A | 6/1995 | Kahlbaugh et al. |
| 5,478,466 | A | 12/1995 | Heilmann et al. |
| 5,486,410 | A | 1/1996 | Groeger et al. |
| 5,591,335 | A | 1/1997 | Barboza et al. |
| 5,607,490 | A | 3/1997 | Taniguchi et al. |
| 5,622,537 | A | 4/1997 | Kahlbaugh et al. |
| 5,669,949 | A | 9/1997 | Dudrey et al. |
| 5,672,399 | A | 9/1997 | Kahlbaugh et al. |
| 5,681,469 | A | 10/1997 | Barboza et al. |
| 5,762,669 | A | 6/1998 | Kahlbaugh et al. |
| 5,885,696 | A | 3/1999 | Groeger |
| 5,952,092 | A | 9/1999 | Groeger et al. |
| 5,972,808 | A | 10/1999 | Groeger et al. |
| 5,993,905 | A | 11/1999 | Sheehan |
| 6,514,306 | B1 | 2/2003 | Rohrbach et al. |
| 6,743,273 | B2 | 6/2004 | Chung et al. |
| 6,974,490 | B2 | 12/2005 | Gillingham et al. |
| 7,008,465 | B2 | 3/2006 | Graham et al. |
| 7,029,520 | B2 | 4/2006 | Park et al. |
| 7,052,532 | B1 | 5/2006 | Liu et al. |
| 7,101,419 | B2 | 9/2006 | Dallas et al. |
| 7,416,580 | B2 | 8/2008 | Nyman et al. |
| 7,459,111 | B2 | 12/2008 | Miyakawa et al. |
| 2001/0003893 | A1 | 6/2001 | Ramos et al. |
| 2002/0046656 | A1 | 4/2002 | Benson et al. |
| 2003/0010002 | A1 | 1/2003 | Johnson et al. |
| 2003/0037675 | A1 | 2/2003 | Gillingham et al. |
| 2003/0051456 | A1 | 3/2003 | Alvin et al. |
| 2003/0106294 | A1 | 6/2003 | Chung et al. |
| 2003/0167742 | A1 | 9/2003 | Kahlbaugh et al. |
| 2003/0177909 | A1 | 9/2003 | Koslow |
| 2003/0183083 | A1 | 10/2003 | Hau-Cheng Fu et al. |
| 2004/0060269 | A1 | 4/2004 | Chung et al. |
| 2004/0065195 | A1 | 4/2004 | Gogins |
| 2004/0187454 | A1 | 9/2004 | Chung et al. |
| 2004/0200354 | A1 | 10/2004 | Barris et al. |
| 2004/0211160 | A1 | 10/2004 | Rammig et al. |
| 2004/0250683 | A1 | 12/2004 | Soane et al. |
| 2004/0255783 | A1 | 12/2004 | Graham et al. |
| 2004/0261382 | A1 | 12/2004 | Baldinger et al. |
| 2005/0011173 | A1 | 1/2005 | Hornfeck et al. |
| 2005/0160711 | A1 | 7/2005 | Yang |
| 2005/0183405 | A1 | 8/2005 | Gillingham et al. |
| 2005/0193696 | A1 | 9/2005 | Muller et al. |
| 2005/0210844 | A1 | 9/2005 | Kahlbaugh et al. |
| 2005/0229562 | A1 | 10/2005 | Dallas et al. |
| 2005/0235619 | A1 | 10/2005 | Heinz et al. |
| 2005/0266760 | A1 | 12/2005 | Chhabra et al. |
| 2006/0096260 | A1 | 5/2006 | Bryner et al. |
| 2006/0096263 | A1 | 5/2006 | Kahlbaugh et al. |
| 2006/0137317 | A1 | 6/2006 | Bryner et al. |
| 2006/0137318 | A1 | 6/2006 | Lim et al. |
| 2006/0150594 | A1 | 7/2006 | Ziebold et al. |
| 2006/0156701 | A1 | 7/2006 | Maeda et al. |
| 2006/0191249 | A1 | 8/2006 | Gogins et al. |
| 2006/0272303 | A1 | 12/2006 | Fujiwara et al. |
| 2007/0012007 | A1 | 1/2007 | Chung et al. |
| 2007/0039300 | A1 | 2/2007 | Kahlbaugh et al. |
| 2007/0074628 | A1 | 4/2007 | Jones et al. |
| 2007/0144123 | A1 | 6/2007 | Angadjivand et al. |

FOREIGN PATENT DOCUMENTS

| | | |
|---|---|---|
| JP | 10165731 | 6/1998 |
| WO | WO 03/080905 | 10/2003 |
| WO | WO 2005/005696 | 1/2005 |
| WO | WO 2005/005704 | 1/2005 |
| WO | WO 2007/054039 A1 | 5/2007 |
| WO | WO 2007/054040 A2 | 5/2007 |

OTHER PUBLICATIONS

Ko et al., "Electrospinning of Continuous Carbon Nanotube-Filled Nanofiber Yarns", *Adv. Mater. 15*, No. 14, pp. 1161-1165, Jul. 17, 2003.

Frautmann et al., "High Performance Nanofiber Coated Filter Media for Engine Intake Air Filtration", *Filtration*, vol. 6, No. 1, pp. 53-56 (2006).

First Office Action mailed Sep. 18, 2009 in co-pending Chinese Application No. 2006800125053 (8 pages).

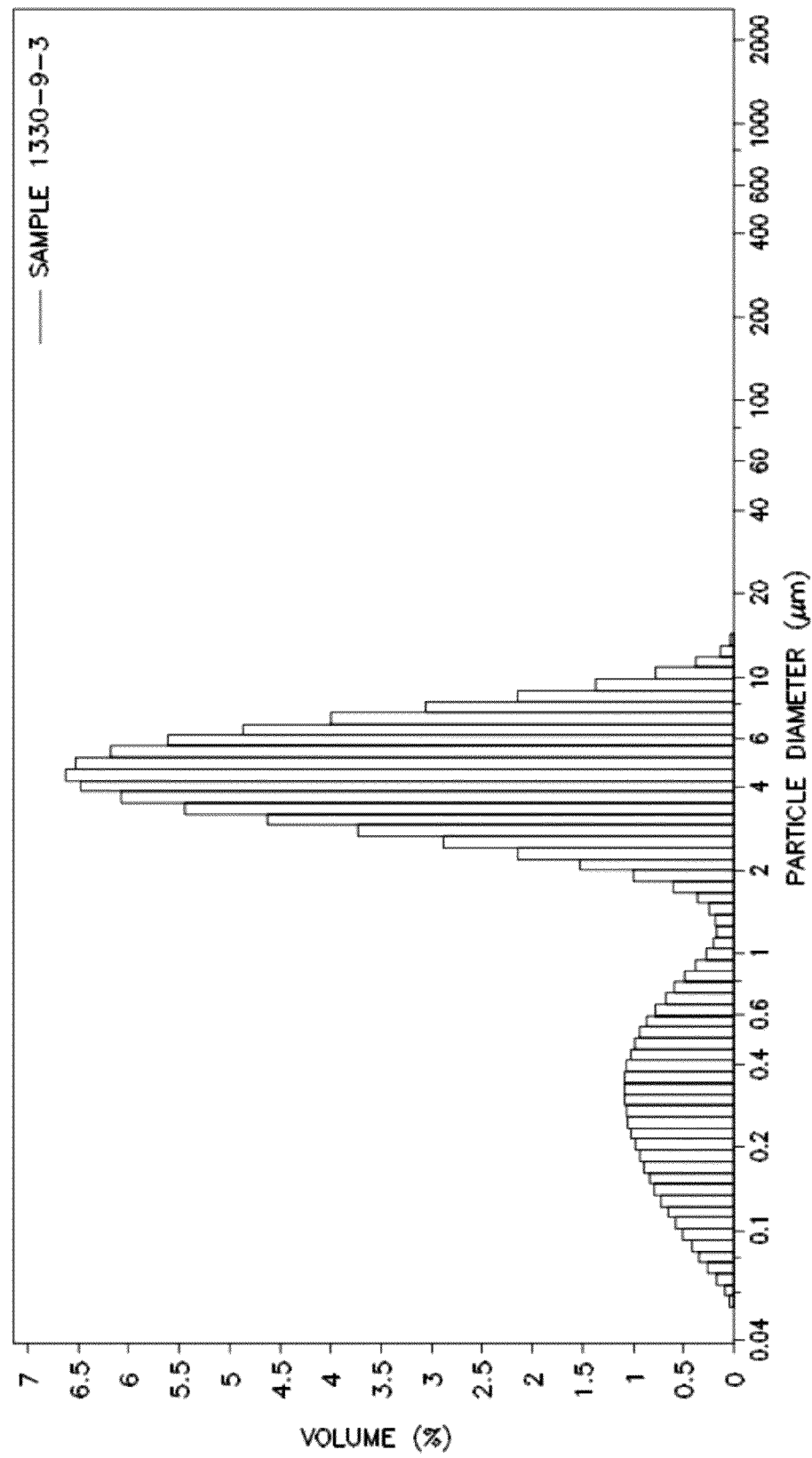

REDUCED SOLIDITY WEB COMPRISING FIBER AND FIBER SPACER OR SEPARATION MEANS

CROSS-REFERENCE TO RELATED APPLICATION(S)

This application is a continuation application of U.S. application Ser. No. 12/542,312 filed Aug. 17, 2009, which issued as U.S. Pat. No. 7,918,913 on Apr. 5, 2011, which is a divisional application of U.S. application Ser. No. 11/354,301 filed Feb. 13, 2006, which issued as U.S. Pat. No. 7,717,957 on May 18, 2010, which claims priority from Provisional Application No. 60/654,055 filed Feb. 16, 2005, entitled WEB COMPRISING FIBER AND FIBER SPACER OR SEPARATION MEANS.

FIELD OF THE INVENTION

The invention relates to a web or a fiber structure such as a filtration media comprising a collection of fiber and a fiber spacer, spacer particulate or web separation means in association with the fiber.

BACKGROUND OF THE INVENTION

Filters can be made of fine fiber webs of polymer materials. Polymer webs can be made by electrospinning, extrusion, melt spinning, air laid and wet laid processing, etc. The manufacturing technology of filter structures is vast for obtaining structures that can separate the particulate load from a mobile fluid stream. Such filtration media include surface loading media and depth media in which these media can be produced in a variety of geometric structures. Principles relating to the use of such media are described in Kahlbaugh et al., U.S. Pat. Nos. 5,082,476; 5,238,474; 5,364,456 and 5,672,399. In any filter structure containing any arbitrary selected filtration medium, the filter must remove a defined particle size, and at the same time, have sufficient lifetime to be economically justifiable in its particulate removing properties. Lifetime is generally considered to be the time between insulation and the time a filter obtains sufficient particulate load such that the pressure drop across the filter is greater than a predetermined level. An increased pressure drop can cause filter bypass, mechanical filter failure, fluid starvation, or other operating problems.

Nanofiber filter media have fueled new levels of performance in air filtration in commercial, industrial and defense applications where efficiency requirements have been low in comparison to HEPA (High Efficiency Particle Air) or ULPA (Ultra Low Penetration Air) levels.

Recent advancements in the nanofiber enhanced filtration field have extended the usability of nanofibers into applications with higher filtration efficiencies. In particular, these nanofiber matrices provide comparable performance to other commercially available HEPA media composed of sub-micron glass or expanded-PTFE membranes. Such performance is shown along with benefits of the technology.

Nanofiber filter media is a viable solution in high efficiency applications with strict performance requirements.

A web can comprise a substantially continuous fiber mass and dispersed in the fiber a fiber spacer, spacer particulate or web separation means. The spacer or separation means causes the fiber web to attain a structure, in which the fiber mass or web portion, even though filled with particulate, has reduced solidity, separated fibers or separated web portions within the structure, increased the depth of the fiber web without increasing the amount of polymer or the number of fibers within the web. The resulting structure obtains improved filtration properties such as resistance to increased pressure drop, improved Figure of Merit, permeability and efficiency. Filtration efficiency is the characteristic of the filtration media that is related to the fraction of the particulate removed from the mobile stream. Efficiency is typically measured by a set test protocol defined below.

Surface loading filter media often comprise dense mats of fiber having a non-woven structure that are placed across the path of a mobile fluid stream. While the mobile fluid stream passes through the structure of the formed non-woven fibers, the particulate is typically removed from the streams at the filter surface with a certain efficiency and remains on the surface. In contrast to surface loading structures, depth media typically include a relatively (compared to surface loading media) thick structure of fiber having a defined solidity, porosity, layer thickness and efficiency. Depth media and in particular, gradient density depth media are shown in Kahlbaugh et al., U.S. Pat. Nos. 5,082,476; 5,238,474 and 5,364,456. In general, depth media act in filtration operations by impeding the particulate loading in a mobile fluid stream within the filter layer. As the particulates impinge the depth media fibrous structure, the particulate remains within the depth media and typically distributed onto and held with internal fibers and throughout the filter volume. In contrast, surface loading media typically accumulate particulate in a surface layer.

Groeger et al., U.S. Pat. No. 5,486,410, teach a fibrous structure typically made from a bicomponent, core/shell fiber, containing a particulate material. The particulate comprising an immobilized functional material held in the fiber structure. The functional material is designed to interact with and modify the fluid stream. Typical materials include silicas, zeolite, alumina, molecular sieves, etc. that can either react with or absorb materials in the fluid stream. Markell et al, U.S. Pat. No. 5,328,758, uses a melt blown thermoplastic web and a sorbtive material in the web for separation processing. Errede et al., U.S. Pat. No. 4,460,642, teach a composite sheet of PTFE that is water swellable and contains hydrophilic absorptive particles. This sheet is useful as a wound dressing, as a material for absorbing and removing non-aqueous solvents or as a separation chromatographic material. Kolpin et al., U.S. Pat. No. 4,429,001, teach a sorbent sheet comprising a melt blown fiber containing super absorbent polymer particles. Deodorizing or air purifying filters are shown in, for example, Mitsutoshi et al., JP 7265640 and Eiichiro et al., JP 10165731. While both surface loading and depth media have been used in the past and have obtained certain levels of performance, a substantial need remains in the industry for filtration media that can provide new and different performance characteristics than formerly obtained.

SUMMARY OF THE INVENTION

The web of the invention includes a fiber web and a fiber separations means or fiber spacer means. The web comprises a continuous fibrous structure with a continuous fiber phase and a fiber separation means comprising a particulate phase dispersed with the fiber. By dispersed, the particulate is fixed in the media, adhered to the fiber, held within a void space within the web or in a pocket penetrating partially into the web creating a space in the web surface. The web can be used in filtration applications as a depth media having a continuous web of fine fiber modified by the presence of a spacer or separation means in the form of a particulate that in combination with the fiber in the media, provides Figure of Merit, filtration efficiency, filtration permeability, depth loading and extended useful lifetime characterized by minimal pressure drop increase.

The invention relates to a fiber web comprising a small fiber and a fiber spacer, spacer particulate or web separation means. The web can be applied to a variety of end uses including in filtration technology. The web can be used as a filter, a filter structure wherein the fine fiber layers and fiber materials are used in filter structures and methods of filtering fluids such as air, gas and liquid streams. Fluid streams comprise a mobile phase and an entrained particulate. Such streams are often combined or contaminated with substantial proportions of one or more particulate materials. These contaminant particulate materials can vary in composition, particle size, shape, density and other physical parameters. Such particulate can be liquid, solid or can comprise composite particulates. Such particulates arise from a variety of sources, from both natural and from the man-made or built sources. The removal of some or all of the particulate material from the fluid stream is needed. For example, such streams include air intake streams to the cabins of motorized vehicles, air in computer disk drives, HVAC air, clean room ventilation and applications using filter bags, barrier fabrics, woven materials, air to engines for motorized vehicles, or to power generation equipment; gas streams directed to gas turbines; and, air streams to various combustion furnaces. In the case of cabin air filters it is desirable to remove the particulate matter for safety, comfort of the passengers and/or for aesthetics. With respect to air and gas intake streams to engines, gas turbines and combustion furnaces, removal of the particulate material is needed because particulate can reduce efficiency or can cause substantial damage to the internal workings to the various mechanisms involved. In other instances, production gases or off gases from industrial processes or engines may contain particulate material therein. Before such gases can be, or should be, discharged through downstream equipment to the atmosphere, the substantial removal of particulate material from those streams is often needed.

The web can be spun in such a way to disperse the spacer particulate or web separation means into the fiber. A preferred spacer means comprises a particulate. Such particulate can be dispersed within the polymer containing solution and the solution spun into a fiber web. The particulate can also be added to the web during formation or can be added after formation. Such a web, when electrospun, is characterized by a web or a mass of interconnected nanofibers with the separation or spacer means or particulate dispersed within and throughout the fiber web, and on the surface of the fiber web. Within the fiber web, the spacer particulate creates void spaces within the interconnected fibrous structure that reduces solidity and increases mobile fluid flow. The invention also comprises a web formed by forming a fine fiber mass with the simultaneous addition or a post spinning addition of the spacer particulate to the fiber layer. In such an embodiment, the particulate is interspersed throughout the mass of fibrous material.

The invention also involves forming the spun layer in a complete finished web or thickness and then adding the spacer or separation means or particulate to the surface of the web prior to incorporating the web into a useful article. Subsequent processing including lamination, calendaring, compression or other processes can incorporate the particulate into and through the fiber web. One advantage, of either simultaneous addition of the particulate to the web as it is formed or to the web after formation is obtained when the particulate, is a solvent soluble particulate can be used. Dissolving the soluble particulate in the solution would result in the incorporation of the material into the fiber without maintaining the particulate as a separate phase in the web. Adding the particulate to the web after formation preserves the solvent soluble material in its particulate form.

The web of the material can also have a gradient structure. In this disclosure, the term "gradient" indicates that some component (density, solidity, fiber size, etc.) of the web varies in from one surface of the web to the opposite surface of the web or web layers. The gradient can be characterized in terms of a variation in the weight or the number of fibers within a web or in a laminate of two or more media layers. A gradient can be formed in a laminate wherein each layer has a different property or character that varies in an isotropic manner through the laminate. The gradient can be formed by forming successively fewer fibers within the web as the web is formed in a single layer or laminate. Further, the concentration of spacer means or particulate can have a gradient aspect in which the size, weight or number of particulate materials per volume is substantially increased or reduced from one surface of the web to the other.

The media of the invention can be used in the form of a single fine fiber web or a series of fine fiber webs in a filter structure. The term "fine fiber" indicates a fiber having a fiber size or diameter of 0.0001 to less than 5 microns or about 0.001 to less than 2 microns and, in some instances, 0.001 to 0.5 micron diameter. A variety of methods can be utilized for the manufacture of fine fiber. Chung et al., U.S. Pat. No. 6,743,273; Kahlbaugh et al., U.S. Pat. No. 5,423,892; McLead, U.S. Pat. No. 3,878,014; Barris, U.S. Pat. No. 4,650,506; Prentice, U.S. Pat. No. 3,676,242; Lohkamp et al., U.S. Pat. No. 3,841,953; and Butin et al., U.S. Pat. No. 3,849,241; all of which are incorporated by reference herein, disclose a variety of fine fiber technologies. The fine fiber of the invention is typically electrospun onto a substrate. The substrate can be a pervious or impervious material. In filtration applications non-woven filter media can be used as a substrate. In other applications the fiber can be spun onto an impervious layer and can be removed for down stream processing. In such an application, the fiber can be spun onto a metal drum or foil.

The fine fiber layers formed on the substrate in the filters of the invention can be substantially uniform in particulate distribution, filtering performance and fiber distribution. By substantial uniformity, we mean that the fiber has sufficient coverage of the substrate to have at least some measurable filtration efficiency throughout the covered substrate. The media of the invention can be used in laminates with multiple webs in a filter structure. The media of the invention includes at least one web of a fine fiber structure. The layers can also have a gradient of particulate in a single layer or in a series of layers in a laminate The overall thickness of the fiber web is about 1 to 100 times the fiber diameter or about 0.5 to 200 microns, about 5 to 200 microns, about 10 to 200 microns or about 30 to 200 microns. The web can comprise about 5 to 95 wt % fiber and about 95 to 5 wt % spacer particulate or separation means or about 30 to 75 wt % fiber and about 70 to 25 wt % spacer particulate or separation means. The overall solidity (including the contribution of the separation means) of the media is about 0.1 to about 50%, preferably about 1 to about 30%. The solidity of the web without including the contribution of the particulate in the structure is about 10 to about 80% and the filter media of the invention can attain a filtration efficiency of about 40 to about 99.9999% when measured according to ASTM-1215-89, with 0.78µ monodisperse polystyrene spherical particles, at 13.21 fpm (4 meters/min) as described herein. The Figure of Merit can range from 100 to $10^5$. The filtration web of the invention typically exhibits a Frazier permeability test that would exhibit a permeability of at least about 1 meters-minutes$^{-1}$, preferably about 5 to about 50 meters-minutes$^{-1}$ When used as a separation means, the particulate that characterizes the particulate phase of the web of the invention is a particulate that is either inert to the mobile phase and the entrained contaminant load or has some defined activity with respect to the mobile fluid or the load.

For the purpose of this invention, the term "media" includes a structure comprising a web comprising a substantially continuous fine fiber web or mass and the separation or spacer materials of the invention dispersed in the fiber web, mass or layer. In this disclosure, the term "web" includes a substantially continuous or contiguous fine fiber phase with a dispersed spacer particulate phase substantially within the fiber. A continuous web is necessary to impose a barrier to the passage of a particulate contaminant loading in a mobile phase. A single web, two webs or multiple webs can be combined to make up the single layer or laminate filter media of the invention.

The particulate materials of the invention have dimensions capable of improving the filtration properties of the media and layers of the invention. The materials can be made of a variety of useful materials. The materials can either be substantially inert to the mobile phase and entrained particulate load passing through the web or the materials can interact with the fluid or particulate loading. For the purpose of this invention, the term "inert" indicates that the material in the web does not either substantially chemically react with the fluid or particulate loading or substantially physically absorb or adsorb a portion of the fluid or the particulate loading onto the particulate in any substantial quantity. In this "inert" mode, the spacer particulate simply alters the physical parameters of the fiber layer and the media including one or more fiber layers. When using a particulate that interacts with the fluid or the particulate loading, the particulate can, in addition to altering the physical properties of the media or layers, react with or absorb or adsorb a portion of either the mobile fluid or the particulate loading for the purpose of altering the material that passes through the web. The primary focus of the technology disclosed herein is to improve the physical structure of the media or layers and to improve filter performance. For that purpose, an inert particle can be used. In certain applications, a substantially inert particle can be used in combination with a particulate that interacts with the mobile phase or particulate loading. In such application, a combination of an inert particle and an interactive particle will then be used.

The preferred fiber separation means comprises a particulate. Such a particulate, used in the unique filter structures of the invention, comprises a typically substantially inert or inactive particulate. Such particulates simply occupy space within the filter layer or mat, reduce the effective density of the fiber, increase the torturous pathways of the fluid through the filter and fail to either react with the fluid or absorb materials from the fluid. Alternatively, the particulate can provide the mechanical space holding effect while additionally chemically reacting with the mobile fluid or adsorbing or absorbing gaseous, liquid or solid components in the mobile fluid.

BRIEF DISCUSSION OF THE FIGURES

FIGS. 1 through 3 and 5 through 6 are photomicrographs detailing the web, fiber mass, particulate dispersed in the filter layers, and the continuous structures of the invention. The Figures illustrate the improved filter structure by separating the fine fiber, increasing the fluid paths while maintaining small pore size.

FIG. 7b is a particle size distribution of the spacer particle material shown in FIGS. 10-13 and 14-15.

FIG. 14 shows the nanofiber with spacer particulate, while FIG. 15 shows the nanofiber composite on a support layer.

Figure 19:
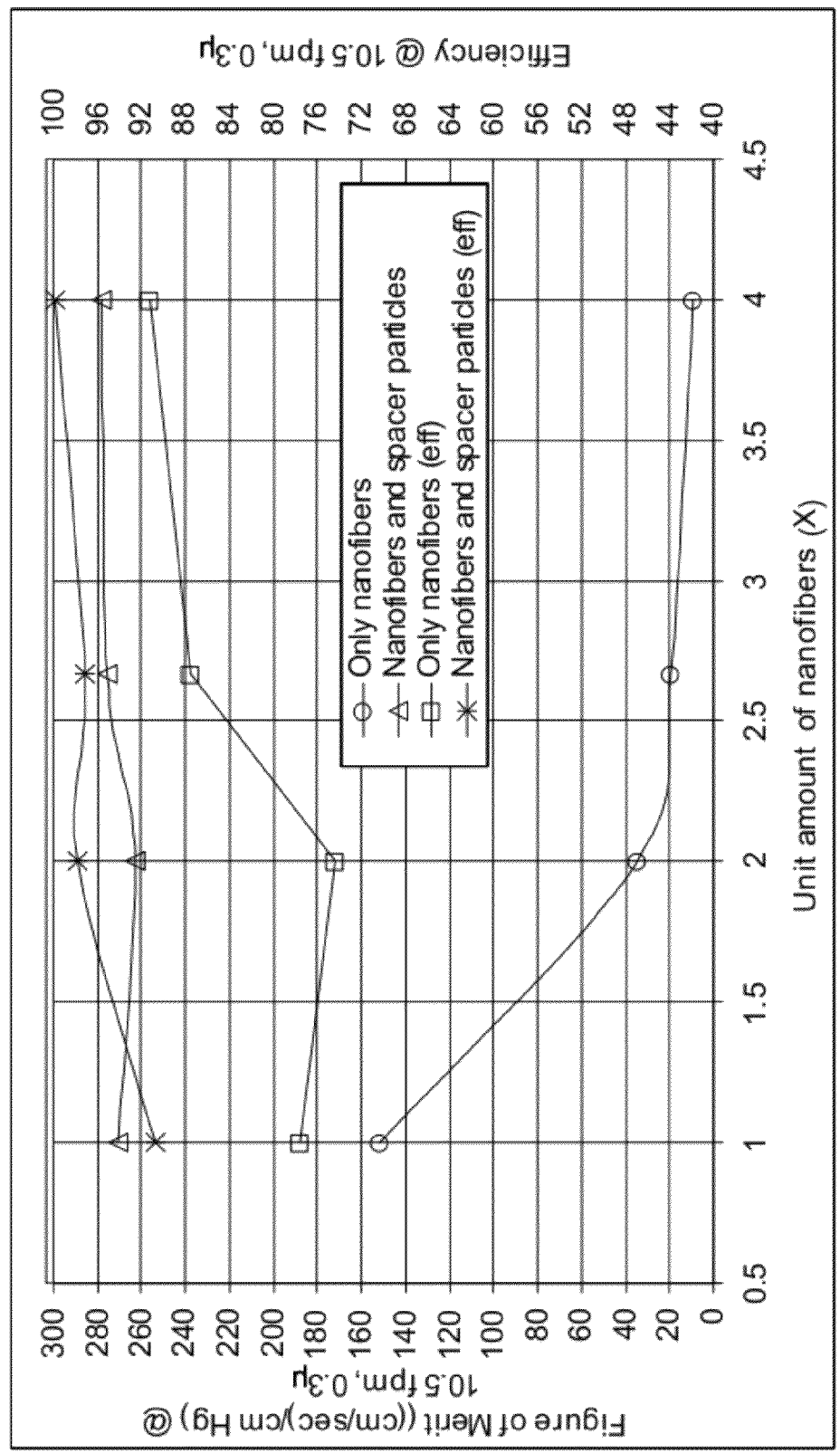
Figure 20:
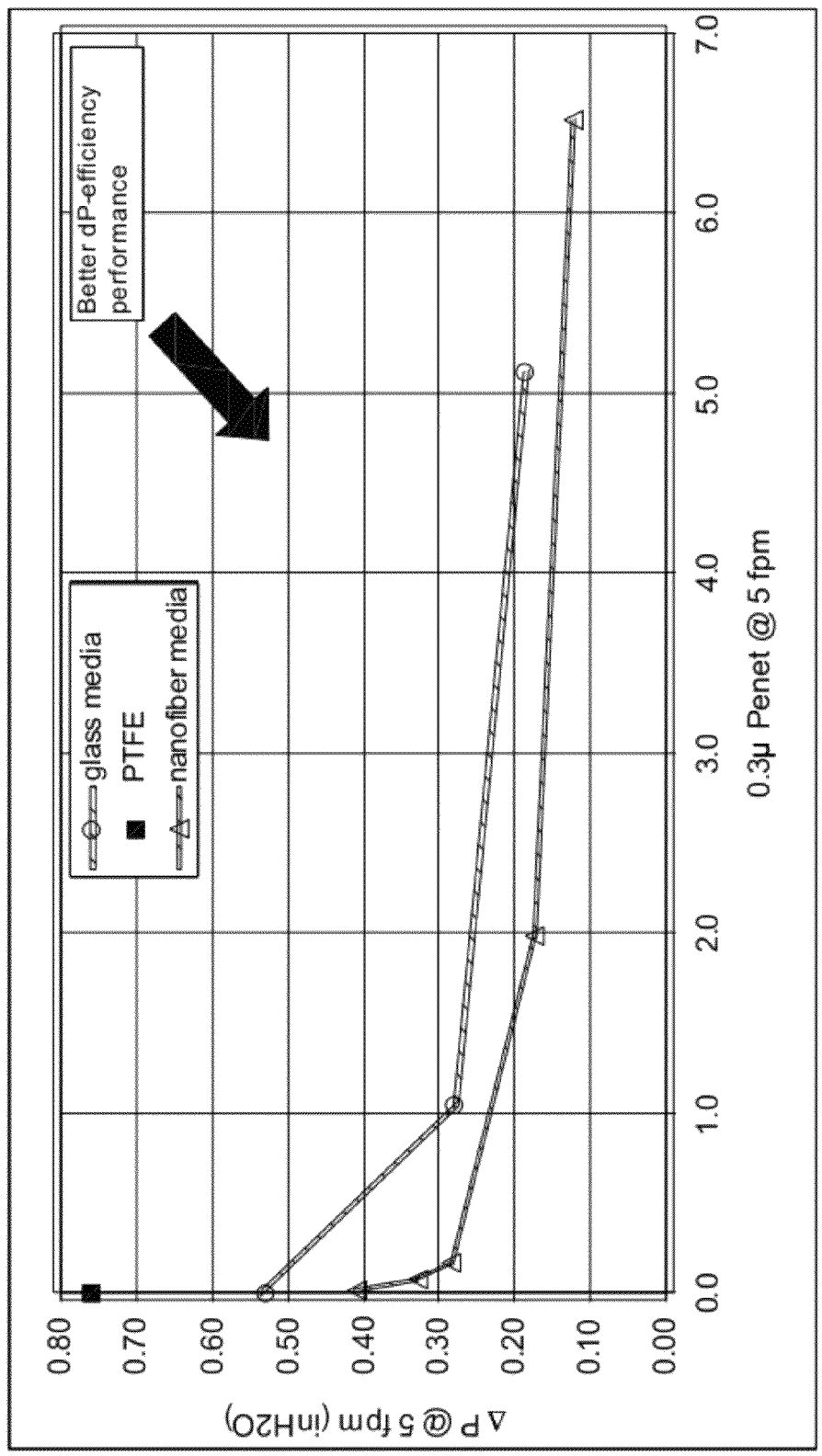

FIG. 19 shows the influence of the amount of nanofiber in the composite with and without the presence of spacer particulate at 10.5 ft-min$^{-1}$ face velocity using 0.3 micron DOP particle. The graph clearly shows that the composites containing nanofibers and spacer particles have substantially increased Figure of Merit and efficiency, while the nanofiber only layer does not have adequate efficiency.

FIGS. 16, 17, 18, 19, 20, 21, 22, 24 and 25 shows the improvement in pressure drop, efficiency, Figure of Merit, etc. as a function of penetration [−Ln(penetration)] at 5, 10.5 and 18 ft-min$^{-1}$ face velocities respectively and 0.3 micron DOP particle size for three different materials. The nanofiber media containing the particulate spacer shows improved performance substantially over the glass media and improved with respect to PTFE media.

Figure 23:
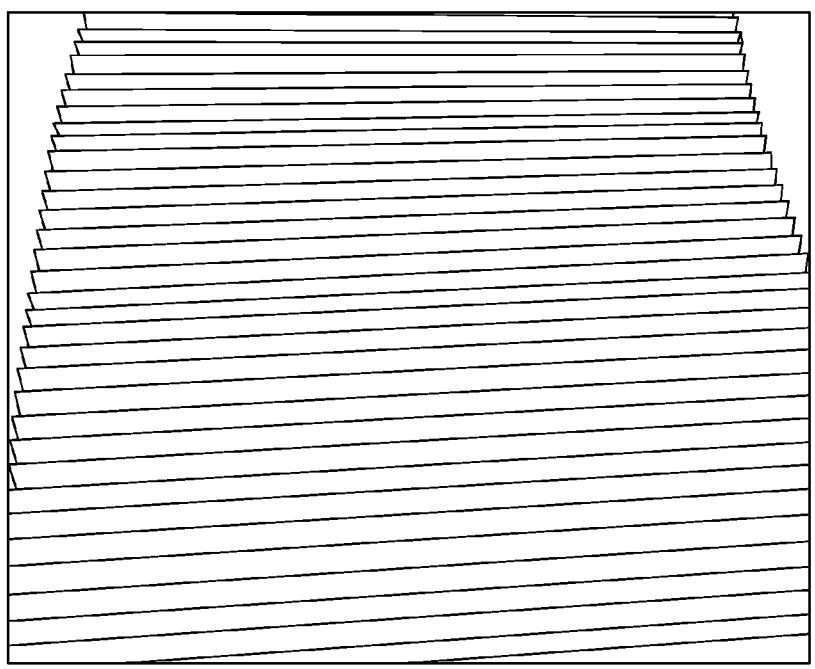
Figure 24:
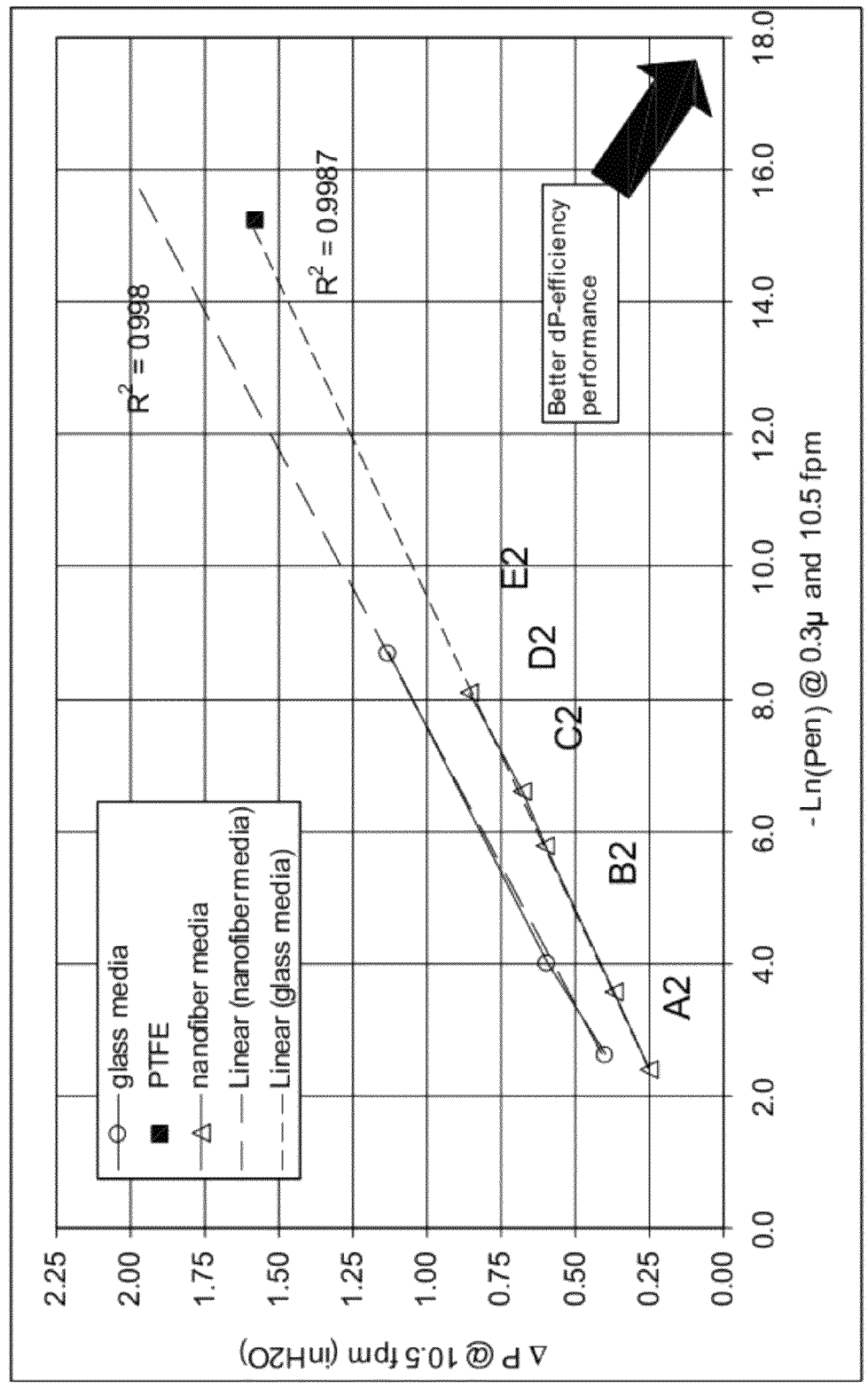

FIG. 23 is a photograph showing a plan view of the media of the invention.

Figure 26:
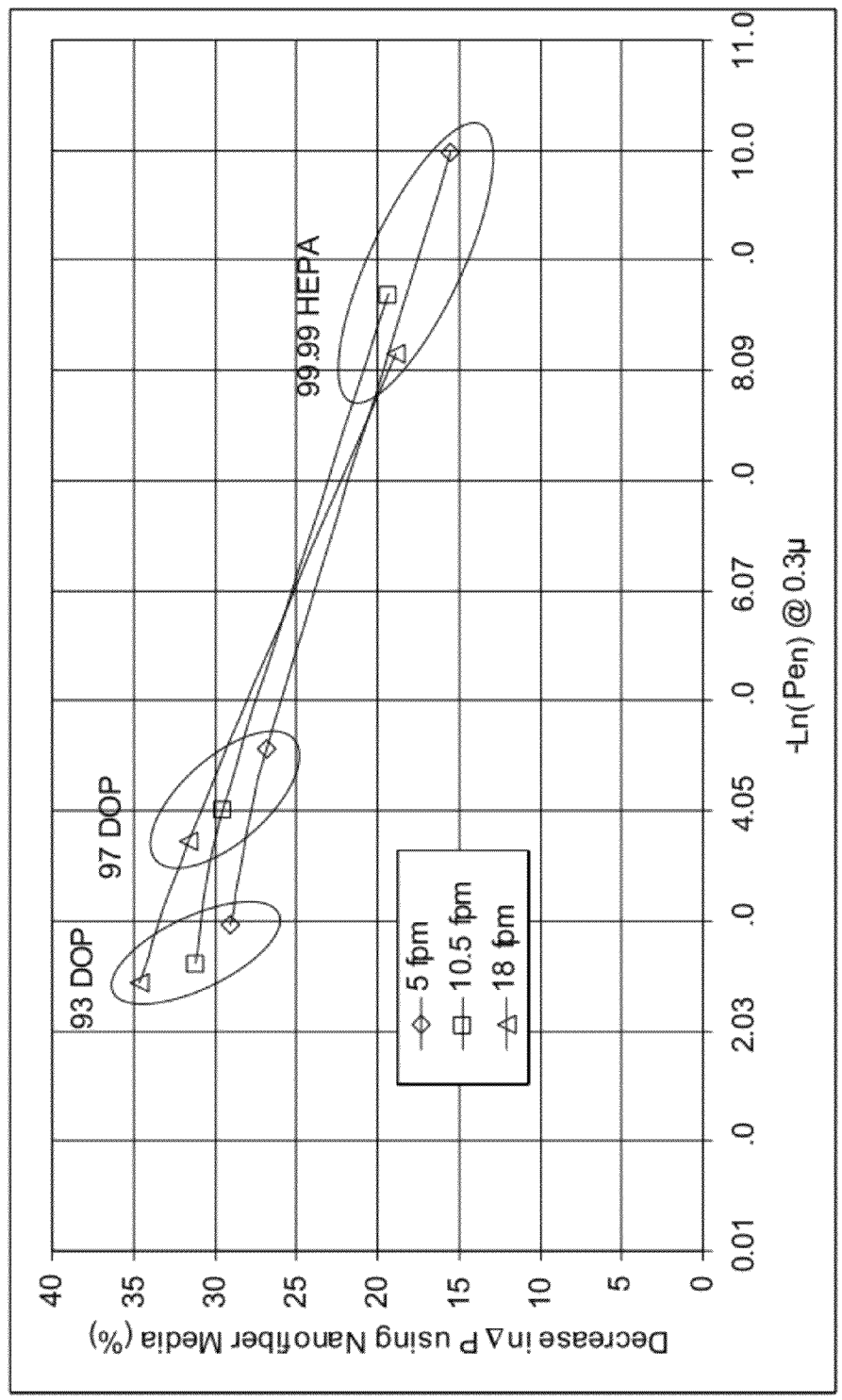

FIG. 26 shows a decrease in initial pressure drop of glass media for the same level of efficiency using the nanofiber media at three different face velocities. In other words, the use of the nanofiber media of the invention reduces initial pressure drop for these media having different initial efficiencies.

Figure 27:
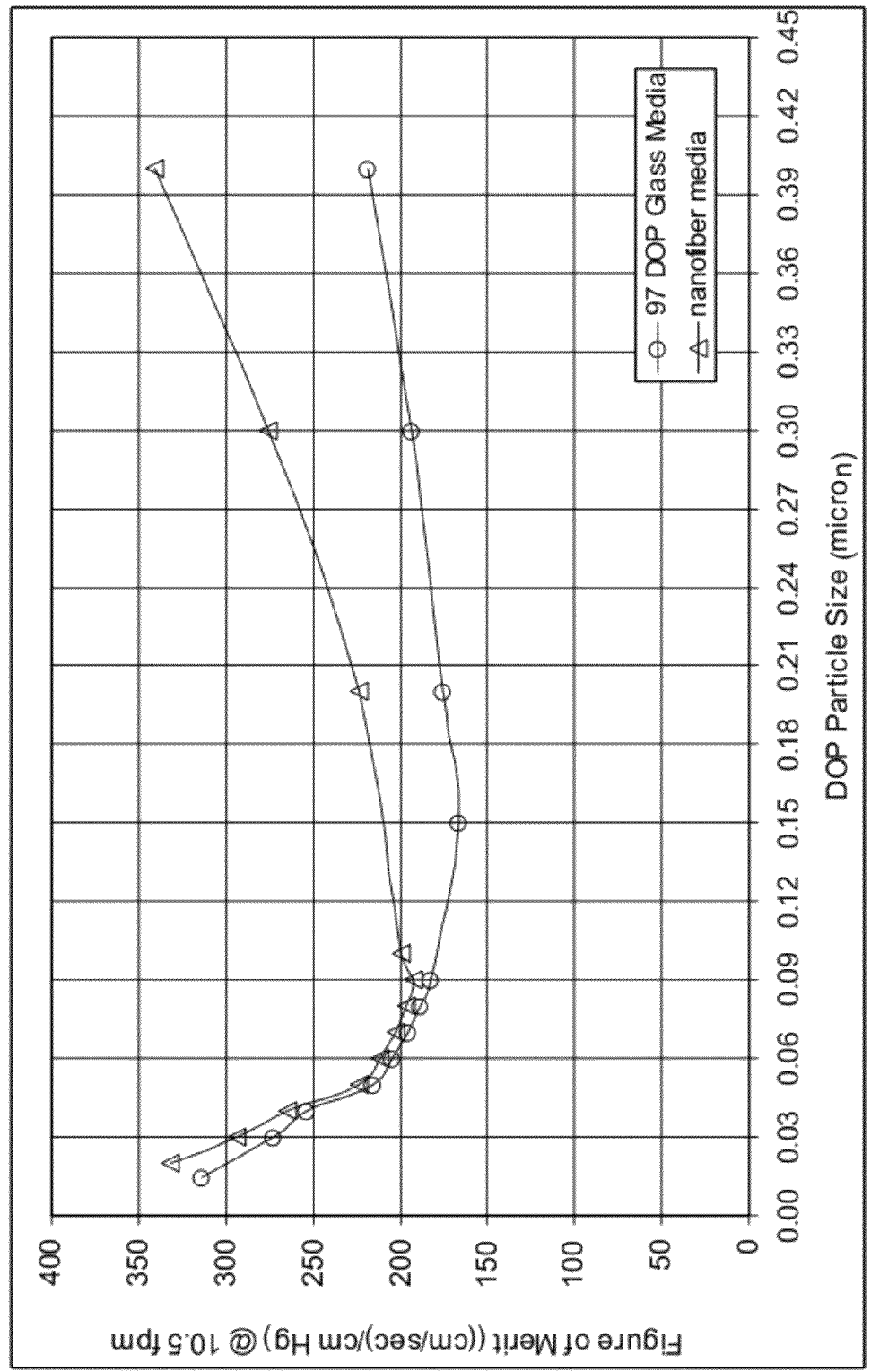

FIG. 27 shows Figure of Merit as a function of particle size for 97 DOP glass media and nanofiber composite equivalent.

Figure 28A:
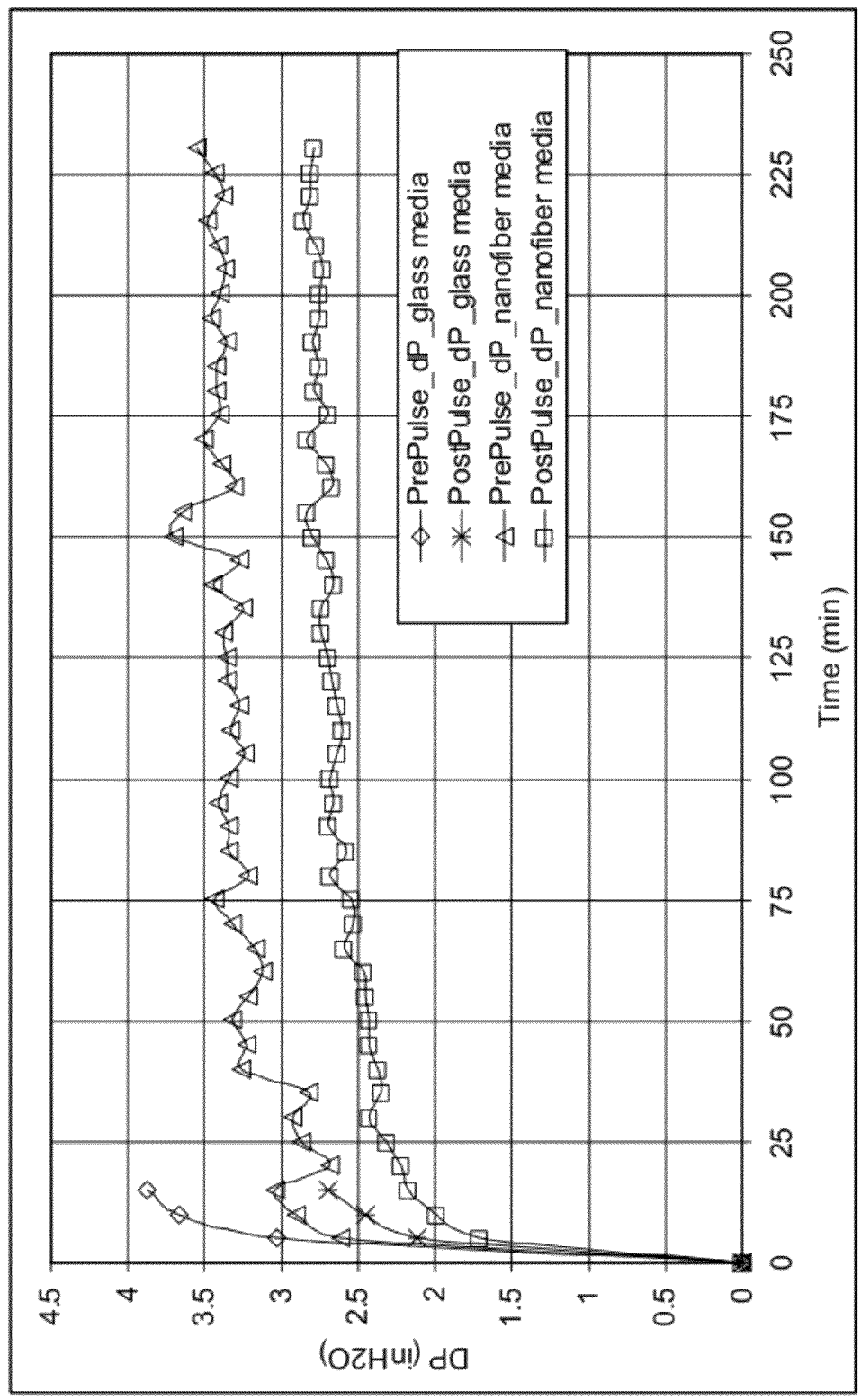

FIG. 28A shows pressure drop versus time for media with a glass fiber layer and media with a nanofiber layer. The glass fiber media quickly exceeds pressure limits.

Figure 28B:
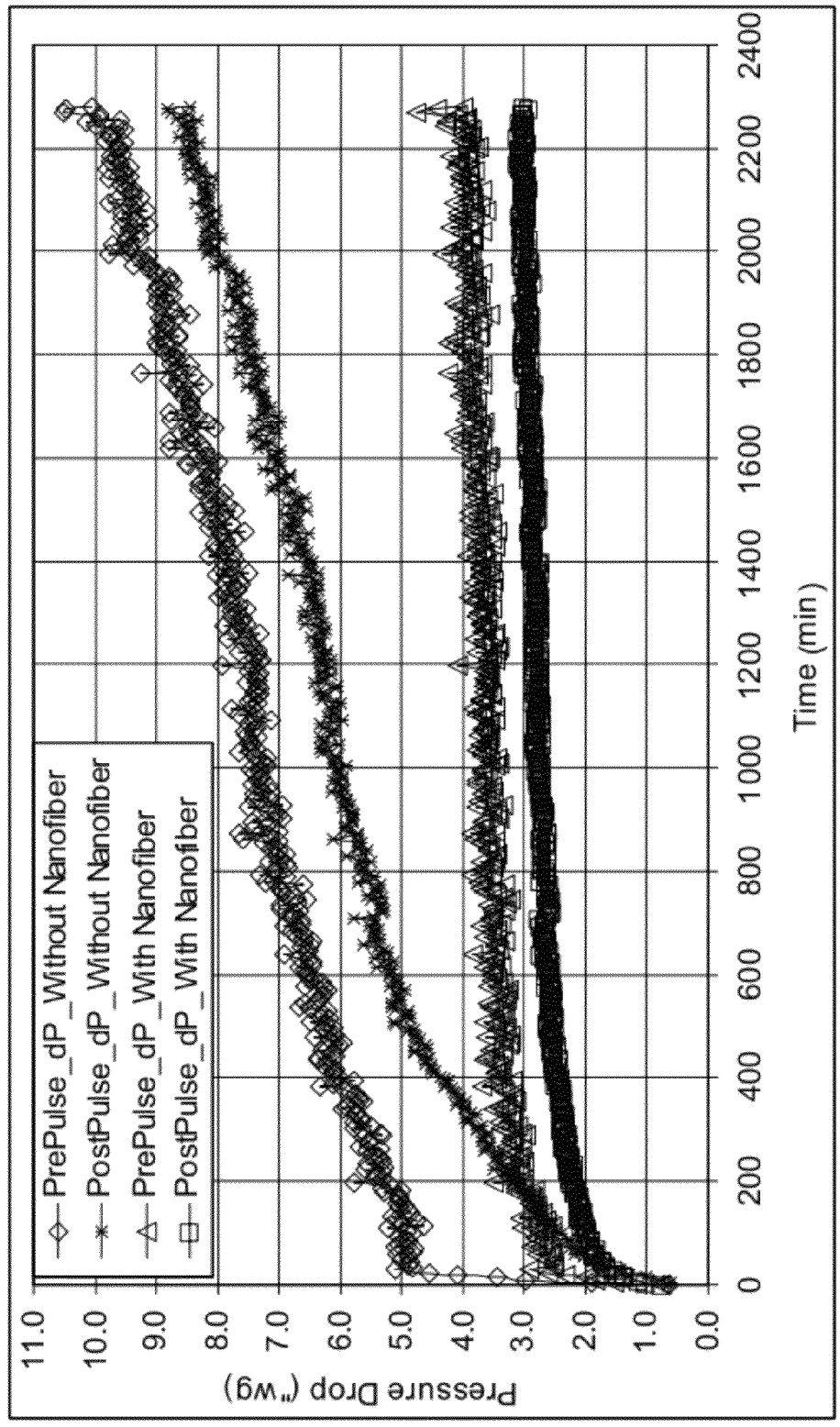

FIG. 28B similarly shows increased (compared to nanofiber) glass pressure drop versus time for an extended period.

Figure 29:
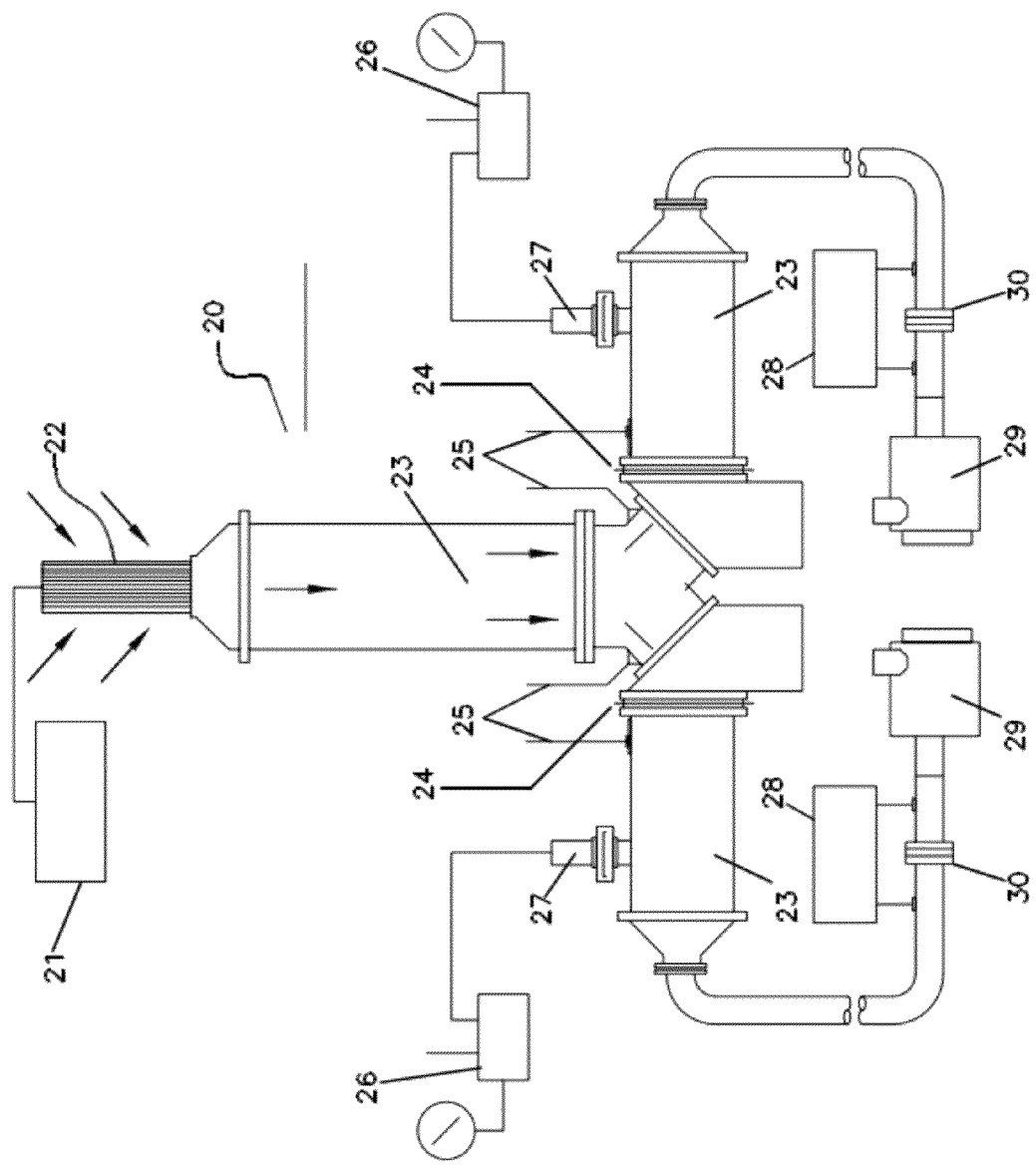

FIG. 29 is a twin media pulse test bench used to develop the pulse cleanability data of FIGS. 28a and 28b.

Figure 30:
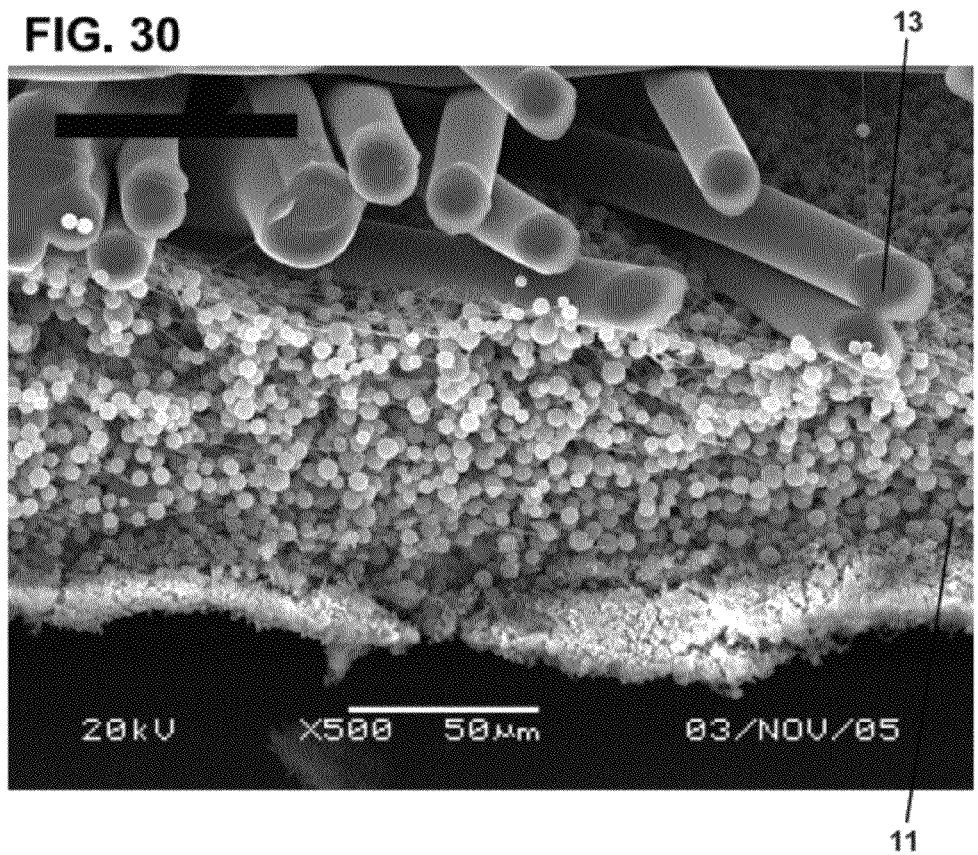
Figure 31:
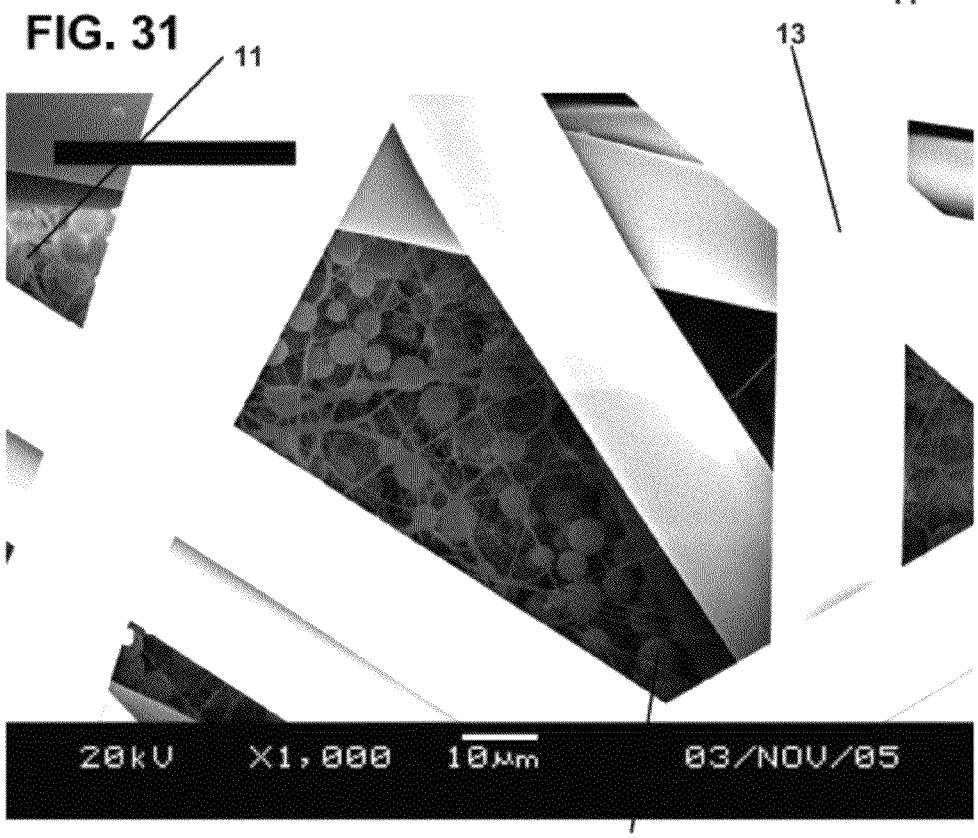

FIGS. 30 and 31 show a cross sectional view and a view from the downstream side of the nanofiber composite after testing on a pulse-cleaning bench showing that the composite layers can be effectively cleaned without substantial harm.

Figure 32:
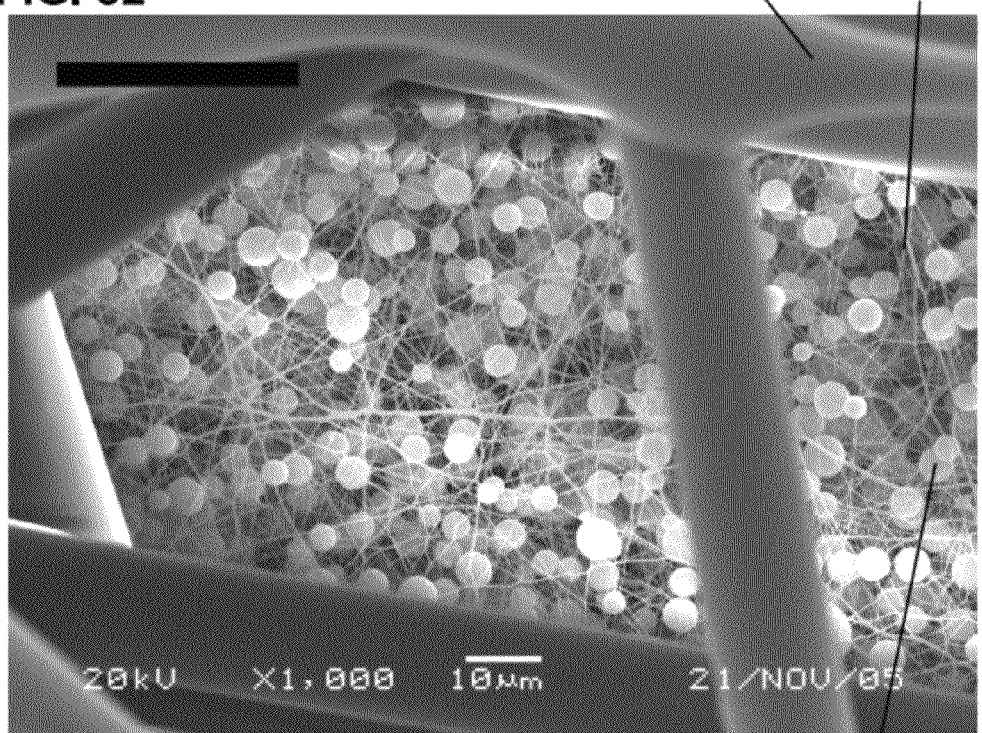
Figure 33:
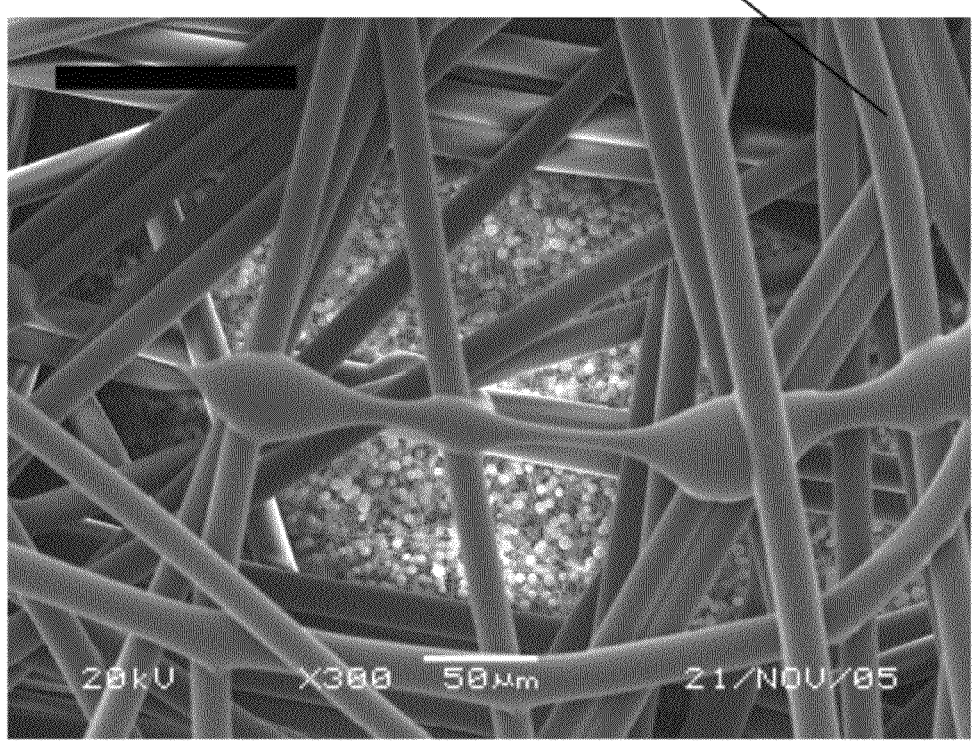

FIGS. 32 and 33 show high and low magnification SEM images of the pleated nanofiber/spacer particle media with scrim in a composite structure. The portion shown in the SEM's is the pleat bend showing that the media can be effectively laminated and pleated without substantial harm to the structure.

Figure 34:
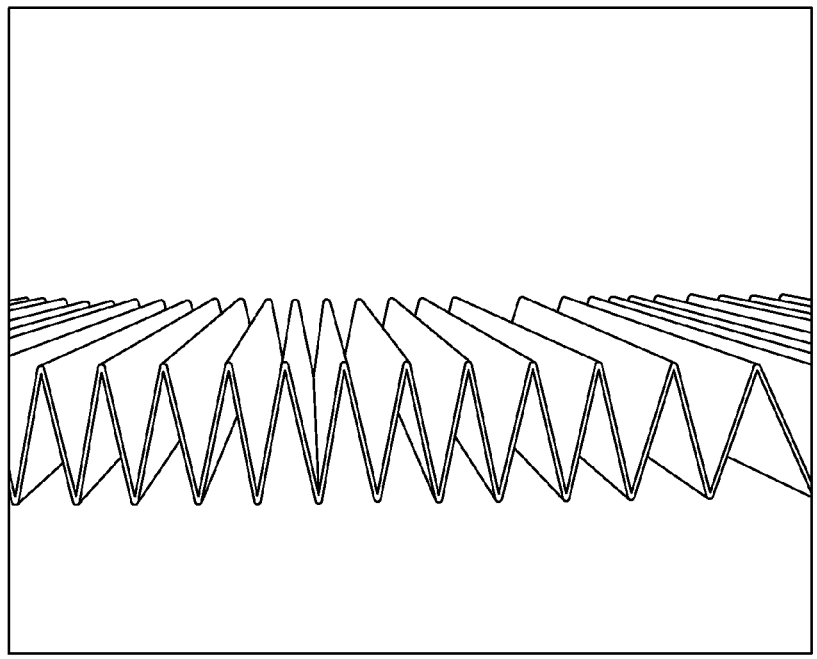
Figure 35:
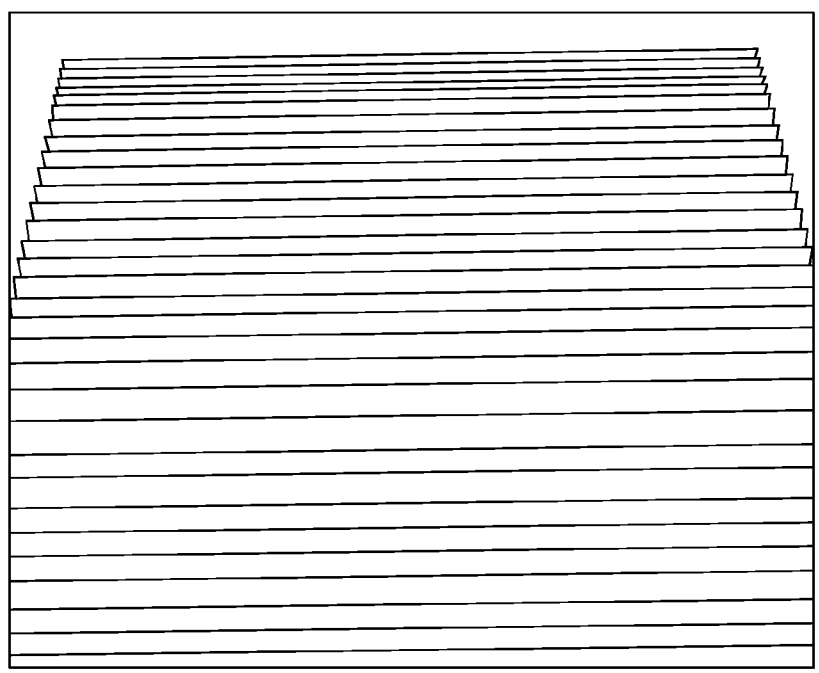

FIGS. 34 and 35 show the pleated nanofiber/spacer particle media of the invention.

Figure 36:
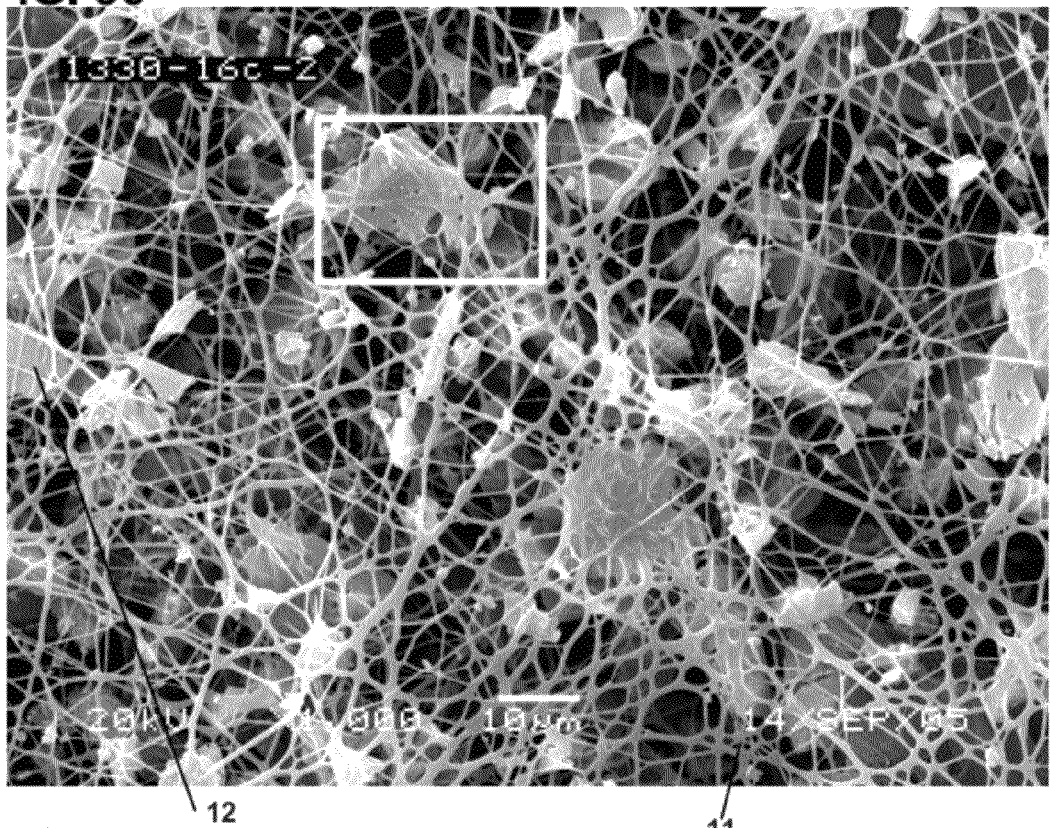

FIG. 36 is an SEM of particles entrapped in the nanofiber matrix. This sample is viewed after heating at 230° F. for 5 minutes. The SEM shows clear adhesion of the particulate to the web nanofiber indicating that the particulate is fixed in the web and cannot be mechanically removed without substantial disruption of the composite structure.

Figure 37:
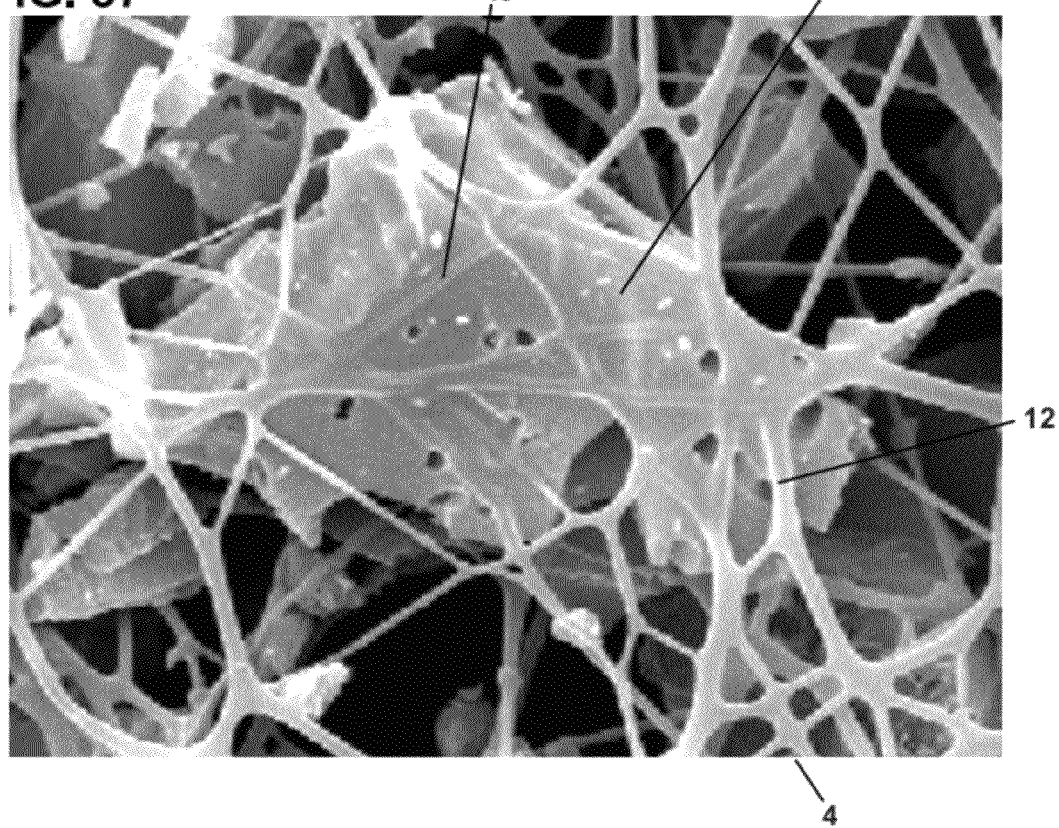

FIG. 37 is an increased magnification of a portion of FIG. 36 showing excellent nanofiber to particle adhesion.

Figure 38:
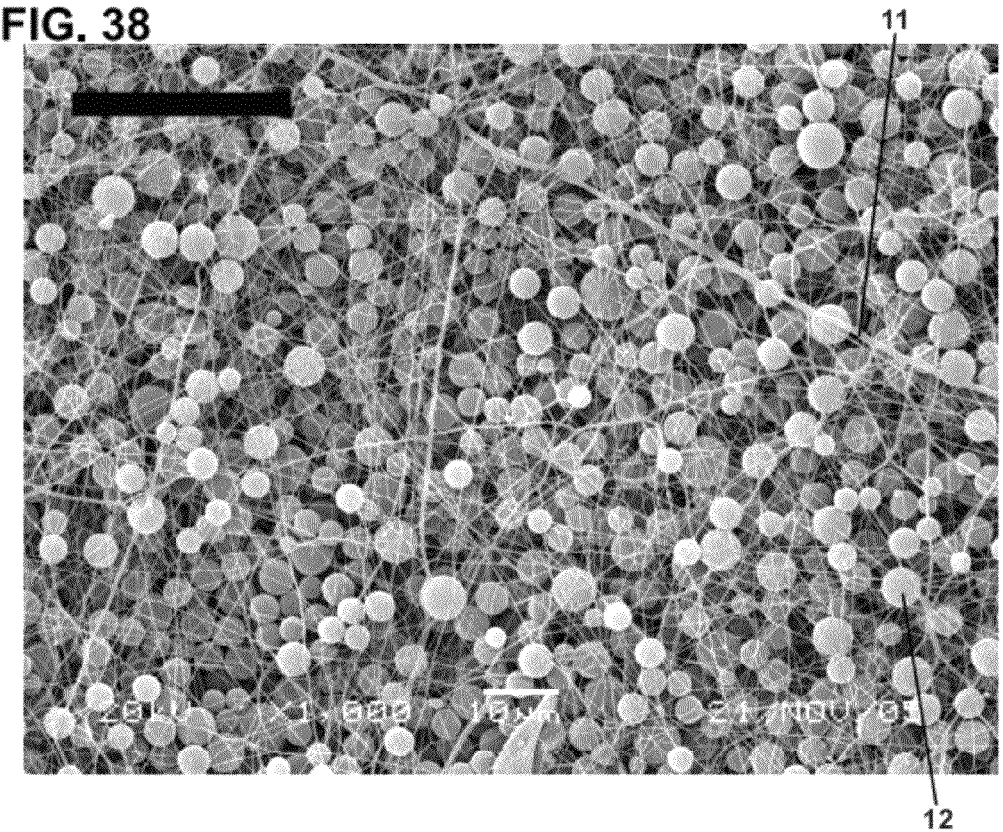
Figure 39:
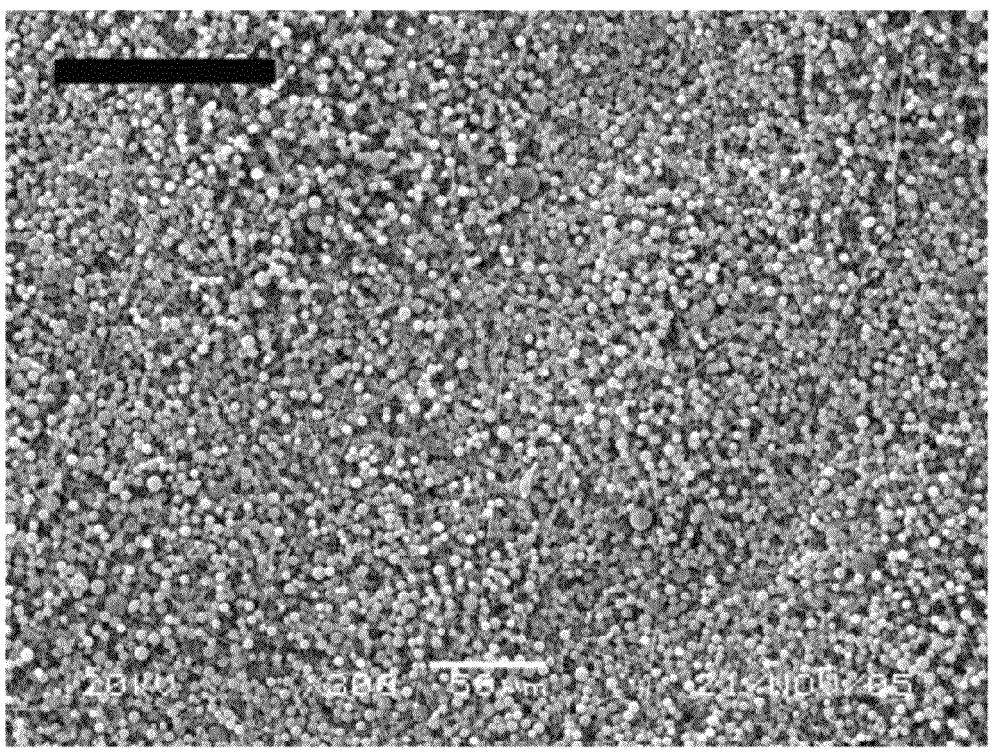

FIGS. 38 and 39 show high and low magnification SEM images of the pleated nanofiber media after the protective liner is removed from the nanofiber surface. The portions of the media shown in the SEM's are the pleat tips showing that pleating does not disrupt the nanofiber structure.

Figure 40:
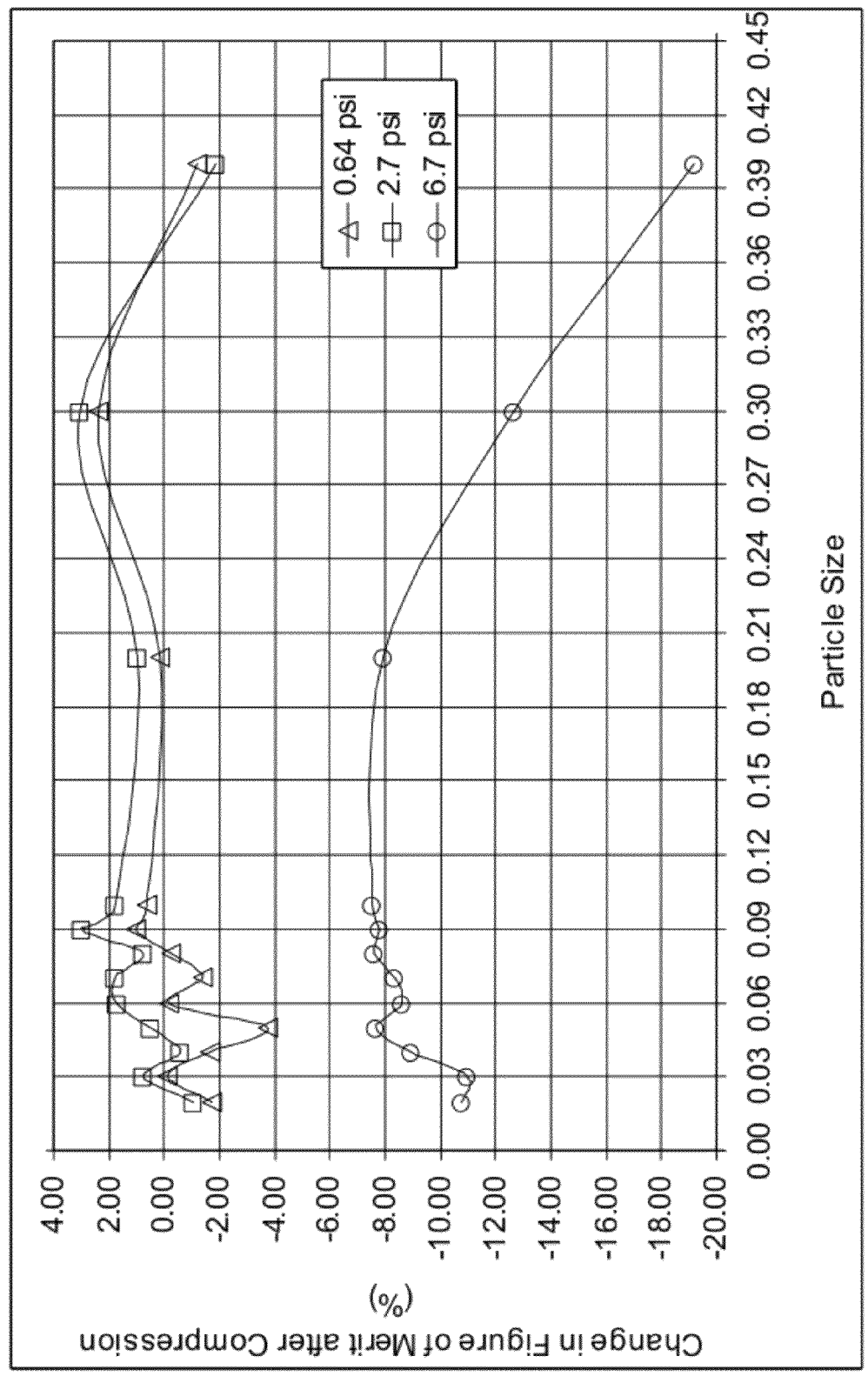

FIG. 40 displays graphically a change in Figure of Merit as a function of compression for the range of DOP particle size at 10.5 ft-min$^{-1}$ face velocity at a variety of pressures.

Figure 41:
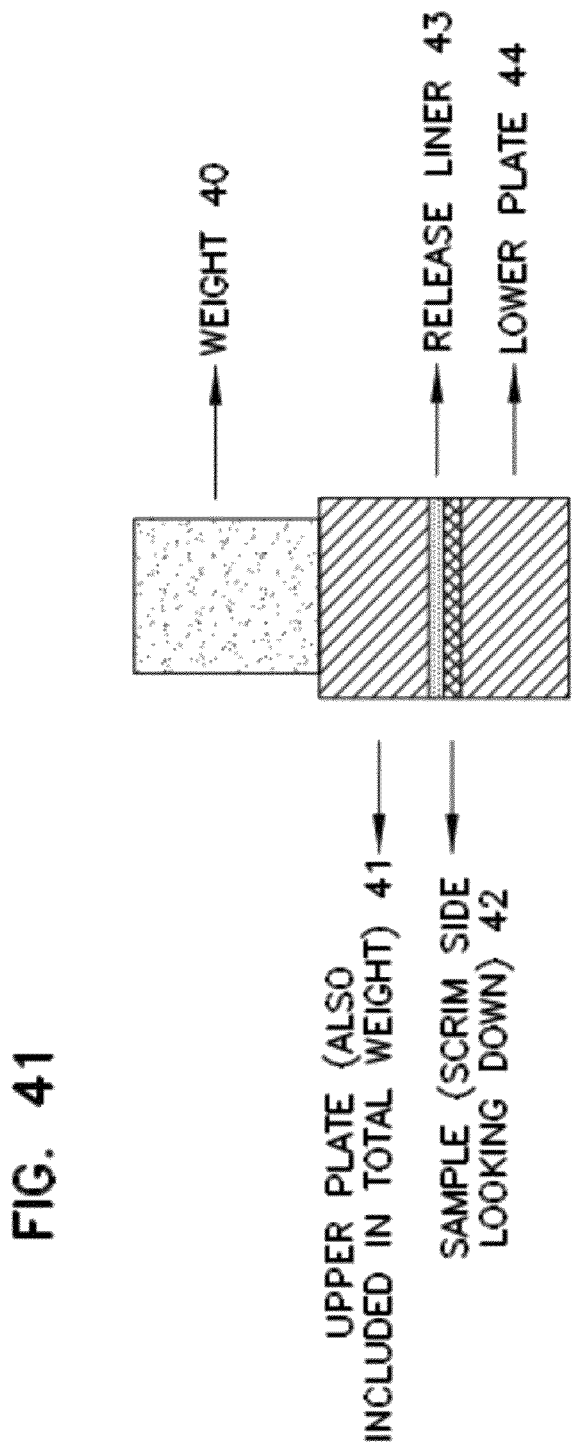

FIG. 41 shows the test equipment used to compress the nanofiber media under a known amount of load used in developing the data shown in FIG. 40.

DETAILED DISCUSSION OF THE INVENTION

We have found that the spacer particulate of the invention included in the layers of the invention, surprisingly improve filtration performance even while occupying the fiber layers in large proportion. The inclusion of the spacer particulate increases the layer thickness and reduces the fiber solidity while occupying a substantial portion of the volume of the layer. Experimental results are shown below of high efficiency nanofiber particulate matrices. These have been produced by either adding particulate or nanofibers sequentially to an existing high efficiency substrate or by making high efficiency structures from a web of nanofibers and spacer particles (particulate) that are made simultaneously. The efficiency and pressure drop data are benchmarked against commercially available glass and PTFE media, results from subsequent testing, which include durability, cleanability and pleatability assessment of the high efficiency nanofiber media are shown.

Nanofibers can aid in providing new capability and properties in air filtration. There have been two primary functions for polymeric nanofiber webs historically used in filtration applications. First, very thin nanofiber webs have often been applied to lower-efficiency substrate media. These substrate media typically have good handling characteristics and economics, with relatively poor filtration efficiencies. The addition of nanofibers to the surface enhances the efficiency of the base material, creating a composite media with good handling properties and good efficiency for many industrial and engine-related applications. Another way to achieve the same result is through the application of charged meltblown fibers to the surface of the base material. However, since the efficiency of a nanofiber web is achieved through purely mechanical filtration mechanisms, it does not degrade under varying environmental conditions as charged meltblowns are prone to do. Furthermore, the nanofiber web is extremely thin in comparison to a charged meltblown layer, which is an advantage in many applications. Second, polymeric nanofiber webs have been used to improve the surface loading behavior of typical filtration materials. Many filter media exhibit depth loading characteristics when exposed to industrial dust environments. Over time, particulate matter becomes deeply embedded in the fibrous structure of the media, eventually preventing adequate airflow. When a polymeric nanofiber web is applied to the upstream (dirty) side of a filter media, the particulate matter is largely caught on the surface of the nanofiber web. The surface-loading behavior allows for a filter to be cleanable through standard mechanisms like backward pulsing or shaking Other materials that exhibit similar surface-loading behavior tend to have substantially lower permeabilities, such as expanded PTFE membrane media. A composite media including a thin polymeric nanofiber web coating causes surface loading behavior in many applications, with higher permeability than is achievable using other conventional surface-loading materials. Small fibers in the submicron range, in comparison with larger ones, are well known to provide better filter efficiency at the same pressure drop in the interception and inertial impaction regimes due to internal structure and solidity. For fibers in the nanometer range, the effect of slip flow at the fibers surface has to be taken into account. In slip flow, the air velocity at the fiber surface is assumed to be non-zero. Due to the slip at the fiber surface, drag force on a fiber is smaller than that in the case of non-slip flow which translates into lower pressure drop. On the other hand, the slip flow makes the portion of the air flowing near the fiber surface larger than that in the case of non-slip flow, which translates into more particles traveling near the fiber, resulting in higher diffusion, interception and inertial impaction efficiencies (Graham et al., *Polymeric Nanofibers in Air Filtration Applications*, Fifteenth Annual Technical Conference & Expo of the American Filtration & Separations Society, Galveston, Tex., 2002).

Figure 9:
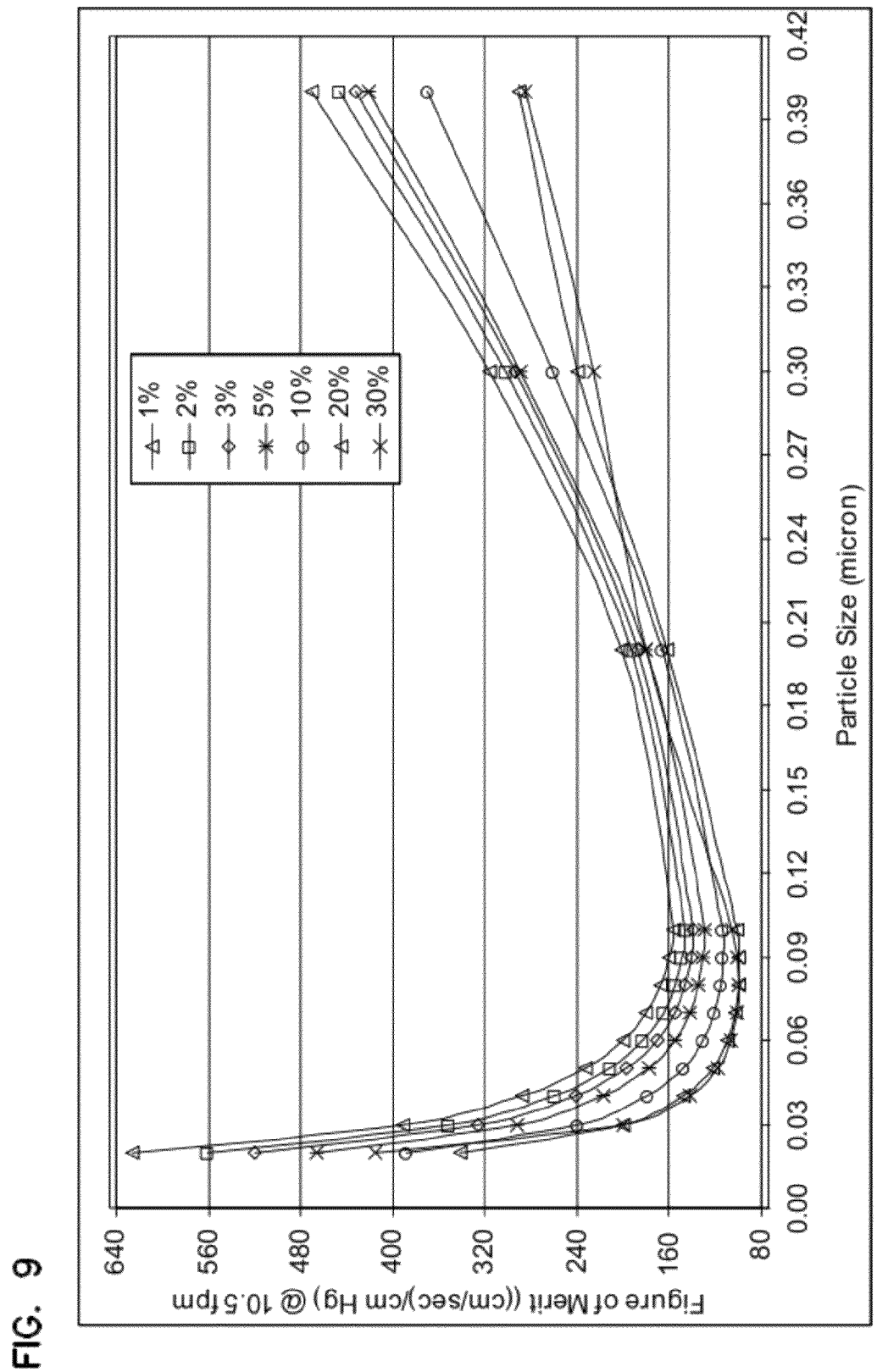
FIG. 9 is a graphical representation of the Figure of Merit as a function of particle size for different solidities for the nanofiber media of the invention at 10.5 ft-min$^{-1}$. These data are developed using a quantitative mathematical model built on modeling equations for the filtration technology.

The role of solidity in filtration is more complicated, as it affects both pressure drop and efficiency in the same direction. When solidity increases, drag per unit length of fibers increases, so is single fiber efficiency due to diffusion and interception. Note that only diffusion and interception are considered here for high efficiency applications as they are the dominant mechanisms near the most penetrating particle size. When solidity of filter media increases, the pressure drop increases at a much faster rate than single fiber efficiency due to either diffusion or interception does, based on equations cited by R. C. Brown (1993). Within the vicinity of most penetrating particle size, Figure of Merit decreases with increased solidity. A quantitative mathematical model based on similar equations confirms this improvement. FIG. 9 shows a calculated Figure of Merit as a function of particle size for different solidities for nanofiber media at 10.5 fpm. For a description of Figure of Merit, see the discussion below.

It should be noted that, for particles much larger than most penetrating particle size, it is possible that combined single fiber efficiency due to interception and inertial impaction can increase faster than pressure drop does. Thus, Figure of Merit could increase as solidity increases for much larger particles.

That said, for most practical applications, to achieve high efficiency at the most penetrating particle size, one will want to space nanofibers to make effective solidity of filter media low whenever it is possible.

High efficiency polymeric nanofibers can be made using a variety of different technologies; one of such processes is the electrohydrodynamic solution spinning or more commonly known as electrospinning.

Electrospinning technology utilizes electrical charges to deform, accelerate and elongate a volume of polymer solution into a fibrous shape. Typically, the solution is held at the tip of a capillary by its surface tension and subjected to a strong electric field generated between a ground potential and the charged volume of polymer solution. Tremendous reduction in diameter takes place during the transition from a relatively large cone shape into a fiber due to the nature of the jet's bending instability, which provides chaotic trajectory as the jets whips along the spin-line. By choosing a suitable polymer and solvent pair, fibers with diameters in the range of 40-2000 nm can be made. Fiber diameters can be varied and controlled. Electrospinning process fundamentals and polymer capabilities can be widely found in the scientific literature and patents (see Chung et al., U.S. Pat. No. 6,743,273).

Nanofibers in high efficiency configurations have been constructed by making high efficiency structures from nanofibers and spacer particles.

Air flow capacity, which is a function of resistance, or pressure drop across the filter and particle loading, decreases as the dust cake forms on the filter. Consequently, with the dust cake formation the resistance to flow increases. Since microfiber glass HEPA filters are typically not cleaned, the air flow rate continues to decrease as the system operates. After the resistance across the filter reaches a threshold limit that prevents adequate air flow, the filter must be replaced. For these reasons, HEPA filters are used in applications that have low air flow rates or have low concentrations of particulate matter and typically installed as the final component, downstream from other particulate matter collection devices.

Due to their extremely high aspect ratio, nanofibers typically do not stack on top of each other in discrete layers. Instead, when the amount of nanofibers in a given surface area is very high, they tend to fuse to each other and result in a membrane-like structure that limits the air flow capacity without providing high levels of particulate efficiency.

We have utilized a spacer particulate in the form of polymeric microspheres in an attempt to space the nanofibrous layers apart from each other. By doing so, the solidity of the structure has decreased and the air permeability increased significantly. In addition, the multi-layered structure resulted in a tortuous path for air flow causing a marked increase in the capture efficiency of challenge particles.

The invention relates to polymeric compositions in the form of fine fiber such as microfibers, nanofibers, in the form of fiber webs, or fibrous mats used with a particulate in a unique improved filter structure. The web of the invention comprises a substantially continuous fiber phase and dispersed in the fiber mass a fiber separation means. In the various aspects of the invention, the fiber separation means can comprise a particulate phase in the web. The particulate can be found on the surface of the web, in surface products or throughout void spaces formed within the web. The fibrous phase of the web can be formed in a substantially singular continuous layer, can be contained in a variety of separate definable layers or can be formed into an amorphous mass of fiber having particulate inclusion phases throughout the web randomly forming inclusion spaces around the particulate and internal web surfaces. The particulate has a major dimension of less than about 200 microns, and typically comprises about 0.05 to 100 microns or comprises about 0.1 to 70 microns. In the substantially continuous fine fiber layer the layer has a layer thickness of about 0.5 to 500 microns, about 1 to 250 microns or about 2 to 200 microns. In the layer, dispersed in the fiber is a spacer means comprising a particulate with a particle size of about 0.25 to 200 microns, about 0.5 to 200 microns, about 1 to 200 microns about 10 to 200 or about 25 to 200 microns. The particulate is dispersed throughout the fiber in the layer. The particulate is present in an amount of about 0.1 to 50 vol %, about 0.5 to 50 vol %, about 1 to 50 vol %, about 5 to 50 vol % or about 10 to 50 vol %. The fiber having a diameter of about 0.0001 to about 2 microns, and the layer having a fine fiber solidity of about 0.1 to 50%, about 0.5 to 30%; about 1 to 20%.

The particulate can take a variety of regular geometric shapes or amorphous structures. Such shapes can include amorphous or random shapes, agglomerates, spheres, discs, ovals, extended ovals, cruciform shapes, rods, hollow rods or cylinders, bars, three dimensional cruciform shapes having multiple particulate forms extending into space, hollow spheres, non-regular shapes, cubes, solid prisms of a variety of faces, corners and internal volumes. The aspect ratio of the non-spherical spacer particulate (the ratio of the least dimension of the particle to the largest dimension) of the invention can range from about 1:2 to about 1:10, preferably from about 1:2 to about 1:8.

The use of the particulate in the fiber mat or layer increases the inter fiber average spacing, improves the flow of fluid through the fiber mass and increases efficiency. The polymeric materials of the invention comprise a composition that has physical properties that provide improved permeability, efficiency and service lifetime in the unique filter structure.

As discussed above, the separation means particulate of the invention can be substantially inert to both the mobile phase and the entrained particulate phase.

The separation means particulate phase of the invention can contain a blend of particulate inert to the mobile phase and entrained contaminant and particulate that is either interactive or reactive with the mobile or entrained particulate phase. These materials can be blended at any proportion that is satisfactory to the invention. However, typically such a particulate is present to obtain the particulate phase in the web that result in the improved filtration properties of the webs of the invention. In one aspect of the invention, the preferred web contains particulates that are inert to the mobile phase or to the entrained contaminant materials. Such inert materials simply introduce improved filtration properties to the web and avoid any interaction with the mobile phase or the entrained particulate phase.

The invention relates to multilayer fine fiber media with improved filtration properties that can be used in a variety of applications including fluid filtration of air streams, other gaseous streams and aqueous and non-aqueous liquids. Fibrous layers with fiber in a filter structure can have high filtration efficiency since pore size within the fiber layer can obtain small pore size. The particulate helps maintain small pore size but can increase flow through the filter layer(s). Filter media processing and manufacturing methods can obtain a defined pore size, generally, with a defined filter fiber. The density of the fiber in the filter structure cannot exceed a certain limit without adversely affecting permeability. In such applications, fiber cannot exceed a certain diameter without resulting in substantial restriction on fluid flow reducing permeability.

The fiber separation means particulate is in the form of a sphere, fiber or other geometric shape having a size greater than the diameter of the fiber. The ratio of the major dimension of the fiber separation particulate to the diameter of the fiber structure is about 2 to about 10000:1 or about 10 to 1000:1. The resulting web in a pathway for the filtered fluid that is tortured as it passes through each layer in the filter mat. Such a torture path minimizes the restriction of the fluid flow (increases permeability) but does not reduce efficiency of the media because the fluid is required to follow a complex flow pattern and thus pass through larger numbers of restrictive pore structures. As a result, the contaminant load in the mobile fluid is efficiently removed from the fluid flow while the fluid experiences little or no restriction (reduce permeability) as the filter removes the particulate loading. Removed particulate remains within the volume of the filter media.

While the association of fiber and particulate is designed to obtain a certain filtration efficiency permeability and thickness to the filter media and filter layers, the particulate can provide a variety of other properties including chemical reactivity, chemical adsorptivity or absorptivity, magnetic properties, bioaffinity or bioseparation, slow release of materials in the presence of a fluid flow or other properties related to the composition, shape or size of the particulate.

The thick web can result in a fiber mass having improved durability. Such improved durability can reduce leakage resulting from damage to the layer. The thicker layer having the spacer particulate can be exposed to harsher conditions without causing leakage. The increased thickness of the layer can absorb damage on an exterior impinging surface of the layer, but still maintain throughout the depth of the layer, intact fiber reducing leakage. In a thinner surface loading media, any substantial damage to the surface loading fibers can result in undesirable leakage.

The spacer particulate of the invention can be made from both organic and inorganic materials. The particulate that is non-interacting with the mobile fluid or entrained particulate phase comprises both organic or inorganic materials. Organic particulates can be made from polystyrene or styrene copolymers, nylon or nylon copolymers, polyolefin polymers including polyethylene, polypropylene, ethylene, olefin copolymers, propylene olefin copolymers, acrylic polymers and copolymers including polymethylmethacrylate, and polyacrylonitrile. Further, the particulate can comprise cellulosic materials and cellulose derivative beads. Such beads can be manufactured from cellulose or from cellulose derivatives such as methyl cellulose, ethyl cellulose, hydroxymethyl cellulose, hydroxyethyl cellulose, and others. Further, the particulates can comprise talc, clay, silicate, fused silicon dioxide, glass beads, ceramic beads, metal particulates, metal oxides, etc.

Both small molecule, oligomeric and polymeric materials can be used in the invention. Small molecules typically have molecular weights of less than about 500, are typically made up of a single identifiable molecular unit and typically the units do not repeat in the molecular structure. Oligomer structures typically have somewhat larger molecular weights but typically have 2 to 10 repeating molecular units in a structure. Polymer units typically have substantially higher molecular weights and typically have substantially greater than 10 repeating units in a polymer structure. The differentiation between oligomeric and polymeric structures is not always clear cut, however, as the number of repeating units in the structure increases, the material tends to become more polymeric like in nature.

The particles can be mono-disperse or poly-disperse. In mono-disperse particulate, the majority of the particles are similar in diameter or the major dimension. For example, one example of a mono-disperse particulate has 80% to 90% of the particulate within about 0.8±0.5 microns or about 1±0.25 micron. In a poly-disperse material, the particulate has a substantial portion of particles with different diameters. A poly disperse material could be a mixture of two mono-disperse materials or a material with a substantial amount of particulate material present throughout a broad range (e.g.) 0.01 to 10 microns.

The spheres or other shapes can be in a variety of different physical forms including solid and hollow form. The spacer particulate can have a substantially spherical or slightly oval shaped spherical structure. The spheres can be solid or can have a substantial internal void volume. The shell thickness of the sphere can range from about 0.05 to about 500 microns while the sphere can range from about 0.5 to about 5000 microns. Other circular structures that can be used include simple toroidal structures, spiral or helical structures, or interlocking link type chain structures.

The spacer particulate of the invention can also comprise a fiber like structure having a predetermined length and diameter. The aspect ratio of such a fiber is typically about 1 to about 10:1 having a fiber diameter that is typically larger in diameter than the fine fiber of the structure. The diameter ratio of the spacer particulate fiber to the fine fiber is typically about 0.5 to about 5000:1. A variety of other regular shapes can be used including cylindrical, hollow cylindrical, cruciform structures, three-dimensional cruciform structures, I-beam structures, and others. The spacer particulate can also be irregular in shape such that the particulate has a relatively well-defined major and minor dimension but has an exterior surface that is substantially irregular in nature. Many amorphous organic and inorganic particulates can have an irregular shape, but can have a size that can provide the spacing property of the particulate material. Depending upon the physical form and chemical nature of the spheres, the dimensions of the spheres can be manipulated by a secondary process such as solvent swelling, heat expansion, porosity changes, etc. Microspheres available from Expancel® can be heat-treated to expand the volume of the microspheres tremendously. Fine fiber and microsphere composite media can be produced according to this invention, and later upon a secondary treatment—not limited to heat—the structure of the composite media can be tuned in a controlled way, for example in the Expancel® case, depending upon the level of applied heat and temperature, one can control the degree of expansion of the microspheres. For example, by expanding the microspheres, the thickness and loftiness of the structure can be increased and thereby filtration properties can be altered in a desired way. It should be understood that such changes in the physical nature of the microsphere should be accommodated by the elasticity of the fine fiber as they would stretch in the case of expansion of the microspheres. Depending upon the reversibility of the change in microspheres, one can also create lofty structures and then collapse/shrink the structure to create dense/compact filtration structures.

The filter structure of the invention is typically made by formation of the fiber layer using a fiber forming process. The fiber forming process involves passing a composition comprising the polymer and the spacer particulate through a processing unit resulting in a fine fiber layer comprising fine fiber and the spacer particulate. A variety of processes can be used including, but not limited to, electrospinning, melt blowing, spun bonding and others as long as a filter of the correct dimensions is made. The technologies can be complemented with using electric fields, pressurized gases, etc. to create layered structures of appropriate dimensions. In one application, the polymer used in manufacture of the fine fiber can be dissolved in an appropriate solvent and combined with an appropriate amount of the spacer particulate dispersed in the solution. In such polymer solutions, the amount of polymer is about 20 to 80 wt % or 25 to 75 wt % and the amount of particulate is about 80 to 20 wt % or about 75 to 25 wt % based on the solution. Such a solution of polymer and dispersed particulate can then be formed into fiber using known processes. When using a solution of polymer, a particulate is selected that is not substantially soluble in the solvent. Solvents are typically selected to dissolve the polymer but not the particulate. Solvents can include water, lower alcohols, chlorinated solvent, DMF, acetone, hydrocarbons, DMSO and other known solvents. One preferred fiber-forming process comprises an electrospinning process resulting in a fine fiber layer of the appropriate fiber diameter, permeability and efficiency containing the spacer particulate of the invention.

Polymer materials that can be used in the polymeric compositions of the invention include both addition polymer and condensation polymer materials such as polyolefin, polyacetal, polyamide, polyester, cellulose ether and ester, polyalkylene sulfide, polyarylene oxide, polysulfone, modified polysulfone polymers and mixtures thereof. Preferred materials that fall within these generic classes include polyethylene, polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. One class of polyamide condensation polymers is nylon materials. The term "nylon" is a generic name for all long chain synthetic polyamides. Typically, nylon nomenclature includes a series of numbers such as in nylon-6,6, which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of epsilon ($C_6$) caprolactam (or other $C_{6-12}$ lactams) in the presence of a small amount of water. This reaction forms a nylon-6 (made from a cyclic lactam—also known as epsilonaminocaproic acid) that is a linear polyamide. Further, nylon copolymers are also contemplated. Copolymers can be made by combining various diamine compounds, various diacid compounds and various cyclic lactam structures in a reaction mixture and then forming the nylon with randomly positioned monomeric materials in a polyamide structure. For example, a nylon 6,6-6,10 material is a nylon manufactured from hexamethylene diamine and a $C_6$ and a $C_{10}$ blend of diacids. A nylon 6-6,6-6,10 is a nylon manufactured by copolymerization of epsilonaminocaproic acid, hexamethylene diamine and a blend of a $C_6$ and a $C_{10}$ diacid material.

Block copolymers are also useful in the process of this invention. With such copolymers the choice of solvent swelling agent is important. The selected solvent is such that both blocks were soluble in the solvent. One example is an ABA (styrene-EP-styrene) or AB (styrene-EP) polymer in methylene chloride solvent. If one component is not soluble in the solvent, it will form a gel. Examples of such block copolymers are Kraton® type of poly(styrene-co-butadiene and poly (styrene-co-hydrogenated butadiene(ethylene-co-propylene), Pebax® type of e-caprolactam-co-ethylene oxide, Sympatex® polyester-co-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly (methyl methacrylate) and its various copolymers, can be solution spun with relative ease because they are soluble at low pressures and temperatures. However, highly crystalline polymer like polyethylene and polypropylene require high temperature, high pressure solvent if they are to be solution spun. Therefore, solution spinning of the polyethylene and polypropylene is very difficult. Electrostatic solution spinning is one method of making nanofibers and microfiber.

We have also found a substantial advantage to forming polymeric compositions comprising two or more polymeric materials in polymer admixture, alloy format or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material. Further, differing species of a general polymeric genus can be blended. For example, a high molecular weight styrene material can be blended with a low molecular weight, high impact polystyrene. A Nylon-6 material can be blended with a nylon copolymer such as a Nylon-6; 6,6; 6,10 copolymer. Further, a polyvinylalcohol having a low degree of hydrolysis such as an 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinylalcohol materials can be crosslinked using hydroxyl reactive materials such as monoaldehydes, such as formaldehyde, ureas, melamine-formaldehyde resin and its analogues, boric acids and other inorganic compounds dialdehydes, diacids, urethanes, epoxies and other known crosslinking agents. Crosslinking technology is a well known and understood phenomenon in which a crosslinking reagent reacts and forms covalent bonds between polymer chains to substantially improve molecular weight, chemical resistance, overall strength and resistance to mechanical degradation.

We have found that additive materials can significantly improve the properties of the polymer materials in the form of a fine fiber. The resistance to the effects of heat, humidity, impact, mechanical stress and other negative environmental effect can be substantially improved by the presence of additive materials. We have found that while processing the microfiber materials of the invention, that the additive materials can improve the oleophobic character, the hydrophobic character and can appear to aid in improving the chemical stability of the materials. We believe that the fine fibers of the invention in the form of a microfiber are improved by the presence of these oleophobic and hydrophobic additives as these additives form a protective layer coating, ablative surface or penetrate the surface to some depth to improve the nature of the polymeric material. We believe the important characteristics of these materials are the presence of a strongly hydrophobic group that can preferably also have oleophobic character. Strongly hydrophobic groups include fluorocarbon groups, hydrophobic hydrocarbon surfactants or blocks and substantially hydrocarbon oligomeric compositions. These materials are manufactured in compositions that have a portion of the molecule that tends to be compatible with the polymer material affording typically a physical bond or association with the polymer while the strongly hydrophobic or oleophobic group, as a result of the association of the additive with the polymer, forms a protective surface layer that resides on the surface or becomes alloyed with or mixed with the polymer surface layers. The additive can be used at an amount of 1% to 25% by weight total on fiber. For 0.2-micron fiber with 10% additive level, the surface thickness is calculated to be around 50 Å, if the additive has migrated toward the surface. Migration is believed to occur due to the incompatible nature of the oleophobic or hydrophobic groups in the bulk material. A 50 Å thickness appears to be reasonable thickness for protective coating. For 0.05-micron diameter fiber, 50 Å thickness corresponds to 20% mass. For 2 microns thickness fiber, 50 Å thickness corresponds to 2% mass. Preferably the additive materials are used at an amount of about 2 to 25 wt %. Useful surface thickness can range from 10 Å to 150 Å. Oligomeric additives that can be used in combination with the polymer materials of the invention include oligomers having a molecular weight of about 500 to about 5000, preferably about 500 to about 3000 including fluoro-chemicals, nonionic surfactants and low molecular weight resins or oligomers. Nonionic materials are preferred.

Useful materials for use as an additive material in the compositions of the invention are tertiary butylphenol oligomers. Such materials tend to be relatively low molecular weight aromatic phenolic resins. Such resins are phenolic polymers prepared by enzymatic oxidative coupling. The absence of methylene bridges result in unique chemical and physical stability. These phenolic resins can be crosslinked with various amines and epoxies and are compatible with a variety of polymer materials.

An extremely wide variety of fibrous filter media substrate exists for different applications. The durable nanofibers and microfibers described in this invention can be added to any of the media substrate. The fibers described in this invention can also be used to substitute for fiber components of these existing media substrates giving the significant advantage of improved performance (improved efficiency and/or reduced pressure drop) due to their small diameter, while exhibiting greater durability.

In spinning fine fiber includes a reservoir is filled with the selected particulate, fine fiber polymer and solvent. A rotary type emitting device or emitter contacts the polymeric solution. The emitter generally consists of a rotating portion that obtains polymer solution from the reservoir and as it rotates in the electrostatic field, a droplet of the solution is taken from the emitter and is accelerated by the electrostatic field toward the collecting media.

Facing the emitter but spaced apart there from, is a substantially planar grid upon which the collecting media substrate (i.e. substrate or combined substrate) is positioned. Air can be drawn through the grid to hold the media in place. The collecting media is positioned over the grid and between the grid and polymer solution. A high voltage electrostatic potential is maintained between emitter and grid by means of a suitable electrostatic voltage source and connections to the grid and emitter. Specifically, the electrostatic potential between grid and the emitter imparts a charge to the material that causes liquid to be emitted there from as thin fibers. The thin wet particulate containing fiber is drawn toward grid where it is collected on the substrate positioned over the grid. In the case of the dispersed particulate and polymer in solution, solvent is evaporated off the fibers during their flight to the grid; therefore, the fibers arrive at the substrate containing reduced solvent and dry on the substrate. The wet fine fibers bond to the substrate fibers on contact. Electrostatic field strength is selected to ensure that the polymer material as it is accelerated from the emitter to the collecting media; the acceleration is sufficient to render the material into a very thin microfiber or nanofiber structure. Varying (slowing or increasing) the advance rate of the collecting surface can deposit more or less emitted fibers on the forming media, thereby allowing control of the thickness of each layer deposited thereon.

Fiber is spun and polymer solution is electro-spun in a manner described in Barris, U.S. Pat. No. 4,650,516 and Chung et al., U.S. Pat. No. 6,743,273. Polymer solution viscosity tends to increase with time. It is generally known that polymer viscosity has a great influence in determining fiber sizes. Thus, it is difficult to control the process in commercial scale, continuous production.

DETAILED DISCUSSION OF THE FIGURES

FIGS. 1-3, 10-13, 14-15, 30, 31, 32, 33 through 36, 37, 38 and 39, show the nanofiber media containing the spacer particulate within the nanofiber web structure. The Figures show that the nanofiber forms a layer having a thickness, the thicknesses filled with a fairly uniform concentration of the spacer particulate within the nanofiber layer. In the Figures, the overall media 10 is shown containing the spacer particulate 11 and the web 12 into which the spacer particulate is enmeshed, adhered and fixed in place forming a mechanically stable spacer particulate composite structure.

Figure 1:
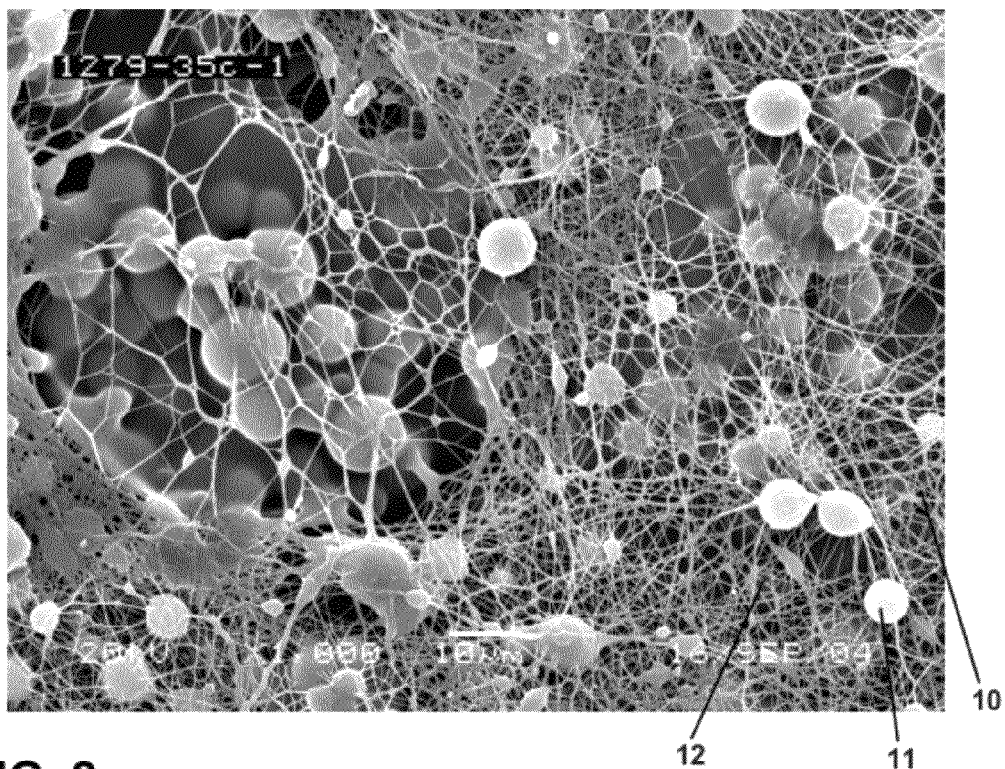

FIG. 1 shows the surface layer of the improved filtration media of the invention. In the surface layer 10 comprises the intersecting mesh of fiber with the particulate matter dispersed throughout. In filter media 10 are particulates 11 having a diameter of about 5 microns, particulates 12 having a larger diameter of about 9.4 microns and still other particulates having a diameter of about 7 microns. The surface layer 13 is a layer formed from fine fiber in an intersecting mesh. The fine fiber has a fiber diameter of about 0.25 microns. The pore size 14 of the surface layer formed from the fine fiber as intersected as shown in the layer has an effective size of about 2.3 microns. Such effective pore sizes are created as the fiber 15 forms the interlocked mesh at intersection points 16.

Figure 2:
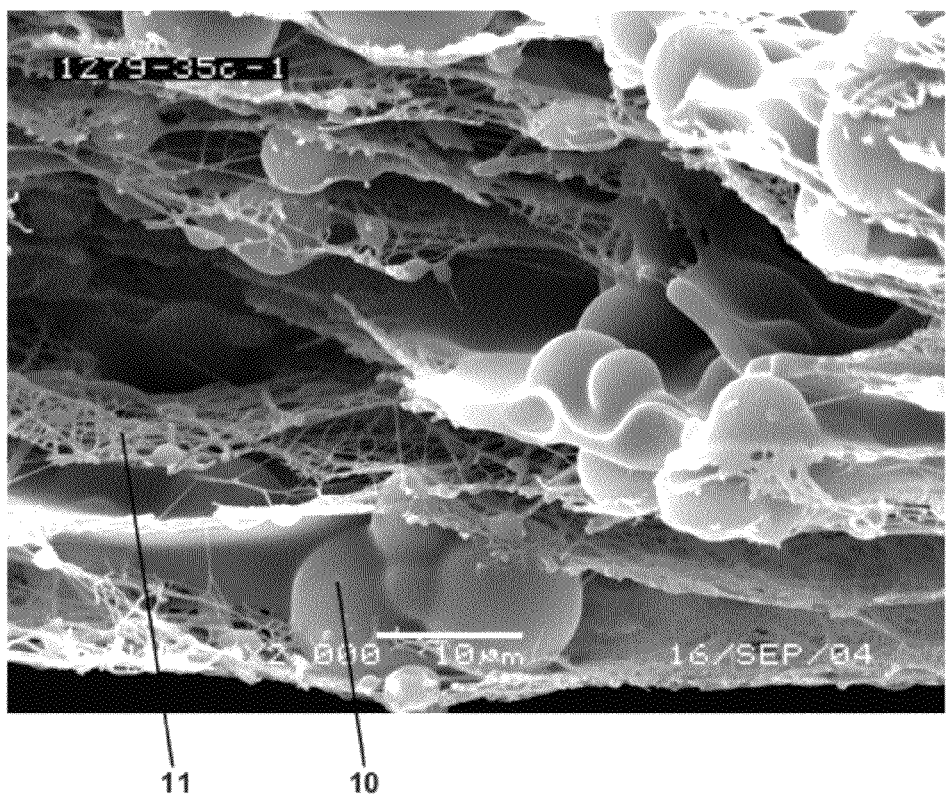

FIG. 2 is a side view of the media of the invention. In FIG. 2, the media 20 has a surface layer 21 made of a tight mesh of the fine fiber having an effective pore size of about 1 micron. The layered media 20 comprises additional internal layers 22, 23 formed within the media, which are maintained as separate structures using the particulate 24 as shown in the Figure.

Figure 3:
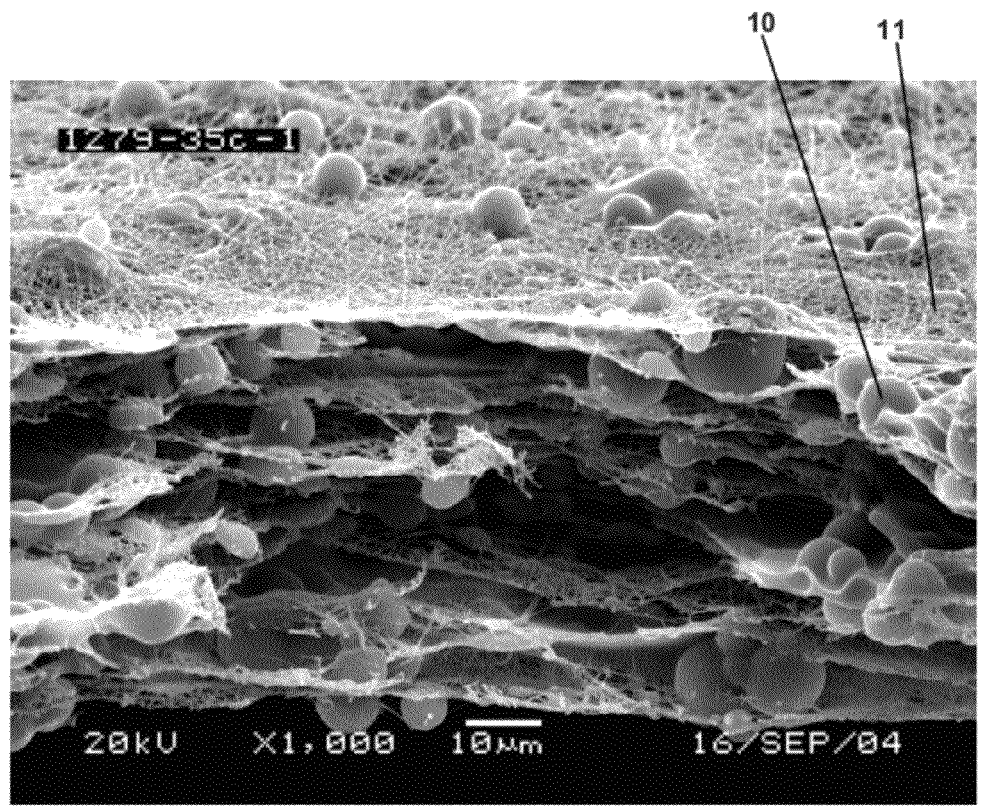

FIG. 3 is an expanded view of a portion of FIG. 2. The expanded portion illustrates internal layers 31, 32 and 33 that are formed at least in part as a result of the inclusion of particulate 34, 35 and 36. As a result of the layered structure of the media 30, the mobile fluid is required to pass through a torturous pathway from the incidence side to the exit side.

Figure 4A:
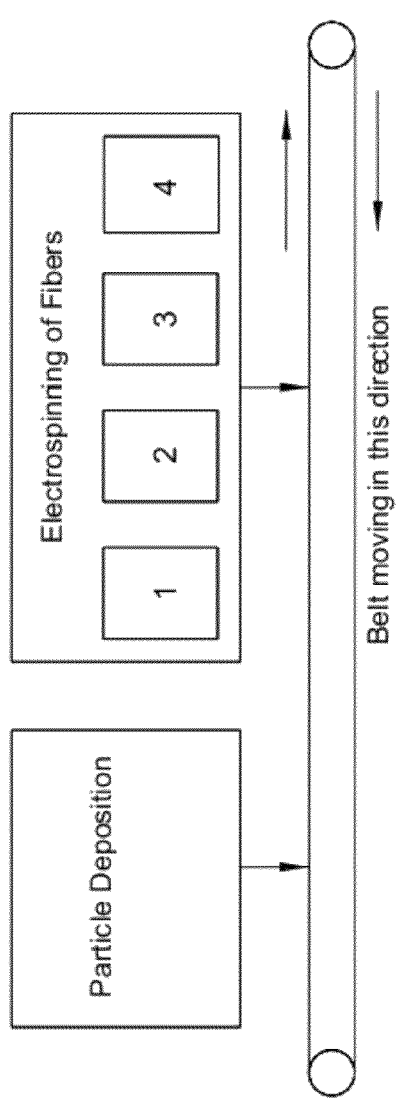
FIGS. 4a and 4b show the mechanism used to introduce the particulate and spin the fiber and particulate into a filter web.
Figure 4B:
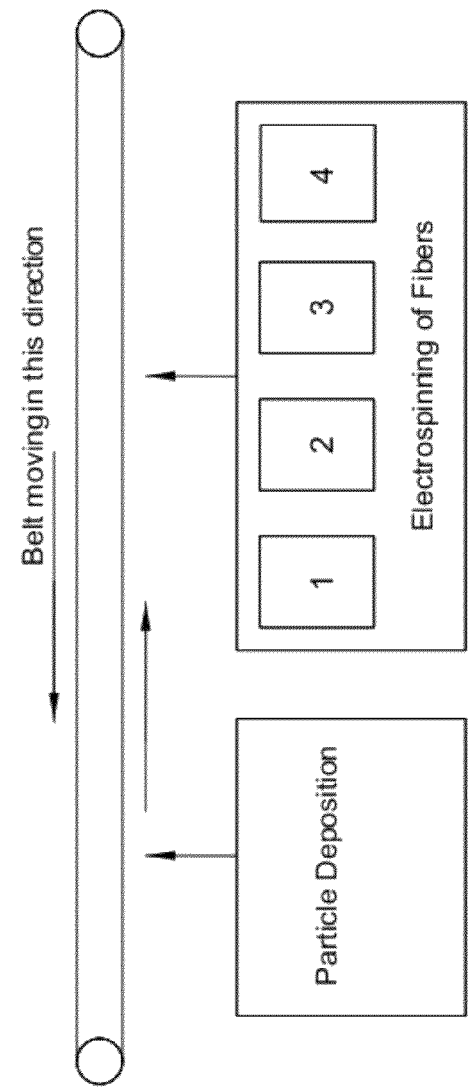

FIGS. 4a and 4b are schematics of the spinning equipment of the invention.

Figure 5:
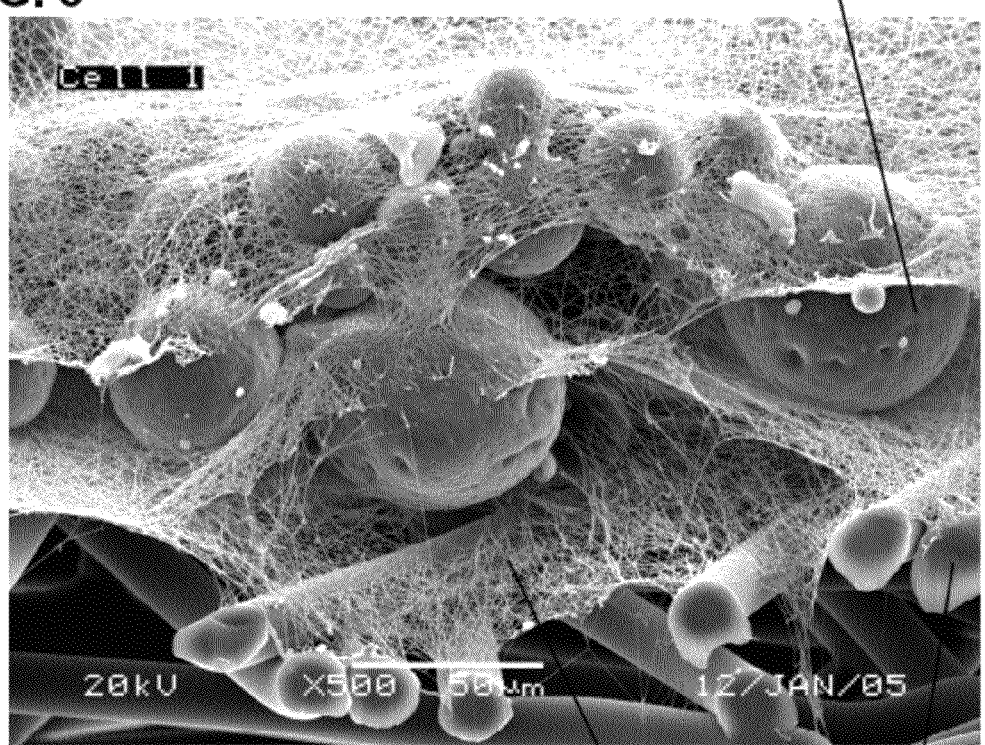

FIG. 5 is a photomicrograph showing a number of fiber separation means particulate within the fiber web. In FIG. 5 the fibrous web 51 is shown covering a variety of particulate 52, 53 and 54 formed within voids within the fiber web 55, 56 and 57. The surface 58 of the fiber web is shown. The fiber web is formed on a non-woven fabric formed of fibers 59, 60 and 61.

Figure 6:
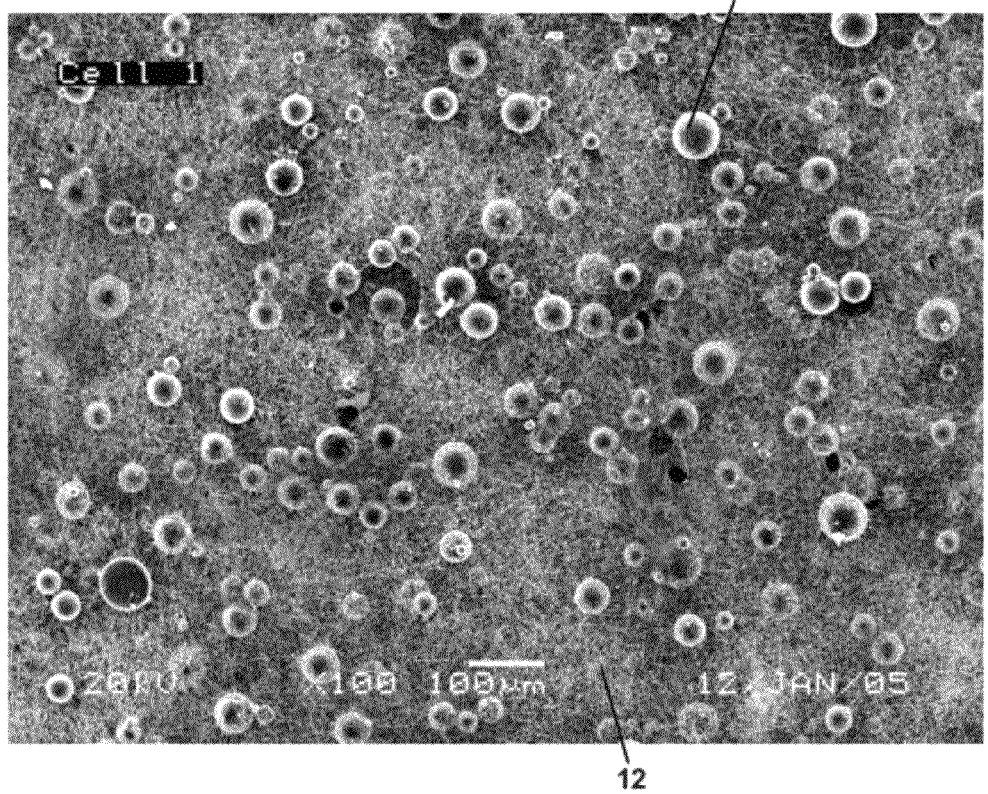

FIG. 6 is a plan view of the surface of the fibrous web 60 similar to the surface 58 of FIG. 5. In FIG. 6 a variety of particulate 61, 62 and 63 can be seen on and under the surface 60. Additionally, a void 64 surrounded by edge 65 can be seen, revealing a particle 66 resting on a web 67. The web 67 is a redundant aspect of the invention ensuring that any defect in the web 60 can fail to cause a defect structure in the overall media since the presence of the web 67 maintains filtration integrity.

Figure 7A:
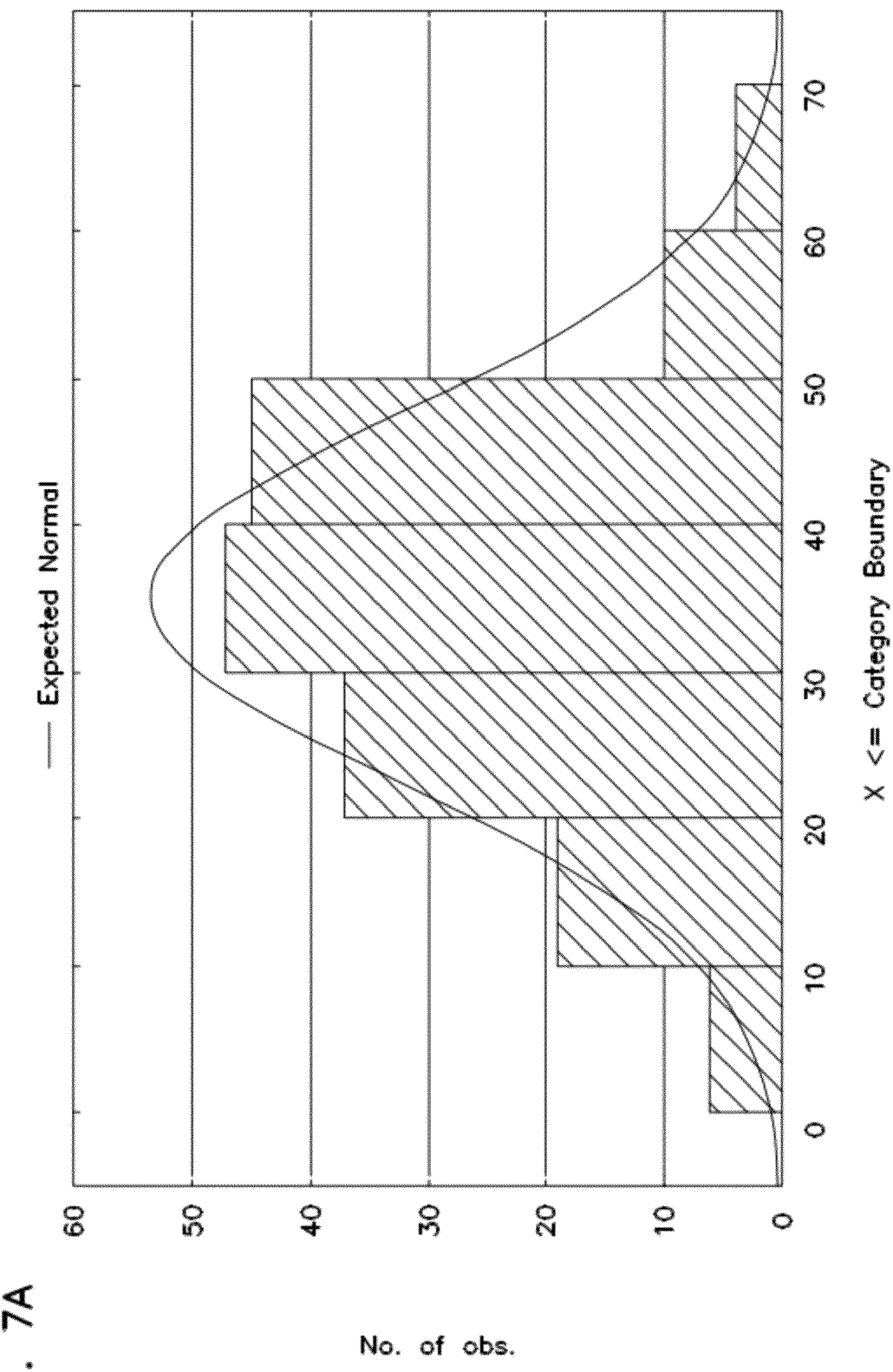
FIG. 7a is a histogram of the particle sizes of the material shown in FIG. 6

FIG. 7a is a histogram showing the particle size variation of the particles in the photomicrograph, see FIG. 6. Each bar in the graph represents the relative number of particles in each range up to ten microns, ten to twenty microns, etc. The majority of particulate appears to be, for that experiment, between about 20 and 50 microns.

FIG. 7b is the particle size distribution data of the particles shown in the photomicrographs; see FIGS. 10-13 and 14-15.

Figure 8:
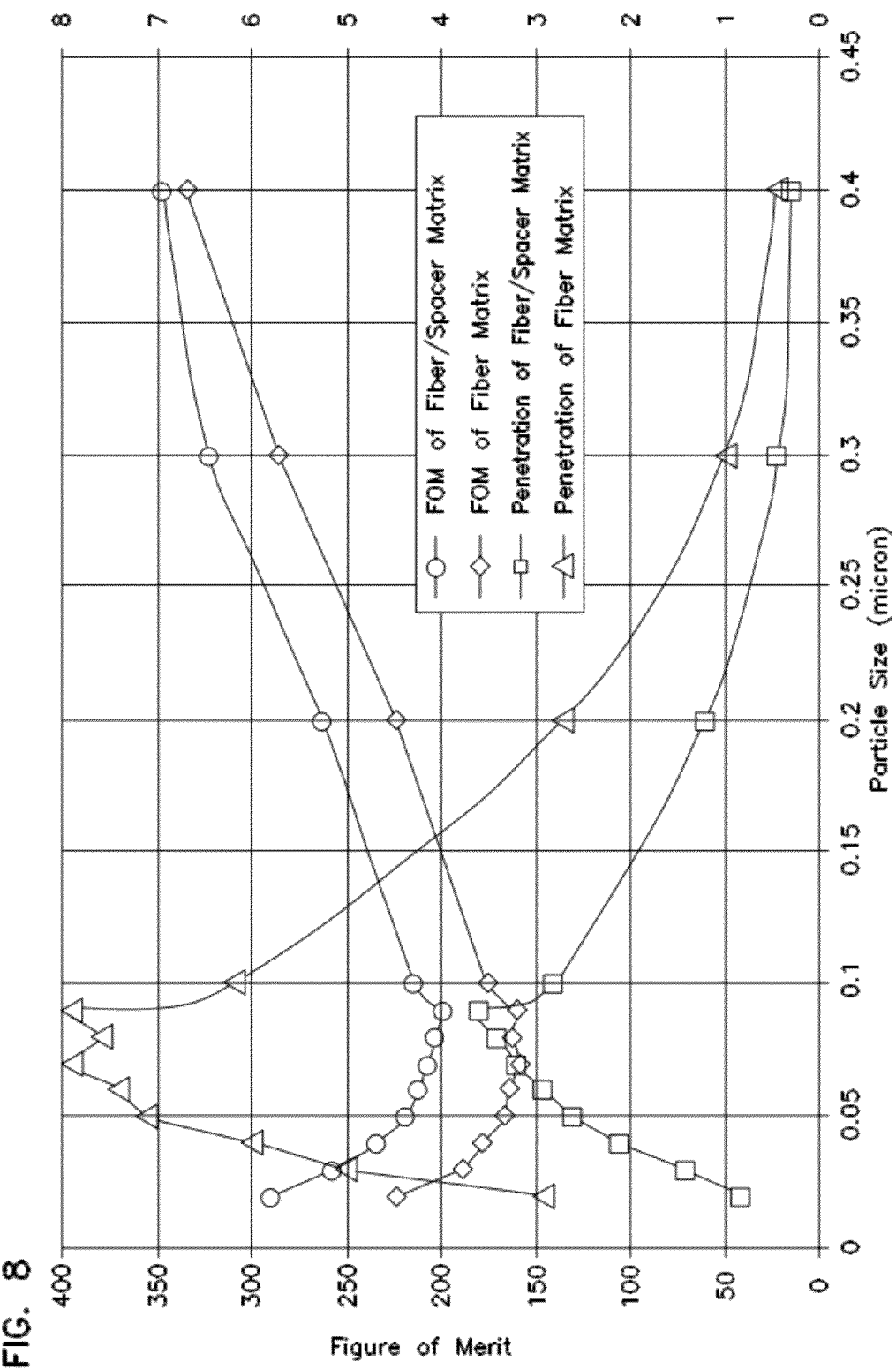
FIG. 8 shows the improvement in penetration and Figure of Merit in webs made with the technology of the invention.

FIGS. 8 and 9 is a graphical representation of the role of solidity in filtration. Solidity can affect both pressure drop and efficiency. When solidity increases, drag per unit length of fiber increases, typically proportionally. Single fiber efficiency due to diffusion at interception also increases. FIGS. 8 and 9 shows the Figure of Merit for a variety of particles at a variety of solidities and shows excellent filtration characteristics throughout the range of solidities for the modeled particulate. FIG. 9 is a calculated set of data while FIG. 8 represents actual measured parameters.

Figure 10:
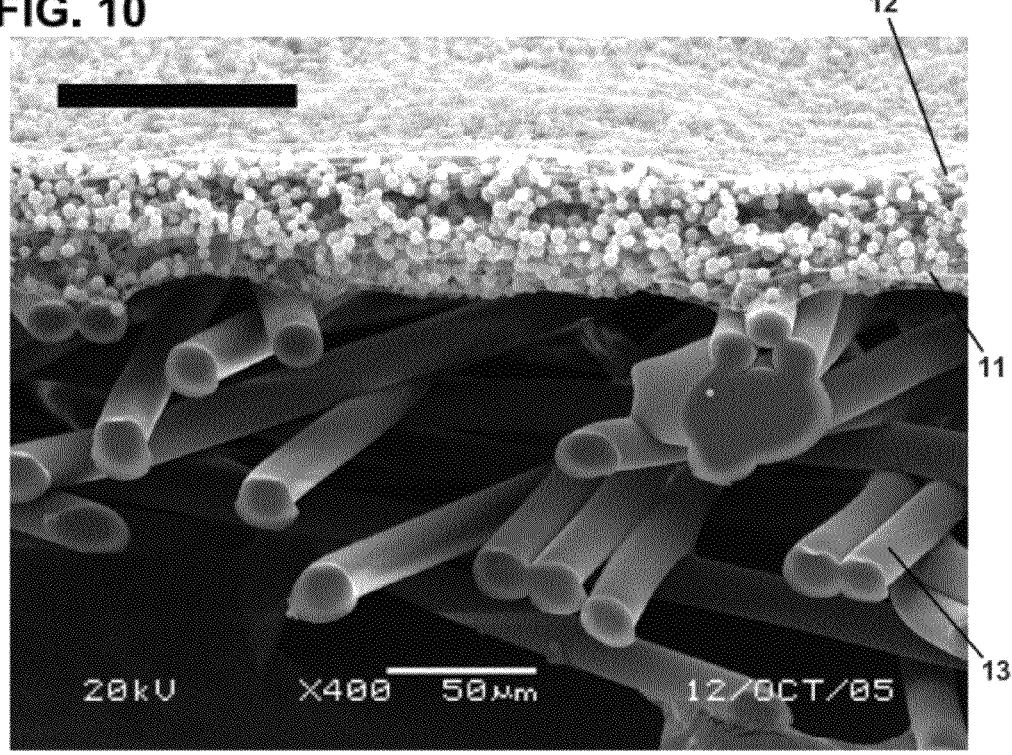
FIGS. 10-13 are scanning electron micrographs (SEM) showing nanofiber spacer particle media construction of several samples made according to the examples. The photomicrographs show both side and top views of the nanofiber media containing the particulate spacers and the underlying media layers.
Figure 11:
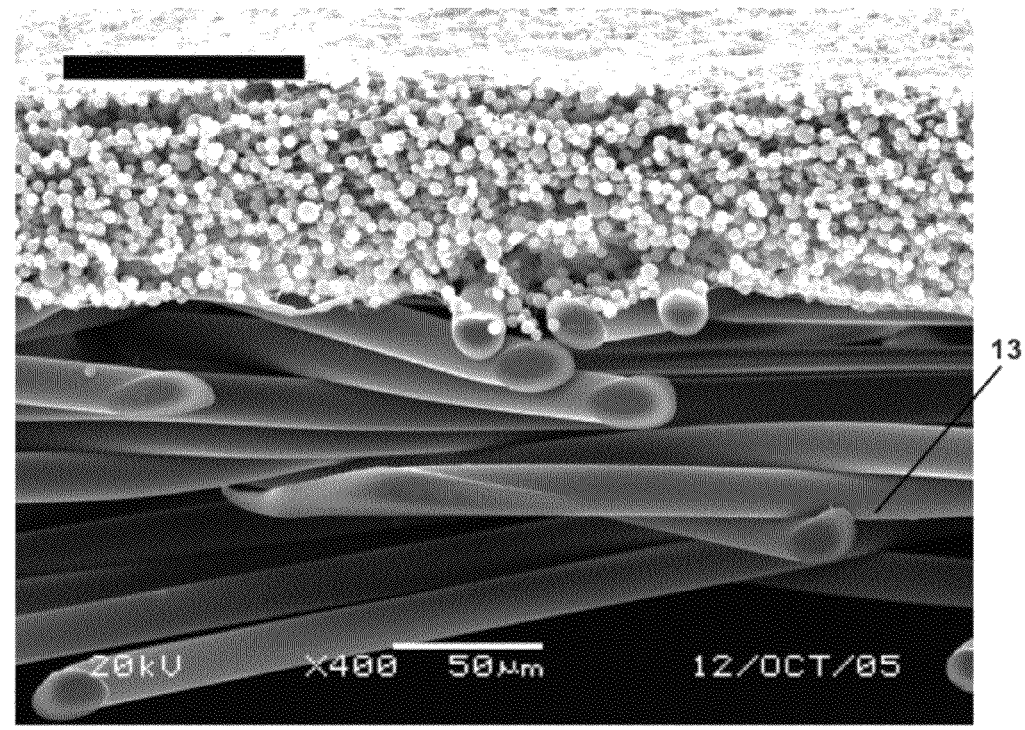
Figure 12:
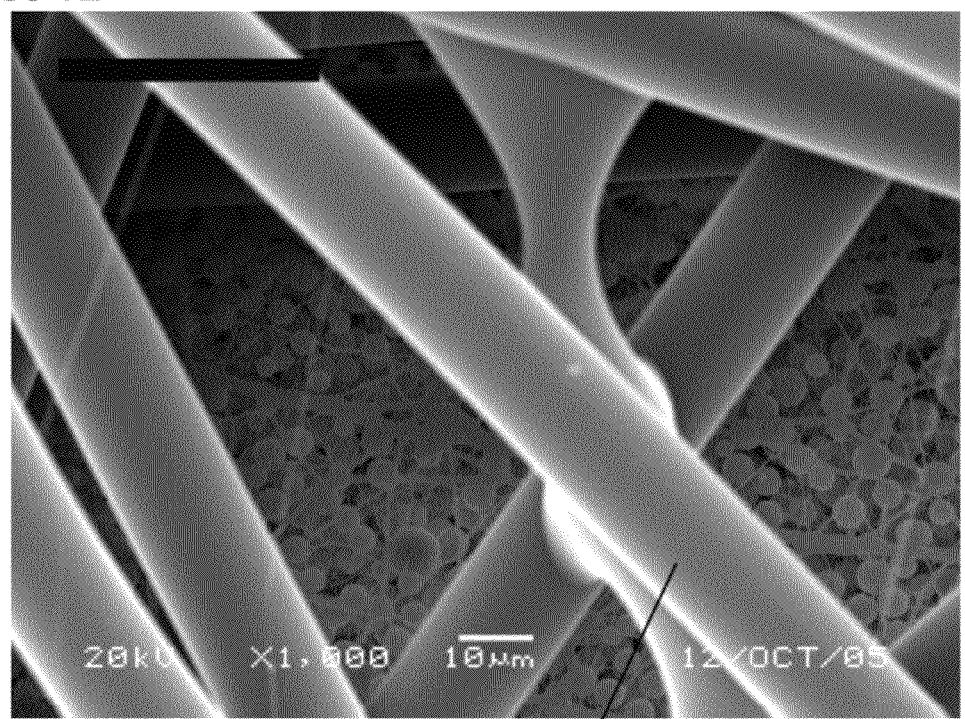
Figure 13:
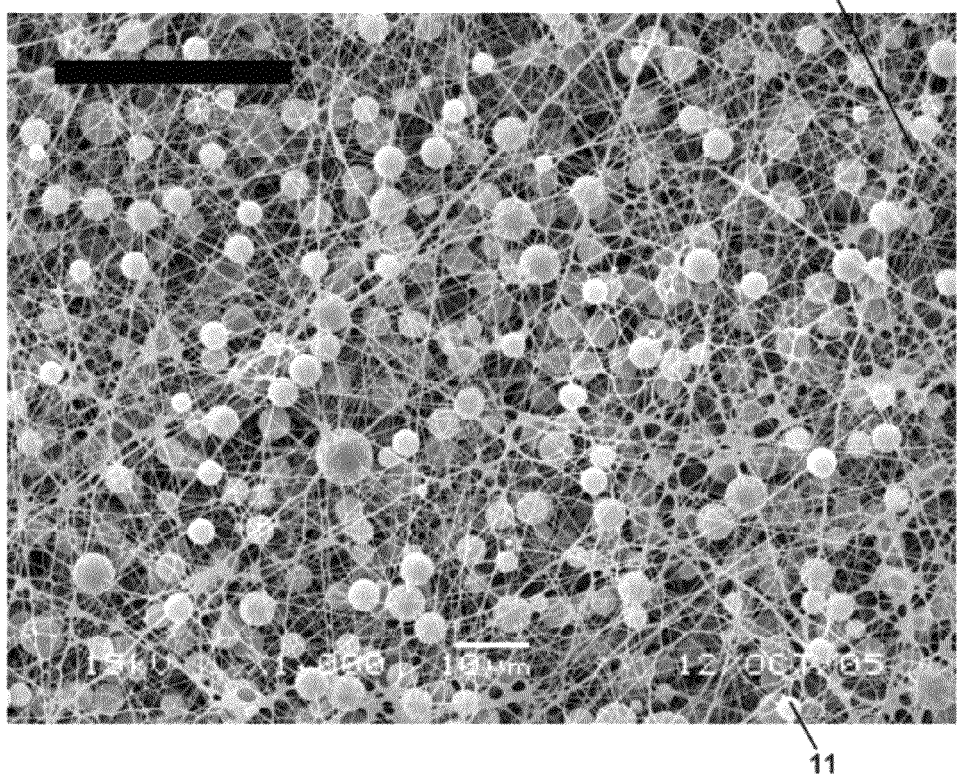

FIGS. 10-13 show the nanofiber spacer particulate media of the invention combined with a non-woven substrate. FIGS. 10-13 show the media 14 comprising the nanofiber layer containing the spacer particulate 11 and the nanofiber web 12, all formed on a non-woven substrate 13. Scanning Electron Microscope (SEM) micrographs show the nanofiber/spacer particle media construction of several samples. FIG. 10 is a cross section image of a thinner construction compared to that of FIG. 11 on the right hand side. By varying the thickness of the media we were able to modify the efficiency/pressure drop performance of the structure consistently. As one can see, the samples appear to be very uniform in thickness in the sampled area. The substrate fibers can be seen in the lower portions of both images. FIG. 12 is showing the composite from the bottom side, where the substrate fibers are clearly visible in the front. It can be seen from this image, that the spacer particles are tightly bound within the nanofiber matrix and that the substrate fiber surface is free from any particle that might act as a contaminant. The FIG. 13 shows the composite mounted in the orientation where the top view is visible. And it is very clear that spacer particles are also very well bounded in the upstream of the media.

Figure 14:
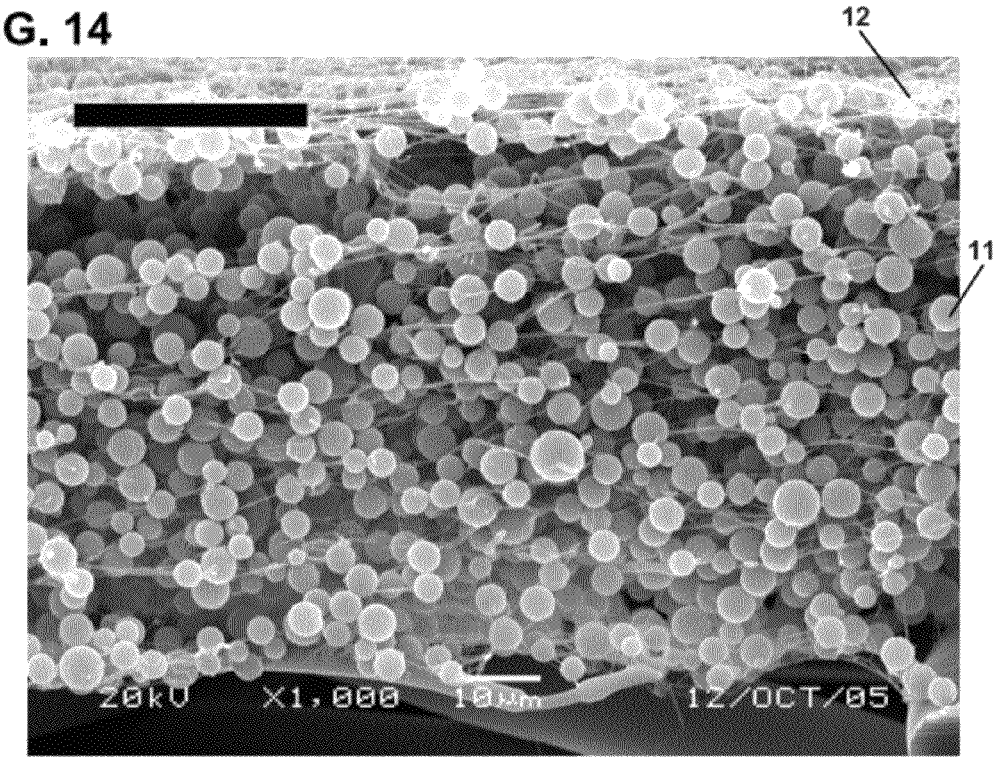
FIGS. 14 and 15 are high and low magnification views of typical nanofiber cross sections.
Figure 15:
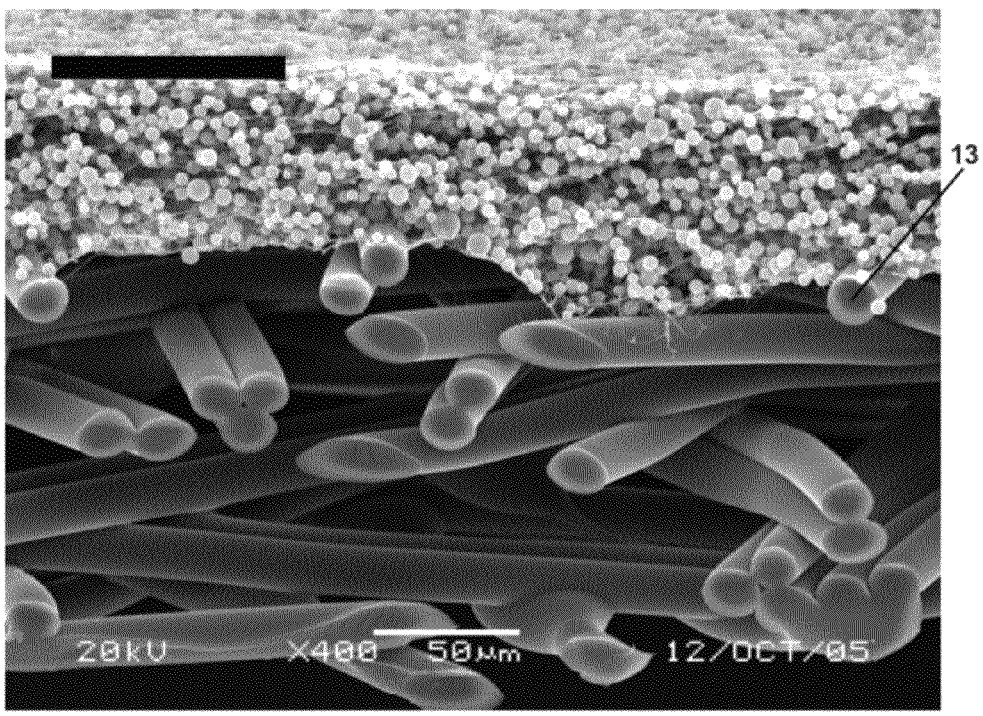
Figure 16:
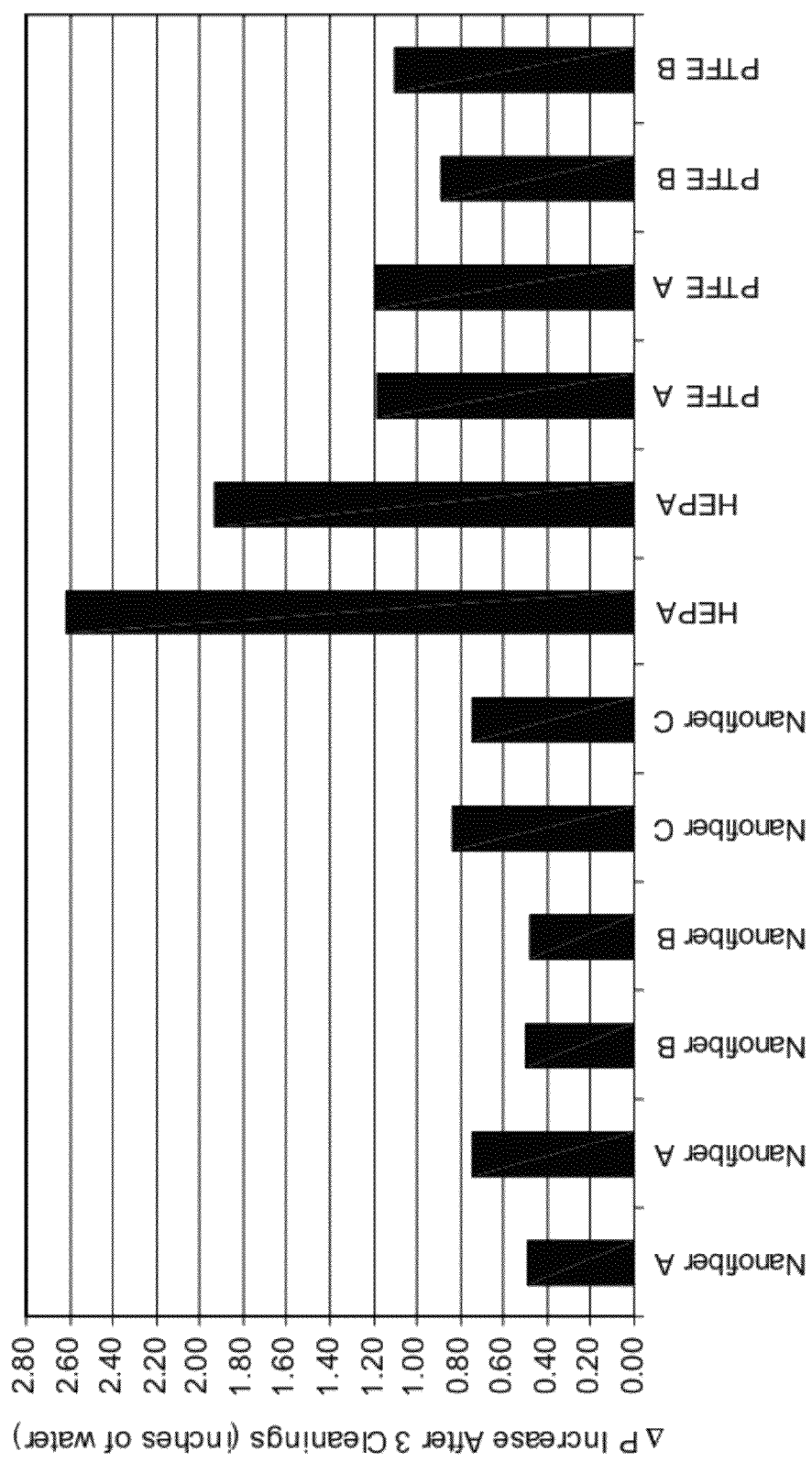

FIGS. 14 and 15 are close-up cross section views of the composite, where one can see the nanofibers within the depth of the composite very clearly. It is largely these fibers and the interstitial space created within them that fuels the high efficiency of the structure. From this high magnification view, one can also see that some of the particles appear suspend in the air by their attachment to a single fiber, which tells us a lot about the tenacity of the fibers.

FIG. 23 is a photograph showing a plan view of the media of the invention.

FIG. 28A shows pressure drop versus time for media with a glass fiber layer and media with a nanofiber layer. The glass fiber media quickly exceeds pressure limits.

FIG. 28B similarly shows increased (compared to nanofiber) glass pressure drop versus time for an extended period.

FIG. 29 shows the test equipment used to generate the data shown in FIGS. 28a and 28b. In the Figure, the overall test apparatus 20 includes a dust feed system 21, an inlet filter 22, a chamber 23 for uniform air flow, a media sample location for the test media 24, a transducer or pressure sensor to determine pressure drop across the sample, a compressed air receiver 26 and pulse valve 27 to apply the reverse pulse cleaning air to determine cleanability and filter lifetime, a downstream pressure transducer 25 to determine pressure drop over the standard flow meter orifice plate 30 and a final pump 29.

FIG. 41 shows the set up used to compress the nanofiber media under a known amount of load for the compression tests shown in the data of FIG. 40. The test structure uses a weight 40 of about 4.5, 19.1 and 47.4 lbs in respective tests, an upper plate 41 used to distribute the total compression force, the sample to be tested 42 with the scrim side on the lower plate 44, a release liner positioned between the upper plate 41 and the scrim sample 42, the entire test structure supported by the lower plate 44.

FIGS. 36 and 37 show the adhesion aspect of the invention in which the nanofiber web is adhered to the spacer particulate of the composite structure. FIG. 37, in particular, shows the spacer particulate 11 enmeshed in the nanofiber web 12. In particular, FIG. 37 shows that lengths of the nanofiber web structure are adhered to the spacer particulate at a substantial proportion of the area of contact between the particulate and the nanofiber resulting in the stable entrapped particle within the nanofiber web.

The web of the invention comprising a fibrous phase and a particulate phase is typically a non-woven web that can have a variety of end uses. A particularly important end use of the webs of the invention is for general-purpose filtration operations. In such operations, a mobile fluid phase is passed through the web for the purpose of substantially removing a particulate loading in the mobile phase from the mobile phase. In the operation of the invention, the web of the invention acts as a "depth" media that accumulates the entrained particulate phase within the web and physically separates the particulate phase from the mobile phase as it moves through the permeable web. The webs of the invention can be applied to a variety of other end uses including insulation layers. Such insulation layers can include heat insulation, acoustical insulation or isolation, or electrical isolation. The webs can also be used as geotextiles, battery separators, membrane layers, cell culture layers, tissue implant substrates, bandages, applications for wound care, components of wipe materials, and as paper coatings.

EXPERIMENTAL

Nylon microspheres used in Examples 2, 4, 6, 8 and 9 through 13 were dispersed into the nanofiber matrix using a deflocculator system, where the microspheres were fed to the deflocculator using a dry particle feeder (screw feeder) with electronic controls over the particle output rate. This particle feeder was located on an industrial type balance with an accuracy of about 5 g, and thus the amount of microspheres discharged from the feeder to the deflocculator was registered as the loss on the balance readout. This system provided us with the live capability of controlling and reading the microsphere output. The deflocculation and deposition part of the system consisted of a deflocculator where compressed air was drawn into the deflocculator to open up any particle agglomeration and force them out of the nozzle with high velocity. The trajectory of the microspheres was controlled using a nozzle downstream of the deflocculator that deflected the microspheres into pre-defined deposition geometry. In this case, the particle deposition width was around 12 inches and the opening of the nozzle was around 1 inch.

The particles used in the Examples 2, 4, 6, 8 and 9 through 13 were obtained from Kobo Products, Inc., South Plainfield, N.J. The product is identified as SP-500, which is composed of Nylon 12 polymeric microspheres. Particle size distribution was analyzed using Beckman Coulter LS13320 laser diffraction particle size analyzer. A small amount of dust was dispersed with a small amount of isopropyl alcohol and water. The sample was then submitted to ultrasonic for 10-15 seconds and ran on the laser diffraction analyzer with water as the solvent. The refractive index of 1.53 was provided by the manufacturer and used in the analysis. The powder had a mean size of 3.915 microns. The particle size distribution is presented in FIG. 7b.

In this case, there were two different polymer solutions, which were electrospun simultaneously. To do that, four different electrospinning stations were employed as shown in FIGS. 4a and 4b. Stations 1 and 4 electrospun using the blend of polymer solution, whereas Stations 2 and 3 electrospun using a nylon solution. The reason why the system was devised in this configuration was the fact that the fibers electrospun from the polymer solution blend are preferred to make contact with the microspheres because these fibers have a tacky surface and thus the fiber to microsphere adhesion is better. In addition, these fibers have slightly larger fiber diameter than the fibers electrospun from pure nylon solution, and thus larger fiber diameter translates into a better surface for particles to lie down and anchor onto. The fibers electrospun from Stations 2 and 3 have smaller diameters, thus, these fibers are the primary efficiency component of the composite providing high efficiency to the media.

Four different coating levels were generated in order to compare the effect of lowering solidity (increasing the void volume) has on the figure of merit of nanofiber media. These four levels are: 1×, 1.6×, 2× and 2.4×. The term "×" is simply an indicator of unit amount of fibers. In this case, for example, 1× is the unit amount and 1.6× has 1.6 times the amount (mass) of fibers than 1×.

Following are the details of how we have made these structures.

EXAMPLE 1

The run cycle for this 1× sample was:

| | |
|---|---|
| 3 min | Electrospinning of nylon solution and blend of polymer solution simultaneously (all four stations) |
| +2 min | Only electrospinning of nylon solution (only Stations 2 and 3) |

This has the same amount of nanofibers as Example 2 (total amount of a nanofiber spinning is 5 minutes-1×-); however because there is no particle in this media and hence the solidity of the media is greater, and the air permeability is lower than Example 2. The media was heated to 300° F. for 10 minutes in a lab oven in an attempt to mimic any changes in fiber morphology that may take place with the heat treatment of Example 2.

EXAMPLE 2

The run cycle for this 1× sample was:

| | |
|---|---|
| 1 min | Electrospinning of nylon solution and blend of polymer solution simultaneously (all four stations) |
| +2 min | Electrospinning of nylon solution and blend of polymer solution simultaneously and deposition of SP-500 nylon microspheres (all four stations) |
| +2 min | Only electrospinning of nylon solution (only Stations 2 and 3) |

The total run time to generate this sample took 5 minutes. Amount of SP-500 nylon microspheres discharged was 9.5 g. The media was heated to 300° F. for 10 minutes in a lab oven in an attempt to increase the bond strength between electrospun fibers and microspheres. After that, 4 inch diameter samples were cut and tested on TSI 3160 fractional efficiency test bench.

EXAMPLE 3

The run cycle for this 1.6× sample was:

| | |
|---|---|
| 6 min | Electrospinning of nylon solution and blend of polymer solution simultaneously (all four stations) |
| +2 min | Only electrospinning of nylon solution (only Stations 2 and 3) |

This has the same amount of nanofibers as Example 4 (total amount of nanofiber spinning is 8 minutes-1.6×-); however because there is no particle in this media and hence the solidity of the media is greater, and the air permeability is lower than Example 4. The media was heated to 300° F. for 10 minutes in a lab oven in an attempt to mimic any changes in fiber morphology that may take place with the heat treatment of Example 4.

EXAMPLE 4

The run cycle for this 1.6× sample was:

| | |
|---|---|
| 1 min | Electrospinning of nylon solution and blend of polymer solution simultaneously (all four stations) |
| +5 min | Electrospinning of nylon solution and blend of polymer solution simultaneously and deposition of SP-500 nylon microspheres (all four stations) |
| +2 min | Only electrospinning of nylon solution (only Stations 2 and 3) |

The total run time to generate this sample took 8 minutes. Amount of SP-500 nylon microspheres discharged was 20 g. The media was heated to 300° F. for 10 minutes in a lab oven in an attempt to increase the bond strength between electrospun fibers and microspheres. After that, 4 inch diameter samples were cut and tested on TSI 3160 fractional efficiency test bench.

EXAMPLE 5

The run cycle for this 2× sample was:

| | |
|---|---|
| 8 min | Electrospinning of nylon solution and blend of polymer solution simultaneously (all four stations) |
| +2 min | Only electrospinning of nylon solution (only Stations 2 and 3) |

This has the same amount of nanofibers as Example 6 (total amount of nanofiber spinning is 10 minutes-2×-); however because there is no particle in this media and hence the solidity of the media is greater, and the air permeability is lower than Example 6. The media was heated to 300° F. for 10 minutes in a lab oven in an attempt to mimic any changes in fiber morphology that may take place with the heat treatment of Example 6.

EXAMPLE 6

The run cycle for this 2× sample was:

| | |
|---|---|
| 1 min | Electrospinning of nylon solution and blend of polymer solution simultaneously (all four stations) |
| +7 min | Electrospinning of nylon solution and blend of polymer solution simultaneously and deposition of SP-500 nylon microspheres (all four stations) |
| +2 min | Only electrospinning of nylon solution (only Stations 2 and 3) |

The total run time to generate this sample took 10 minutes. Amount of SP-500 nylon microspheres discharged was 14 g. The media was heated to 300° F. for 10 minutes in a lab oven in an attempt to increase the bond strength between electrospun fibers and microspheres. After that, 4 inch diameter samples were cut and tested on TSI 3160 fractional efficiency test bench.

EXAMPLE 7

The run cycle for this 2.4× sample was:

| | |
|---|---|
| 12 min | Electrospinning of nylon solution and blend of polymer solution simultaneously (all four stations) |
| +2 min | Only electrospinning of nylon solution (only Stations 2 and 3) |

This has the same amount of nanofibers as Example 8 (total amount of nanofiber spinning is 14 minutes-2.4×-); however because there is no particle in this media and hence the solidity of the media is greater, and the air permeability is lower than Example 8. The media was heated to 300° F. for 10 minutes in a lab oven in an attempt to mimic any changes in fiber morphology that may take place with the heat treatment of Example 8.

EXAMPLE 8

The run cycle for this 2.4× sample was:

| | |
|---|---|
| 1 min | Electrospinning of nylon solution and blend of polymer solution simultaneously (all four stations) |
| +11 min | Electrospinning of nylon solution and blend of polymer solution simultaneously and deposition of SP-500 nylon microspheres (all four stations) |
| +2 min | Only electrospinning of nylon solution (only Stations 2 and 3) |

The total run time to generate this sample took 14 minutes. Amount of SP-500 nylon microspheres discharged was 27 g. The media was heated to 300° F. for 10 minutes in a lab oven in an attempt to increase the bond strength between electrospun fibers and microspheres. After that, 4 inch diameter samples were cut and tested on TSI 3160 fractional efficiency test bench.

FIG. 19 illustrates the change in Figure of Merit as a function of the amount of nanofibers in a given surface area for both the nanofiber only and the nanofiber/spacer particles configurations. In nanofiber only configuration, as the amount of nanofiber was increased, the Figure of Merit decreased dramatically simply due to the fact that beyond a critical point, the fibers started to fuse to each other and created a membrane-like structure with very small pores that has efficiency in the low 90's with tremendous resistance to the air flow. Because of their very small fiber diameter, nanofibers do not tend to stack on top of each other in discrete layers, but rather they follow the contours of the previously deposited layer thus creating membrane-like structure.

On the other hand, both the media efficiency and Figure of Merit increased dramatically when the nanofiber layers are separated into discrete layers by physically spacing them apart from each other. This is evident in the FIG. 19. The far right data point for the nanofiber/spacer particles efficiency is in the 99.9% range compared to that of nanofibers only efficiency which was in the 91% range for the same amount of nanofibers in a unit surface area.

When the far left data point for both types of media is evaluated, it can be seen that the performance of both media is nearing each other and hence the merging of nanofibers is not very high for that data point. If the data was to be collected for unit amount of nanofibers less than 1×, it would be clear that the performance of both media type would have been even far closer.

This unique difference between the two types of media construction is the underlying starting point of our evaluation, where we have evaluated the nanofiber/spacer particles media for HEPA level performance.

The data of FIG. 19 is also shown in the table below in an attempt to explain the details of test results.

TABLE 1

| Example | | Test Velocity fpm | Efficiency % | Penetration % | Resistance mmH$_2$O | Calc Perm (fpm/.5") | Pressure Drop in H$_2$O | FOM (cm/sec)/cm Hg |
|---|---|---|---|---|---|---|---|---|
| 1 | Only Fibers | 10.5 | 77.547 | 22.453 | 7.164 | 18.61 | 0.28 | 152 |
| 2 | Comp. | 10.5 | 90.797 | 9.203 | 6.404 | 20.82 | 0.25 | 271 |
| 3 | Only Fibers | 10.5 | 74.313 | 25.687 | 28.697 | 4.65 | 1.13 | 34 |
| 4 | Comp. | 10.5 | 97.782 | 2.218 | 10.504 | 12.70 | 0.41 | 263 |
| 5 | Only Fibers | 10.5 | 87.542 | 12.458 | 76.856 | 1.71 | 3.03 | 20 |
| 6 | Comp. | 10.5 | 97.161 | 2.839 | 9.395 | 14.19 | 0.37 | 275 |
| 7 | Only Fibers | 10.5 | 91.253 | 8.747 | 183.938 | 0.72 | 7.24 | 10 |
| 8 | Comp. | 10.5 | 99.863 | 0.137 | 17.193 | 7.76 | 0.68 | 278 |

The darker gray-shaded columns are the outputs of the TSI 3160 fractional efficiency test bench; the lighter-shaded-shaded columns (the last three to the right) are calculated based on the output data.

Efficiency and Pressure Drop Evaluation of Nanofiber, Glass and PTFE Media

Glass media samples used in this study were supplied by the manufacturer in three different levels of efficiencies 93%, 97% and 99.99% HEPA. These are all commercially available grades of glass media. PTFE media is also commercially available and was laminated to a spunbond substrate. Nanofiber media samples were created experimentally in-house using nanofibers and spacer particles and they were generated at five different efficiency levels covering a broad range from 90% to 99.99% depending upon the face velocity used in the fractional efficiency test bench.

We will now describe the specifics of each of the five samples.

EXAMPLE 9

The run cycle for this particular sample was:

| | |
|---|---|
| 1 min | Electrospinning of nylon solution and blend of polymer solution simultaneously (all four stations) |
| +2 min | Electrospinning of nylon solution and blend of polymer solution simultaneously and deposition of SP-500 nylon microspheres (all four stations) |
| +2 min | Only electrospinning of nylon solution (only Stations 2 and 3) |

The total run time to generate this sample took 5 minutes. Amount of SP-500 nylon microspheres discharged was 9.5 g. The media was heated to 300° F. for 10 minutes in a lab oven in an attempt to increase the bond strength between electrospun fibers and microspheres. After that, 4 inch diameter samples were cut and tested on TSI 3160 fractional efficiency test bench.

EXAMPLE 10

The run cycle for this particular sample was:

| | |
|---|---|
| 1 min | Electrospinning of nylon solution and blend of polymer solution simultaneously (all four stations) |
| +7 min | Electrospinning of nylon solution and blend of polymer solution simultaneously and deposition of SP-500 nylon microspheres (all four stations) |
| +2 min | Only electrospinning of nylon solution (only Stations 2 and 3) |

The total run time to generate this sample took 10 minutes. Amount of SP-500 nylon microspheres discharged was 14 g. The media was heated to 300° F. for 10 minutes in a lab oven in an attempt to increase the bond strength between electrospun fibers and microspheres. After that, 4 inch diameter samples were cut and tested on TSI 3160 fractional efficiency test bench.

EXAMPLE 11

The run cycle for this particular sample was:

| | |
|---|---|
| 1 min | Electrospinning of nylon solution and blend of polymer solution simultaneously (all four stations) |
| +13 min | Electrospinning of nylon solution and blend of polymer solution simultaneously and deposition of SP-500 nylon microspheres (all four stations) |
| +2 min | Only electrospinning of nylon solution (only Stations 2 and 3) |

The total run time to generate this sample took 16 minutes. Amount of SP-500 nylon microspheres discharged was 28 g. The media was heated to 300° F. for 10 minutes in a lab oven in an attempt to increase the bond strength between electrospun fibers and microspheres. After that, 4 inch diameter samples were cut and tested on TSI 3160 fractional efficiency test bench.

EXAMPLE 12

The run cycle for this particular sample was:

| | |
|---|---|
| 1 min | Electrospinning of nylon solution and blend of polymer solution simultaneously (all four stations) |
| +11 min | Electrospinning of nylon solution and blend of polymer solution simultaneously and deposition of SP-500 nylon microspheres (all four stations) |
| +2 min | Only electrospinning of nylon solution (only Stations 2 and 3) |

The total run time to generate this sample took 14 minutes. Amount of SP-500 nylon microspheres discharged was 27 g. The media was heated to 300° F. for 10 minutes in a lab oven in an attempt to increase the bond strength between electrospun fibers and microspheres. After that, 4 inch diameter samples were cut and tested on TSI 3160 fractional efficiency test bench.

EXAMPLE 13

The run cycle for this particular sample was:

| | |
|---|---|
| 1 min | Electrospinning of nylon solution and blend of polymer solution simultaneously (all four stations) |
| +15 min | Electrospinning of nylon solution and blend of polymer solution simultaneously and deposition of SP-500 nylon microspheres (all four stations) |
| +2 min | Only electrospinning of nylon solution (only Stations 2 and 3) |

The total run time to generate this sample took 18 minutes. Amount of SP-500 nylon microspheres discharged was 49 g. The media was heated to 300° F. for 10 minutes in a lab oven in an attempt to increase the bond strength between electrospun fibers and microspheres. After that, 4 inch diameter samples were cut and tested on TSI 3160 fractional efficiency test bench.

The table presented below shows the results of the measurements conducted on TSI 3160 fractional efficiency test bench, using dioctyl-phthalate particles. These results are only for 0.3 micron DOP particle size, which is largely the most important particle size as most HEPA standards refer to that particular size as the requirement of meeting 99.97% efficiency.

TABLE 2

| Example | ID on the graph | Test Velocity fpm | Efficiency % | Penetration % | Resistance mmH₂O | Calc Perm (fpm/.5") | Pressure Drop in H₂O | FOM (cm/sec)/cm Hg |
|---|---|---|---|---|---|---|---|---|
| 9 | A1 | 5.0 | 93.480 | 6.520 | 3.101 | 20.47 | 0.12 | 304 |
| 10 | B1 | 5.0 | 98.021 | 1.979 | 4.407 | 14.41 | 0.17 | 309 |
| 11 | C1 | 5.0 | 99.836 | 0.164 | 7.233 | 8.78 | 0.28 | 307 |
| 12 | D1 | 5.0 | 99.930 | 0.070 | 8.311 | 7.64 | 0.33 | 307 |
| 13 | E1 | 5.0 | 99.989 | 0.011 | 10.376 | 6.12 | 0.41 | 304 |
| 9 | A2 | 10.5 | 90.797 | 9.203 | 6.404 | 20.82 | 0.25 | 271 |
| 10 | B2 | 10.5 | 97.161 | 2.839 | 9.395 | 14.19 | 0.37 | 275 |
| 11 | C2 | 10.5 | 99.688 | 0.312 | 15.316 | 8.71 | 0.60 | 274 |
| 12 | D2 | 10.5 | 99.863 | 0.137 | 17.193 | 7.76 | 0.68 | 278 |
| 13 | E2 | 10.5 | 99.969 | 0.031 | 21.808 | 6.11 | 0.86 | 270 |
| 9 | A3 | 18.0 | 90.790 | 9.210 | 10.888 | 21.00 | 0.43 | 272 |
| 10 | B3 | 18.0 | 96.632 | 3.368 | 16.132 | 14.17 | 0.64 | 260 |
| 11 | C3 | 18.0 | 99.598 | 0.402 | 26.466 | 8.64 | 1.04 | 260 |
| 12 | D3 | 18.0 | 99.738 | 0.262 | 29.478 | 7.75 | 1.16 | 251 |
| 13 | E3 | 18.0 | 99.957 | 0.043 | 37.711 | 6.06 | 1.48 | 257 |

The darker gray-shaded columns are the outputs of the TSI 3160 fractional efficiency test bench; the lighter-shaded-shaded columns (the last three to the right) are calculated based on the output data.

These are the results from the commercial media used as benchmarks in this study; again the 0.3 micron DOP particle size results are reported below.

TABLE 3

| ID | Test Velocity fpm | Efficiency % | Penetration % | Resistance mmH₂O | Calc Perm (fpm/.5") | Pressure Drop in H₂O | FOM (cm/sec)/cm Hg |
|---|---|---|---|---|---|---|---|
| 93 DOP | 5.0 | 94.881 | 5.119 | 4.718 | 13.46 | 0.19 | 219 |
| 97 DOP | 5.0 | 98.951 | 1.049 | 7.053 | 9.00 | 0.28 | 222 |
| 99.99 HEPA | 5.0 | 99.995 | 0.005 | 13.448 | 4.72 | 0.53 | 256 |
| PTFE HEPA | 5.0 | 100.000 | 0.000 | 19.259 | 3.30 | 0.76 | 279 |
| 93 DOP | 10.5 | 92.766 | 7.234 | 10.059 | 13.26 | 0.40 | 189 |
| 97 DOP | 10.5 | 98.215 | 1.785 | 15.130 | 8.81 | 0.60 | 193 |
| 99.99 HEPA | 10.5 | 99.983 | 0.017 | 28.704 | 4.65 | 1.13 | 221 |
| PTFE HEPA | 10.5 | 100.000 | 0.000 | 40.109 | 3.32 | 1.58 | 274 |
| 93 DOP | 18.0 | 91.273 | 8.727 | 17.292 | 13.22 | 0.68 | 175 |
| 97 DOP | 18.0 | 97.597 | 2.403 | 25.995 | 8.79 | 1.02 | 178 |
| 99.99 HEPA | 18.0 | 99.971 | 0.029 | 49.247 | 4.64 | 1.94 | 206 |
| PTFE HEPA | 18.0 | 100.000 | 0.000 | 69.077 | 3.31 | 2.72 | 246 |

The dark gray-shaded columns are the outputs of the TSI 3160 fractional efficiency test bench; the light gray-shaded columns (the last three to the right) are calculated based on the output data.

Figure 17:
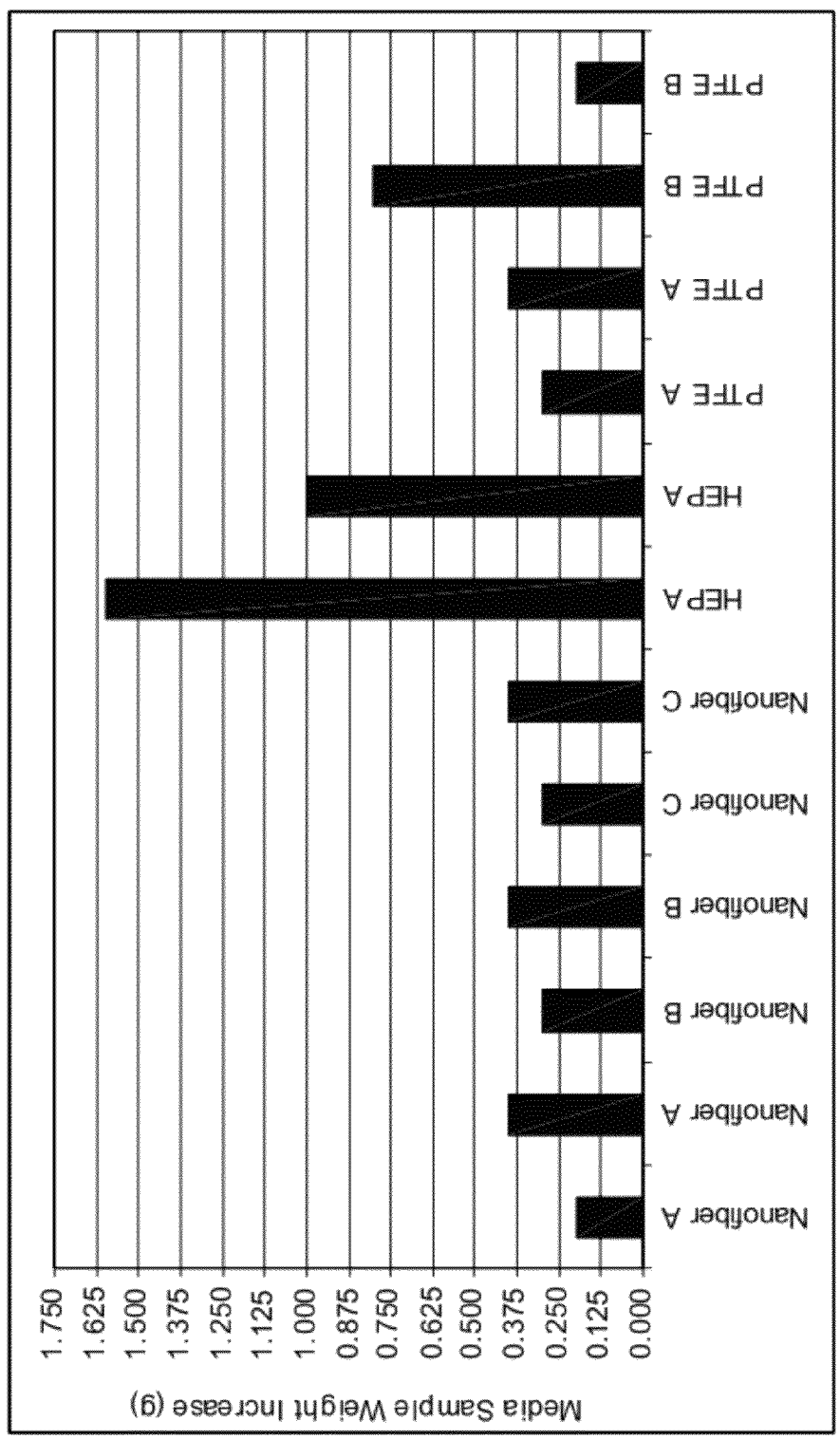
Figure 18:
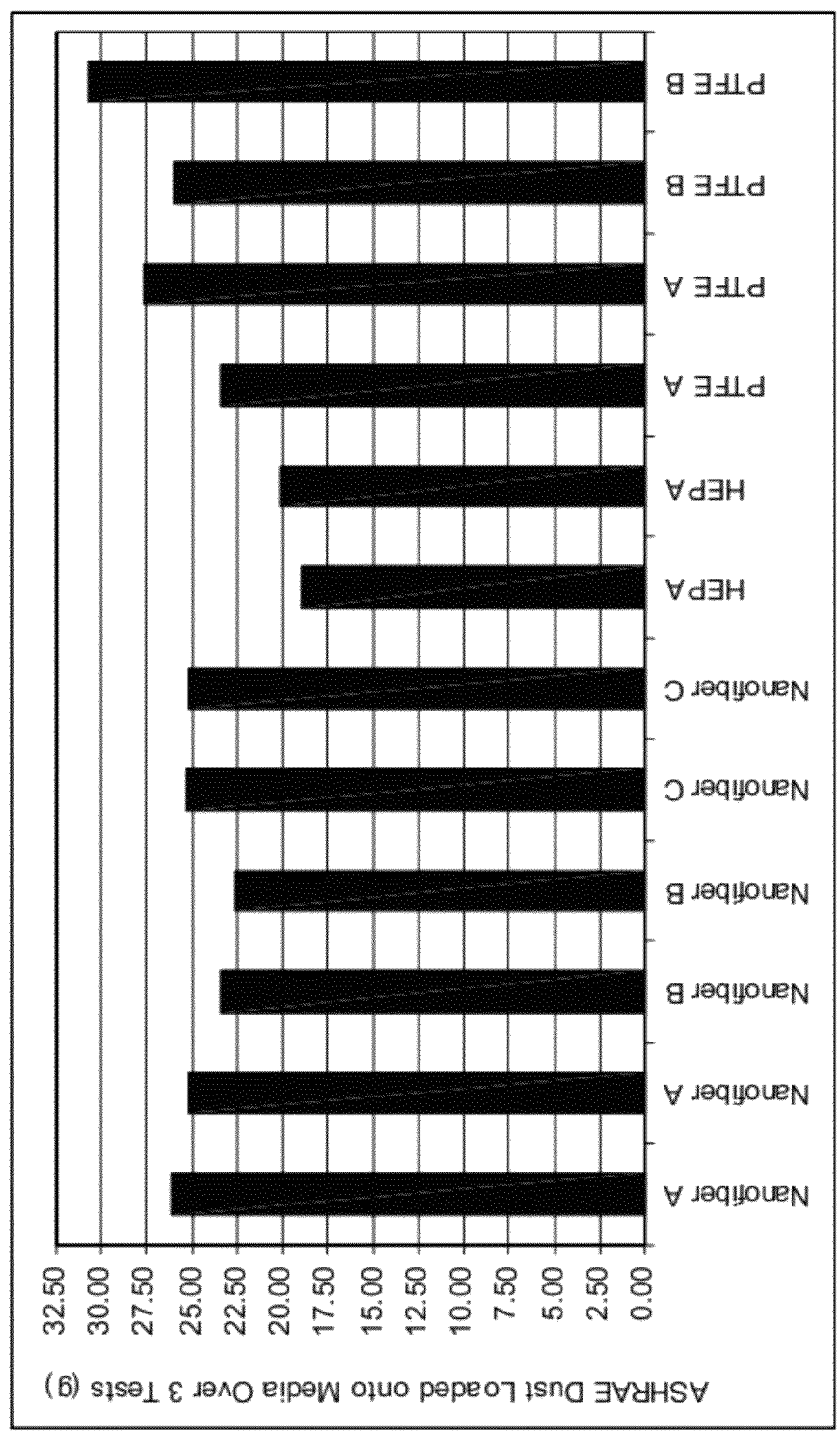

As one can see from FIGS. 17, 18 and 19, the nanofiber media had a lower pressure drop than glass media in all levels of penetration at all three different face velocities. The PTFE media has a much greater pressure drop; however, it also has a greater efficiency than both the nanofiber media and the glass media.

To represent the differences in a more comprehensible format, we have plotted the results using −Ln(penetration as the x axis in FIGS. 17, 18 and 19. As one can see from these figures, the pressure drop across the media is significantly lower for the nanofiber media compared to that of glass media in all three different face velocities. The data points obtained for nanofiber media and the glass media were extrapolated with a very good correlation in order to assess their relative performance against PTFE HEPA media. It is evident that nanofiber media has very similar—if not slightly better—performance than that of PTFE HEPA in all three different face velocities, whereas glass media had a greater pressure drop in all cases within the confidence levels of the extrapolation.

Instead of simply stating that nanofiber media has performed better than glass in all efficiency-pressure drop comparisons; using the data presented in FIGS. 17, 18 and 19, we have derived the following equations for the nanofiber media that describes the relationship between pressure drop and penetration for three different face velocities: 5, 10.5 and 18 ft/min$^{-1}$:

$$dP_{5 fpm} = (-\text{Ln(penetration)} \times 0.045) - 0.0019$$

$$dP_{10.5 fpm} = (-\text{Ln(penetration)} \times 0.1053) - 0.004$$

$$dP_{18 fpm} = (-\text{Ln(penetration)} \times 0.1973) - 0.0361$$

Using these equations, we have calculated the exact pressure drop across the nanofiber media for a given −Ln(penetration) value that matches those of glass media. The difference between each correlating pressure drop of glass and nanofiber media was accounted for in FIG. 20, where the decrease in initial pressure drop using nanofiber media is presented. As one can see from this figure, it is very clear that the nanofiber media provided 15-35% lower pressure drop than glass media for the same level of efficiency depending upon the face velocity.

Figure 21:
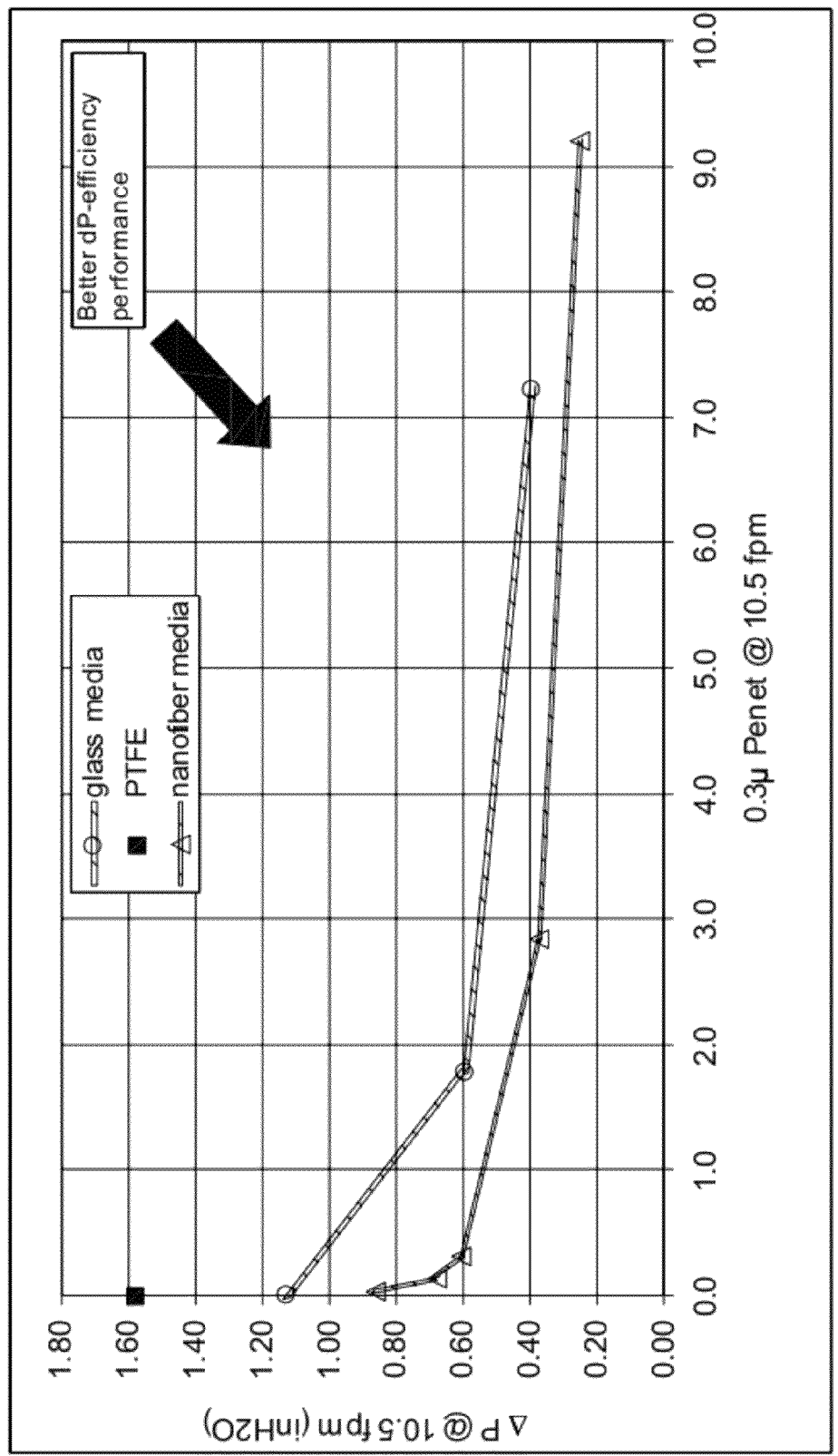

While all the results presented so far have focused on 0.3 micron DOP as the particle size of interest and for simplicity, the data was nevertheless gathered for a broad range of particle size. While we will not attempt to plot each graph for all different particle sizes, FIG. 21 depicts the FOM as a function of particle size for the 97 DOP glass media and its nanofiber equivalent. As one can see from this figure, both types of media performed very similarly until about 0.09 micron DOP particle size, and beyond that nanofiber media started to show important gains in FOM over glass media. This trend has been very similar for all different levels of efficiencies tested.

Scanning Electron Microscope (SEM) micrographs showing the nanofiber/spacer particle media construction of several samples are also presented. FIG. 10 is a cross section image of a thinner construction compared to that of FIG. 11. By varying the thickness of the media, we were able to modify the efficiency/pressure drop performance of the structure consistently. As one can see, the samples appear to be very uniform in thickness in the sampled area. The substrate fibers can be seen in the lower portions of both images.

FIG. 12 is showing the composite from the bottom side, where the substrate fibers are clearly visible in the front. From this image one can see that the spacer particles are tightly bound within the nanofiber matrix and that the substrate fiber surface is free from any particle that might act as a contaminant. The FIG. 13 shows the composite mounted in the orientation where the top view is visible. And it is very clear that spacer particles are also very well bounded in the upstream of the media.

FIG. 14 and FIG. 15 are high and low magnification views of typical nanofiber composite cross sections. FIGS. 14 and 15 are close up cross section (SEM) views of the composite, where one can see the nanofibers within the depth of the composite very clearly. It is largely these fibers and the interstitial space created within them that fuels the high efficiency of the structure. From this high magnification view, one can also see that some of the particles appear suspended in the air by their attachment to a single fiber, which tells us a lot about the tenacity of the fibers.

The volume contribution of nanofibers and spacer particles in a given sample was characterized. The sample used in this characterization was produced per Example 6; furthermore the SEM micrograph of the sample is presented in FIG. 10. Using this micrograph, thickness of the nanofiber coating on the substrate was measured as 43.577 microns (std. dev. 3.2) and based on this information the total volume of the nanofiber coating was calculated as 353.3 mm$^3$ for 4 inch diameter sample. A 4 inch diameter sample of substrate was cut and the weight was measured. Similarly, we have measured the weights of the sample produced per Example 6 and Example 5. Example 5 has the same amount of nanofibers as in Example 6; however Example 6 also has the spacer particles. The difference between the weights of the sample in Example 5 and the substrate gave us the weight of the nanofibers. And the difference between the weights of the sample in Example 6 and Example 5 gave us the weight of the spacer particles. Using the specific gravity for the fibers (around 1.1 g/cm$^3$) and the spacer particles (around 1 g/cm$^3$), the volume of nanofibers and spacer particles are calculated. In the given 4 inch diameter sample, having a thickness of 43.577 microns, the nanofiber volume was 4.02 mm$^3$, and the spacer particle volume was 69.3 mm$^3$. In other words total solids volume was 73.32 mm$^3$. When this value is compared with the total volume of the sample (353.3 mm$^3$); the contribution of each component to the total volume is calculated as follows: 1.14 vol % of nanofibers, 19.62 vol % of spacer particles and a void volume of 79.24 vol %.

Cleanability, Pleatability and Compressibility Assessment of Nanofiber Media
Pulse-Cleanability FIG. 23a shows the performance of a HEPA level glass media and its nanofiber equivalent on a loading/pulse cleaning test bench in flat sheet form, where both samples are fed Atomite dust particles simultaneously on the test bench and pulse-cleaned with compressed air at timed intervals. Atomite dust is a free-flowing calcium carbonate powder with a broad size distribution as shown in Table 4. The computer and data collection system monitors the pressure drop across the media and registers it right before and after the air pulse blows from the downstream of the media in an attempt to dislodge the dust and clean the media. The dislodged dust then collects in a reservoir. See FIG. 22 for detailed information about the system. Using this test bench, pulse-cleanability of different media can be assessed and compared simultaneously. The simultaneous operation is important because the method eliminates any inconsistencies that may occur due to external factors such as humidity, temperature, particle size distribution of the challenge dust etc.

TABLE 4

| Equivalent Spherical Diameter (microns) | Atomite (%) |
| --- | --- |
| 20 | 100 |
| 10 | 92 |
| 5 | 75 |
| 3 | 49 |
| 2 | 32 |
| 1 | 16 |
| 0.5 | 8 |

Figure 22:
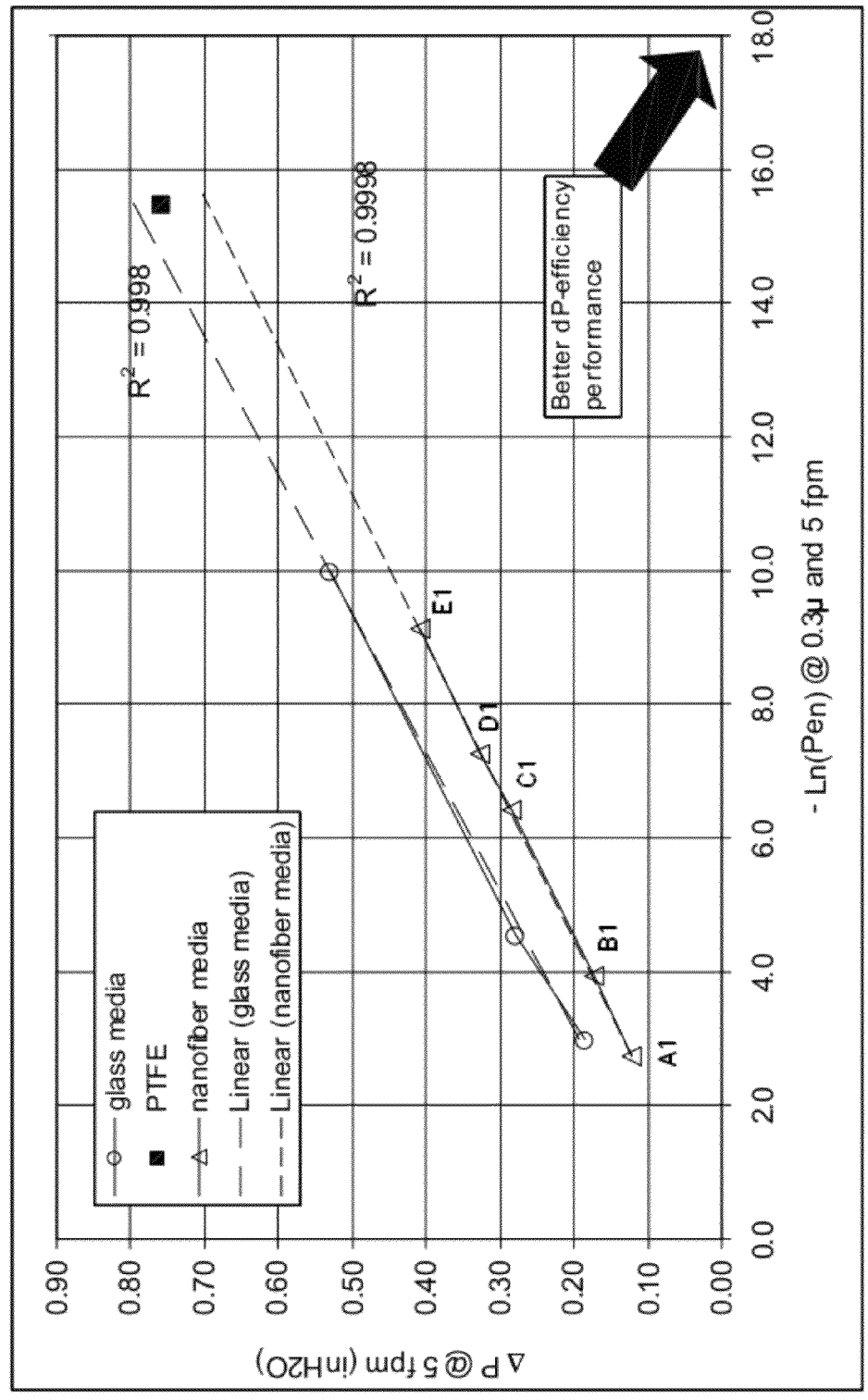

In this test, we have used 20 psi air pressure to clean the media using the test structure of FIG. 22. The glass media (not shown) did not hold up well against the compressed air, and ruptured after only several pulses, in about 15 minutes. On the contrary, the nanofiber media (not shown) was held intact. The rupturing of the glass media is not surprising as glass HEPA media is typically engineered not to be cleaned, and that the fragile nature of glass media inhibits any resistance to such mechanical stress. On the other hand, the nanofiber media performed very well as it reached a steady state pressure drop in relatively short duration of time, evident by the plateau observed after 150 minutes in FIG. 23a.

For comparison purposes, we have presented a graph from a different test, where the pulse-cleanability was assessed with and without the presence of nanofibers on the substrate surface. This can be seen in FIG. 23b. One can see from this figure that without nanofibers on the surface of the substrate, the pressure drop did not seem to reach a steady state even after 2200 minutes of testing, whereas the nanofiber composite reached the relative equilibrium after about 200 minutes of testing.

Based upon this data, it is evident to see that the nanofiber media with HEPA level of efficiency, pulse-cleaned successfully without any observable damage to the nanofiber composite. SEM micrographs were taken after the pulse-cleaning study to look for signs of damage; FIGS. 24a and 24b depict the conditions in which the media was in after testing. It is visible to see the calcium carbonate layer on the surface of the nanofiber coating in FIG. 24a; and on the back side of the media there does not seem to be any penetration of the calcium carbonate particles evidenced by FIG. 24b.

Pleatability

Pleating trial was carried out using a knife type pleating machine, where one inch pleat height was used to pleat the nanofiber media. In general, it is known that knife type pleaters has the tendency to rub against the media surface, and thus can induce greater damage than rotary pleaters. We have achieved good pleatability when the nanofiber media was protected using another scrim or a release liner on top of the nanofiber layer; the pleat pack with the scrim on top can be seen in FIGS. 27 and 28, the pleat pack with the protective liner on top can be seen in FIGS. 31 and 32.

Figure 25:
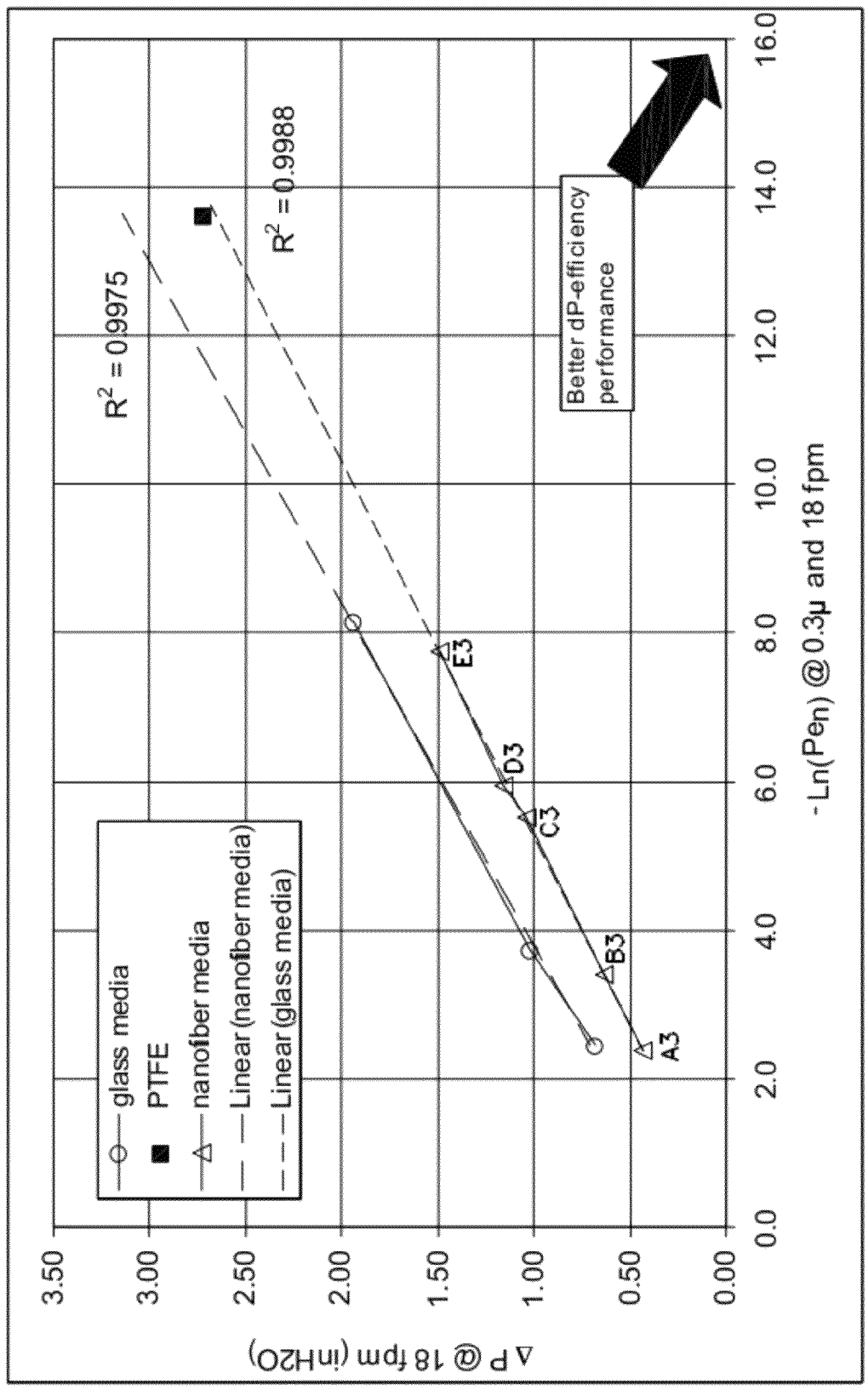

FIGS. 25 and 26 are from the sample where nanofiber media was pleated with a scrim on top. These SEM images are recorded with the protective scrim still on top of the pleated media.

FIGS. 36 and 37 are from the sample where nanofiber media was pleated with a protective release liner on top. The media pleated very well, and later we removed the release liner from the nanofiber media surface. The SEM images of FIGS. 36 and 37 are captured after removing the liner. Even after removing the release liner, the pleat shapes were retained.

After obtaining the pleated samples, we have done a series of fractional efficiency measurements on the samples, and noted that the efficiencies were very close to the efficiency of the unpleated sample. The original sample had an efficiency of 99.937 (0.3 micron DOP @10.5 fpm), whereas the efficiency of the pleated samples ranged from 99.582 to 99.974%.

Compressibility

The nanofiber media with spacer particles relies on establishing a large void volume in order to improve the air permeability while providing significant levels of particulate efficiency. This desired property of high void volume, in other words low solidity is critical for the proper performance of the media. The most critical aspect from a manufacturing standpoint of view that can hurt this property can take place during rewinding of the media into a roll form, as with too much web tension, the media can get compressed and may lose its void volume.

In an attempt to understand the effect of compression force, we have devised an in-house test apparatus, where several samples were subjected to different compression force by application of weight to the sample surface. To do that, we have cut samples slightly larger than 3 inches in diameter, and measured the efficiency of each sample using TSI 3160 fractional efficiency test bench operated at 10.5 fpm face velocity using DOP particles ranging from 0.02 to 0.4 micron in size. The test bench utilizes only 3 inch diameter sample area for the test measurement. After we have established the baseline efficiency for each sample, we subjected each sample to different amounts of loads: 4.5, 19.1 and 47.4 lbs. The samples were secured between two 3 inch diameter sample holders, and the force was applied from the top for 1 minute. After the force was removed, we tested the efficiency and pressure drop of the same samples and compared the results with those of baseline values. Pressure was calculated by dividing the total weight on the sample surface by the surface area of the 3 inch diameter sample holder.

The results are shown in FIG. 33, where change (+ or −%) in Figure of Merit is presented as a function of compression pressure and DOP particle size. The compression at 2.7 psi benefited more than the compression at 0.64 psi; it is interesting to see that negative change in void volume helped increase the FOM of the media. This is, in large part, due to the increase in 4 efficiency of the structure as it collapsed only slightly; the pressure drop also increased slightly but overall the increase in efficiency shadowed the increase in pressure drop. When the compression pressure was increased to 6.7 psi, the FOM dropped significantly. This was fueled by a slight decrease in efficiency, but significant increase in pressure drop of the media. In this case, the pressure drop increased from 0.742 to 0.802 inch of water.

Based upon this test, we can conclude that the media is susceptible to compression and the performance can be dictated by the amount of it. We have presented evidence that not all compression has negative impact on the performance, but the amount is critical. This is most important for the web tension in the rewinding process and requires careful adjustment and control.

EXAMPLE 14

The filtration media presented in FIGS. 1 to 3 were made using the particulate material of SP-500 available from Kobo Products, Inc., South Plainfield, N.J. The particulate material SP-500 is composed of Nylon 12 and has a particle size range of 90% less than 10 microns, and 100% less than 20 microns, according to the specifications of the manufacturer. The particle size distribution of this particle is presented in FIG. 7b. A polyamide based polymer solution of 11.5 wt % solids was prepared according to the teachings of U.S. Pat. No. 6,743,273, and cooled down to the room temperature. To a known amount of this solution, we have added 11.5 wt % of SP-500 particulate material. Including the polymer solids already in the solution, overall solids content was increased to 23 wt % with the addition of the particulate material. Despite the fact that solids content of the solution was doubled as a result of the addition of particulate material, the viscosity of the solution measured using a Brookfield viscometer, increased only about 47%. This is a very good indication as it professes that electrospinning of this solution will be not much complicated than the original 11.5 wt % polymer solution.

The solution was processed using electrospinning method in a horizontal configuration. The spinning dope was loaded into a syringe and forced to exit from the tip of a 20-gauge needle at a constant rate using a syringe pump. A known voltage was applied to the needle in order to induce electric charges to the solution for spinning Electrospun fibers along with particulate material were collected on an aluminum foil attached onto a rotating drum. The electric field created between the charged needle and the grounded aluminum foil/metal drum facilitated the production of fibers. The particulate material ejected from the needle tip is accelerated and deposited onto the aluminum foil by the momentum gathered from the motion of the electrospinning jet/fiber. Consequently, a composite media with fibers and spacer particulate material is created on the aluminum foil.

EXAMPLE 15

In another embodiment of the invention, the filtration media (not shown) was made using a step-by-step approach. The polyamide based polymer solution was made again according to the teachings of U.S. Pat. No. 6,743,273 and electrospun using a similar needle-syringe setup at constant feed rate and applied voltage. The fibers were electrospun and deposited onto a synthetic substrate (available under the trade name of Cerex™). Deposition was performed for a limited amount of time and was controlled by the substrate speed; as the substrate moved out of the spinning zone, the deposition was stopped. The syringe-needle setup was oriented vertically to ensure that the fibers deposited in the direction of earth's gravitational field. A grounded collector was placed underneath the needle at a fixed distance apart from it in order to create the necessary electric field.

Once the first layer of electrospun fibers was built on the substrate, the composite media was then moved to a second stage for the particulate material application. The second stage consisted of a fine sieve and a vacuum box. The sieve used a fine mesh that had openings of 43 micron according to the specifications of manufacturer, TWP Inc., Berkeley, Calif. The composite media was put on the vacuum box and the sieve was located at a fixed distance up from the composite media. The vacuum box created an airflow pattern that directed the sieved particulate material onto the composite media. The sieve was vibrated to ensure the flow of particulate material located inside the reservoir (upstream) side of the sieve to the composite media located on the downstream side of the sieve.

The particulate material used in this example was 091 DU 140, available from Expancel Inc., Duluth, Ga. The particulate material 091 DU 140 is a hollow polymer encapsulating a hydrocarbon blowing agent that exerts pressure upon heating. As a result of increased pressure and softening of the polymer skin, the particulate material increases its dimension. According to the manufacturer, the particulate material 091 DU 140 has a particle size of 35-45 micron in unexpanded form.

After depositing a certain amount of the particulate material on to the electrospun fiber matrix, the same fiber deposition procedure was repeated to ensure a second layer of fiber matrix, thereby sandwiching the particulate material in between the two layers of electrospun fiber matrix.

EXAMPLE 16

In this embodiment of the invention, the polyamide based polymer solution was again prepared according to the teachings of the U.S. Pat. No. 6,743,273. The polymer solution was loaded into a syringe and forced to exit from the tip of 20-gauge needle using a syringe pump at a rate of 0.03 ml/min. The high voltage of 16 kilovolts was introduced to the needle while the rotating metal drum was electrically grounded, thereby an electric field was established between the needle and the drum. The drum and the orifice of the needle were separated by 2.5 inches. The syringe located on one end of a base stand was pivoted horizontally from the other end of the base using an electric motor in order to widen the fiber deposition pattern on the metal drum. While electrospinning was performed horizontally, the particulate material was deposited vertically by positioning the sieve on top of the drum at a fixed distance apart from it. The sieve was connected to a pneumatic rotary ball vibrator, where the vibration frequency was controlled by controlling the air pressure.

Using this setup we have succeeded in simultaneous deposition of fibers and particulate material onto a rotating drum independent from each other. The composite material was deposited on to a synthetic substrate, Cerex, which is highly permeable and have very low efficiency. The filtration media is presented in FIGS. 5 and 6.

The particulate material used in this example was made of cellulose and it is available from Kobo Products Inc., South Plainfield, N.J. under the product name of Cellulo Beads D-50. According to the manufacturer, the Cellulo D-50 has an average particle diameter of 40 microns. The materials of Example 16 were made with and without particulate.

To compare the fiber/particulate matrix and a fiber-only matrix we have conducted experiments where electrospinning of fibers was performed for a fixed amount of time. The first sample named "NS" was prepared by electrospinning the polymer solution at a fixed solution feed rate, applied voltage and target distance for a fixed amount of time onto a Cerex substrate. The second sample named "S" was prepared using all same spinning conditions but in addition simultaneously introducing particulate material Cellulo D-50 using the sieve arrangement described above. Since electrospinning of fibers is independent from the particulate deposition, and that same spinning conditions are used for both samples, the number of electrospun fibers and their deposition area is expected to be the same for both "NS" and "S". The difference in their filtration performance can be attributed to the fact that only "S" has particulate material embedded within the fiber matrix.

Upon collecting the samples, we have stamped out 4 samples from each condition using a 47 mm diameter die for testing of efficiency using LEFS (Low Efficiency Flat Sheet) media test bench. Before testing the actual samples, the test bench was calibrated and a control sample CS-6001 was tested and efficiency of the control sample was verified. The samples were tested at a face velocity of 13.21 ft/min and using 0.78 micron latex challenge particles. Results are presented in the table below:

TABLE 5

| Media ID | Pressure Drop (inches of Water) | Efficiency (%) | Figure of Merit |
|---|---|---|---|
| S1 | 0.421 | 98.18 | 342 |
| S2 | 0.355 | 89.41 | 227 |
| S3 | 0.371 | 99.53 | 519 |
| S4 | 0.382 | 99.23 | 458 |
| NS1 | 0.590 | 99.52 | 325 |
| NS2 | 0.632 | 99.63 | 318 |
| NS3 | 0.639 | 99.82 | 355 |
| NS4 | 0.620 | 99.92 | 413 |

From the data above, one can make direct comparison between the samples "S3" and "NS1", where the efficiency of both samples almost overlap and yet "NS1" has a pressure drop measurement about 1.59 times higher than that of "S3". This data clearly proves that by introducing the particulate material into the fiber matrix, the structure became more permeable and yet has comparable efficiency. It is obvious from the data that much higher efficiencies can be achieved with good levels of permeability using the fiber/particulate structures.

The sample "S2" has poor efficiency and it is likely related to some imperfections (defects) in the fiber/particulate structure. For example, it is likely that a spacer particulate might have been dislodged from the structure as a result of abrasion etc. leaving a hole behind it. While such defects are important and should be avoided, it is also encouraging to observe an efficiency of 89.41% even in the presence of the defect. In other words, because the structure it constructed from multiple layers of fibers, the defect at one of the layer (likely at the top most upstream surface) does not result in complete failure of the media as it retains some filtration efficiency. One can easily understand that if the media had a single layer of fine fiber filtration surface, the defect on that single layer would have resulted in significant performance loss. The advantageous nature of the fiber/particulate structure is illustrated in FIG. 6.

The samples described above were weighed along with 4 of the substrate-only samples. Each sample has a diameter of 47 mm. Therefore the total surface area for each sample equals to 1735 mm$^2$. Results of weight, basis weight and percent contribution are described below:

TABLE 6

| Sample ID | Weight (g) |
|---|---|
| Sub1 | 0.0839 |
| Sub2 | 0.0816 |
| Sub3 | 0.0806 |
| Sub4 | 0.0759 |
| Average Substrate | 0.0805 |
| NS1 | 0.0882 |
| NS2 | 0.0918 |
| NS3 | 0.1052 |
| NS4 | 0.0878 |
| Average Substrate + Nanofiber | 0.09325 |
| S1 | 0.1036 |
| S2 | 0.1007 |
| S3 | 0.0981 |
| S4 | 0.1013 |
| Average Substrate + Nanofiber + Sphere | 0.100925 |

TABLE 7

| Weight Distribution for 1735 mm$^2$ Area | g |
|---|---|
| Nanofiber + Sphere Composite | 0.020425 |
| Nanofiber Only | 0.01275 |
| Sphere Only | 0.007675 |

TABLE 8

| Basis Weight | mg/mm$^2$ |
|---|---|
| Nanofiber + Sphere Composite | 1.176E−02 |
| Nanofiber Only | 7.34E−03 |
| Sphere Only | 4.42E−03 |

TABLE 9

| Components in the Nanofiber + Sphere Composite | % wt |
|---|---|
| Nanofiber Only | 62.42 |
| Sphere Only | 37.58 |

In an attempt to verify/duplicate these weight measurements presented in the table above, we have measured the diameter of all visible spheres on the scanning electron micrograph presented in FIG. 6. FIG. 7a is the histogram describing the size range and count of the generally spherical particulate. The manufacturer of spheres, Kobo Products Inc., specifies the density of Cellulo D-50 as 0.91 g/ml. By using the volume of each individual sphere counted on FIG. 6, we can calculate the total mass of the spheres and the following results.

TABLE 10

| | | |
|---|---|---|
| Total Sphere Weight | 4.749E−03 | mg |
| Total Fiber Weight (Calculated Using Sphere Weight) | 7.889E−03 | mg |
| Total Composite (Sphere + Fiber) Weight | 1.264E−02 | mg |
| Area of the Scanning Electron Micrograph (Drawing 6) | 1.255 | mm$^2$ |
| Basis Weight | 1.007E−02 | mg/mm$^2$ |

TABLE 11

| Assume 16.8% of the Total Weight Unaccounted For | | |
|---|---|---|
| Unaccounted Fiber % | 10.49 | % |
| Unaccounted Fiber Weight | 1.056E−03 | mg/mm$^2$ |
| Unaccounted Sphere % | 6.31 | % |
| Unaccounted Sphere Weight | 6.357E−04 | mg/mm$^2$ |
| Unaccounted Total % | 16.80 | % |
| Unaccounted Total Weight | 1.692E−03 | mg/mm$^2$ |
| Refined Basis Weight | 1.176E−02 | mg/mm$^2$ |

From the calculation above, it is clear that we have not been able to account for only 6.31% wt of all the spheres present on FIG. 6, whereas the majority has been successfully accounted for. This is very likely a result of these spheres not being in the focus of the Scanning Electron Microscope's electron-beam. By incorporating this discrepancy into the calculation, we have been able to independently verify the basis weight presented in Table 8.

Table 12 shows a comparison of a filter mass made with the spacer materials and without the spacer materials. The table of data and FIG. 8 show data from testing of the material prepared substantially as shown in Example 16 which includes both a fiber with spacer and a fiber matrix in the absence of spacer particulate. In the data, penetration is determined by the formula:

penetration=1−efficiency;

with efficiency being measured as discussed below. Resistance is identical to the pressure drop or ΔP across the fiber mass. Figure of Merit is a derived parameter based on penetration and resistance. As can be seen from the table of data that is graphically represented in FIG. 8, the inclusion of spacer particulate in the fiber mass substantially reduces (improves) penetration throughout the particle size range tested (0.02 through 0.4). The effect is most marked at low particle sizes that range from about 0.02 to about 0.2 micron. Similarly, the Figure of Merit of the fiber mass with spacer particulate is also markedly improved over the fiber matrix alone. Again, the improvement is most marked at the small particle sizes mentioned above.

TABLE 12

| Particle Size (micron) | Example 16 (Fiber/Spacer-Matrix) | | | Example 16 (Fiber Matrix No Spacer) | | |
|---|---|---|---|---|---|---|
| | Penetration (%) | Resistance (mmH$_2$O) | Figure of Merit | Penetration (%) | Resistance (mmH$_2$O) | Figure of Merit |
| 0.02 | 0.82 | 12.00 | 290 | 2.90 | 11.50 | 223 |
| 0.03 | 1.40 | 12.00 | 258 | 5.00 | 11.50 | 189 |
| 0.04 | 2.10 | 12.00 | 233 | 6.00 | 11.50 | 177 |
| 0.05 | 2.60 | 12.10 | 219 | 7.10 | 11.50 | 167 |
| 0.06 | 2.90 | 12.10 | 212 | 7.40 | 11.50 | 164 |
| 0.07 | 3.20 | 12.10 | 206 | 7.90 | 11.60 | 159 |
| 0.08 | 3.40 | 12.10 | 203 | 7.60 | 11.50 | 163 |
| 0.09 | 3.60 | 12.10 | 199 | 7.90 | 11.50 | 160 |
| 0.1 | 2.80 | 12.10 | 214 | 6.20 | 11.50 | 175 |
| 0.2 | 1.20 | 12.20 | 263 | 2.70 | 11.70 | 224 |
| 0.3 | 0.44 | 12.20 | 323 | 1.00 | 11.70 | 285 |
| 0.4 | 0.29 | 12.20 | 347 | 0.43 | 11.80 | 335 |

DISCUSSION

The fractional efficiency was measured using Model 3160 Automated Filter Tester (AFT) available from TSI Incorporated, Shoreview, Minn. It is an automated filter tester that measures filter efficiency and penetration versus particle size. Challenging filters or filter media with a known particle size is achieved by using atomizers and the Electrostatic Classifier to generate particles. Upstream and downstream particle detection is accomplished using two Condensation Particle Counters. The AFT is automated using a microcomputer and special software. The tester is capable of measuring efficiencies up to 99.999999 percent over a particle size range of 0.015 to 0.8 micron.

Dioctyl phthalate (DOP) aerosol particles were used as the challenge particles within a wide range of particle sizes: 0.015 to 0.4 or 0.02 to 0.4 micron. For the sake of clarity and the fact that most of the attention in the U.S. is directed at 0.3 micron particle size, we have reported a large part of the results using 0.3 micron DOP particles.

Figure of Merit can be thought of as a benefit to cost ratio, where efficiency is the benefit, and normalized pressure drop (ΔP) is the cost (ΔP/media velocity). The "cost" is normalized so that one can compare Figures of Merit from tests run at different velocities. Figure of Merit is simply an index to compare media. Larger Figure of Merit values are better than small. The formula for calculating Figure of Merit is:

Figure of Merit=−Ln(penetration)/(ΔP/media face velocity)

In the equation presented above, ΔP is the pressure drop across the media and the unit used in the equation is cm Hg; media face velocity has the unit of cm/sec; Ln(penetration) is the natural logarithm of penetration. And penetration is defined as:

Penetration=1−Efficiency

The standard units of measure which Figure of Merit is reported in are given below:

1/(cm Hg)/(cm/sec) or (cm/sec)/cm Hg

We have demonstrated that multiple layers of nanofibers in a low solidity configuration exhibits high particulate capture efficiency in the range of HEPA and sub-HEPA levels. Furthermore, by combining two or more HEPA level efficiency nanofiber media, it is highly feasible to construct nanofiber media exhibiting efficiency in the ULPA level.

We have generated nanofiber media with various different efficiency levels and benchmarked commercially available glass and expanded-PTFE media performances. From our results, it appears that nanofiber media exhibits very similar performance to that of e-PTFE, and even better performance than glass media. The level of performance improvement over glass media depends on the target efficiency and it can range from 15 to 35% lower pressure drop for a given efficiency at the face velocities (5, 10.5 and 18 fpm) tested. It is very likely that further refinement of the nanofiber structure can extend the benefit even more than 15-35%.

The nanofiber media exhibits good pulse-cleanability whereas the glass media without any support or other type of enhancement did not pulse clean and simply ruptured after a few pulses. This unique property of the nanofiber media can play an important role in the field because this type of HEPA media can be utilized in applications where dust concentrations and flow rates are high since the media would be cleaned regularly using back-pulse. We've been successful pleating the nanofiber media on a knife-type pleater with well-defined pleat shapes and good retained efficiencies.

The above specification, examples and data provide a complete description of the manufacture and method of use of the composition and embodiments of the invention. Since many embodiments of the invention can be made without departing from the spirit and scope of the invention, the invention resides in the claims hereinafter appended.

We claim:

1. A web comprising a substantially continuous fine fiber layer having a layer thickness of 0.5 to 500 microns, the layer comprising a fiber separation means dispersed throughout the fiber in the layer, the fiber separation means present in an amount of 0.1 to 50 vol %; the fiber having a diameter of about 0.0001 to about 2 microns, and the layer having a fine fiber solidity of about 0.1 to 50%; wherein the permeability of the layer is greater than the permeability of a fine fiber layer formed without the fiber separation means and the solidity is less than the solidity of a fine fiber layer formed without the fiber separation means.

2. The web of claim 1 wherein the fine fiber has a diameter of about 0.001 to 1 micron, the fiber separation means present in an amount of 0.5 to 40 vol %, and the fine fiber layer having a fine fiber solidity of about 0.5 to 30%.

3. The web of claim 1 wherein the fine fiber has a diameter of about 0.001 to 0.5 micron the fiber separation means present in an amount of 1 to 30 vol %, and the fine fiber layer having a fine fiber solidity of about 1 to 20%.

4. The web of claim 1 wherein the web has a Figure of Merit of 100 to $10^4$.

5. The web of claim 1 wherein the web has a thickness of about 1 to 100 times the fiber diameter.

6. The web of claim 1 wherein the web comprises about 20 to 80 wt% fine fiber and about 80 to 20 wt% fiber separation means.

7. The web of claim 1 wherein the web comprises about 30 to 75 wt% fine fiber and about 70 to 25 wt% fiber separation means.

8. The web of claim 1 wherein the fiber separation means has a major dimension of about 0.1 to 70 microns, 9. The web of claim 1 wherein the web has a Frazier permeability of about 1 to about 50 meters-minutes$^{-1}$ and an efficiency of about 40 to about 99.99% under ASTM 1215-89 using monodisperse 0.78 micron polystyrene latex particulate at 6.1 m-min$^{-1}$ or 20 ft-min$^{-1}$.

10. The web of claim 1 wherein the web has a Frazier permeability of about 1 to about 50 meters-minutes$^{-1}$ and an efficiency of about 40 to about 99.9999% measured using TSI 3160 Fractional Efficiency test bench using monodisperse 0.3 micron dioctyl phthalate particulate at 3.2 m-min$^{-1}$ or 10.5 ft-min$^{-1}$.

11. The web of claim 1 wherein the fiber separation means comprises a polymer material and the fine fiber of the layer is substantially adhered to the fiber separation means.

12. The web of claim 1 wherein the web has a gradient in the distribution of the fiber separation means.

13. A filter media comprising the web of claim 1 and a support layer.

14. The web of claim 1 wherein the fiber separation means has a dimension of about 0.25 microns to 200 microns.

15. The web of claim 1 wherein the fiber separation means has a dimension of about 0.5 microns to 200 microns.

16. The web of claim 1 wherein the fiber separation means has a dimension of about 1 micron to 200 microns.

17. The web of claim 1 wherein the fiber separation means has a dimension of about 10 microns to 200 microns.

18. The web of claim 1 wherein the fiber separation means has a dimension of about 25 microns to 200 microns.

19. The web of claim 1 wherein the fiber separation means is a fiber having an aspect ratio of about 1 to 10:1.

20. The web of claim 1 wherein the web has a gradient in the distribution of the fine fiber.

21. A filter comprising a filter support structure and the filter media of claim 20.

22. The web of claim 1 wherein the fiber separation means is a fiber having a fiber diameter that is larger than the diameter of the fine fiber.

23. The web of claim 22 wherein the fiber separation means has a diameter ratio compared to the fine fiber of about 0.5 to 5000:1.

24. The web of claim 1 wherein the filter structure comprises two or more layers of fine fiber having a thickness of at least about 0.5 microns, at least one layer is free of the fiber separation means and at least one layer has the fiber separation means disbursed throughout each fine fiber layer.

25. The web of claim 24 wherein the fiber separation means comprises a nylon.

26. The web of claim 24 wherein the fiber separation means comprises a polyolefin.

27. The web of claim 24 wherein the fiber separation means comprises a polyester.

28. The web of claim 24 wherein the fiber separation means comprises an aramide.

29. A method to make a filter media comprising forming a substantially continuous fine fiber layer on a substrate, the fine fiber having a layer thickness of 0.5 to 500 microns, the layer comprising a fiber separation means dispersed throughout the fiber in the layer, the fiber separation means present in an amount of 0.1 to 50 vol %; the fine fiber having a diameter of about 0.0001 to about 2 microns, and the layer having a fine fiber solidity of about 0.1 to 50% and combining the media in a filter structure, the method comprising a compression step in which the layer is reduced in thickness and the media loses no efficiency; wherein the permeability of the layer is greater than the permeability of a fine fiber layer formed without the fiber separation means and the solidity is less than the solidity of a fine fiber layer formed without the fiber separation means.

30. The method of claim 29 wherein the efficiency is increased with a degree of compression that reduces the thickness about 1 to 10%,

\* \* \* \* \*